US012689263B2

(12) United States Patent　　(10) Patent No.: US 12,689,263 B2

Chougule　　(45) Date of Patent: Jul. 21, 2026

(54) SYSTEMS AND METHODS FOR GEARBOX AND GEARDRIVE ASSEMBLIES

(71) Applicant: Regal Beloit America, Inc., Milwaukee, WI (US)

(72) Inventor: Shivakumar Chougule, Pune (IN)

(73) Assignee: Regal Beloit America, Inc., Milwaukee, WI (US)

( * ) Notice: Subject to any disclaimer, the term of this patent is extended or adjusted under 35 U.S.C. 154(b) by 0 days.

(21) Appl. No.: 18/953,882

(22) Filed: Nov. 20, 2024

(65) Prior Publication Data

US 2026/0142525 A1　May 21, 2026

(51) Int. Cl.
*H02K 7/116* (2006.01)
*H02S 20/32* (2014.01)

(52) U.S. Cl.
CPC ............ *H02K 7/1166* (2013.01); *H02S 20/32* (2014.12)

(58) Field of Classification Search
CPC . H02K 7/1166; F16H 1/16; F16H 2057/0213; F16H 35/10
See application file for complete search history.

(56) References Cited

U.S. PATENT DOCUMENTS

| | | | |
|---|---|---|---|
| 5,517,358 A | 5/1996 | Dominguez | |
| 5,632,823 A | 5/1997 | Sharan | |
| 6,805,017 B2 * | 10/2004 | Chikaraishi | B62D 5/0409 |
| | | | 180/443 |

| | | | |
|---|---|---|---|
| 8,459,249 B2 | 6/2013 | Corio | |
| 9,581,678 B2 | 2/2017 | Corio | |
| 9,631,840 B2 | 4/2017 | Corio | |
| 10,042,030 B2 | 8/2018 | Corio | |

(Continued)

FOREIGN PATENT DOCUMENTS

| | | |
|---|---|---|
| AU | 2021100736 A4 | 4/2021 |
| CA | 2192245 C | 2/1999 |

(Continued)

OTHER PUBLICATIONS

Kollmorgen, Stepper Motors, posted date unknown [online], [retrieved Jan. 14, 2025]. Retrieved from internet, https://www.kollmorgen.com/en-us/products/motors/stepper.

(Continued)

*Primary Examiner* — Jake Cook

(74) *Attorney, Agent, or Firm* — Reinhart Boerner Van Deuren s.c.

(57) ABSTRACT

A gearmotor assembly comprises a stepper motor, a reduction gearbox, and a torque limiter. The stepper motor is configured to receive input power to selectively rotate a motor shaft about a motor axis. The reduction gearbox includes a reduction gear assembly, a motor shaft coupling configured to operably couple the motor shaft and the reduction gear assembly, and a gearbox coupling operably coupled to the reduction gear assembly and having a gearbox coupling axis. The torque limiter is positioned to operably couple the stepper motor, the reduction gear assembly, and the gearbox coupling when a relative net torque between the stepper motor, the reduction gear assembly, and the gearbox coupling is below a maximum torque and to operably decouple the stepper motor, the reduction gear assembly, and the gearbox coupling when the relative net torque is at or above the maximum torque.

20 Claims, 42 Drawing Sheets

(56) References Cited

U.S. PATENT DOCUMENTS

| | | | |
|---|---|---|---|
| 10,125,854 B2* | 11/2018 | Lingren | F16D 1/0835 |
| 10,174,792 B2 | 1/2019 | James | |
| 10,469,025 B2 | 11/2019 | Grushkowitz et al. | |
| 10,630,231 B2 | 4/2020 | Needham et al. | |
| 10,809,345 B2 | 10/2020 | Corio | |
| 10,848,097 B1 | 11/2020 | Needham et al. | |
| 10,903,782 B2 | 1/2021 | Needham et al. | |
| 11,208,141 B2* | 12/2021 | Wojtalik | B60R 25/02105 |
| 11,226,007 B2 | 1/2022 | James | |
| 11,416,010 B2 | 8/2022 | Needham et al. | |
| 11,454,693 B2 | 9/2022 | Corio | |
| 11,750,147 B2 | 9/2023 | Needham et al. | |
| 11,764,722 B2 | 9/2023 | Needham et al. | |
| 11,837,990 B2 | 12/2023 | Needham et al. | |
| 11,843,346 B2 | 12/2023 | Needham et al. | |
| 11,843,347 B2 | 12/2023 | Needham et al. | |
| 11,988,260 B2 | 5/2024 | Schuknecht et al. | |
| 12,222,021 B2* | 2/2025 | Stadtfeld | F16H 1/145 |
| 2015/0234031 A1 | 8/2015 | Corio | |
| 2018/0254740 A1 | 9/2018 | Corio | |
| 2021/0159848 A1 | 5/2021 | Needham et al. | |
| 2021/0257966 A1 | 8/2021 | Needham et al. | |
| 2022/0342429 A1 | 10/2022 | Needham et al. | |
| 2023/0383794 A1 | 11/2023 | Schuknecht et al. | |
| 2024/0039461 A1 | 2/2024 | Needham et al. | |
| 2024/0079991 A1 | 3/2024 | Quintana | |

FOREIGN PATENT DOCUMENTS

| | | | |
|---|---|---|---|
| CN | 101399508 A | 4/2009 | |
| CN | 201369689 Y | 12/2009 | |
| CN | 101697081 A | 4/2010 | |
| CN | 201508494 U | 6/2010 | |
| CN | 202160132 U | 3/2012 | |
| CN | 202251786 U | 5/2012 | |
| CN | 202257282 U | 5/2012 | |
| CN | 102931880 A | 2/2013 | |
| CN | 202719529 U | 2/2013 | |
| CN | 202868556 U | 4/2013 | |
| CN | 202870630 U | 4/2013 | |
| CN | 202948330 U | 5/2013 | |
| CN | 202971067 U | 6/2013 | |
| CN | 203070104 U | 7/2013 | |
| CN | 103600846 A | 2/2014 | |
| CN | 103809610 A | 5/2014 | |
| CN | 104035449 A | 9/2014 | |
| CN | 104679022 A | 6/2015 | |
| CN | 104679025 A | 6/2015 | |
| CN | 104914884 A | 9/2015 | |
| CN | 204740500 U | 11/2015 | |
| CN | 105929857 A | 9/2016 | |
| CN | 106444866 A | 2/2017 | |
| CN | 206224251 U | 6/2017 | |
| CN | 107166330 A | 9/2017 | |
| CN | 108196595 A | 6/2018 | |
| CN | 108681341 A | 10/2018 | |
| CN | 208061031 U | 11/2018 | |
| CN | 110336533 A | 10/2019 | |
| DE | 10144601 A1 | 9/2002 | |
| GR | 1003875 B | 4/2002 | |
| JP | H10100912 A | 4/1998 | |
| KR | 20180124290 A | 11/2018 | |
| TW | 200426330 A | 12/2004 | |
| WO | WO2005/012763 | 2/2005 | |
| WO | WO2016/195748 | 12/2016 | |
| WO | WO2018/115942 A1 | 6/2018 | |
| WO | WO2023/091432 A1 | 5/2023 | |
| WO | WO2023/230254 | 11/2023 | |

OTHER PUBLICATIONS

Kollmorgen, Stepper Motors—CT Series, posted date unknown [online], [retrieved Jan. 14, 2025]. Retrieved from internet, https://www.kollmorgen.com/en-us/products/motors/stepper/ct-series.

Kollmorgen, Stepper Motors—SS Series, posted date unknown [online], [retrieved Jan. 14, 2025]. Retrieved from internet, https://www.kollmorgen.com/en-us/products/motors/synchronous/st-sn-pacific-scientific-/st-sn.

Kollmorgen SS Synchronous Motor Selection Guide, posted date unknown [online], [retrieved Jan. 14, 2025]. Retrieved from internet, SS-Synchronous-KM_SG_000183-SS_RevB_EN.pdf.

Saint-Gobain, Slip Clutch, posted date unknown [online], [retrieved Jan. 14, 2025]. Retrieved from internet, https://www.eqyo.com/torque-components/slip-clutch.

Saint-Gobain, Tolerance Ring, posted date unknown [online], [retrieved Jan. 14, 2025]. Retrieved from internet, https://www.eqyo.com/engineered-fastener/tolerance-ring.

Advanced Energy Technologies, Energy News Monitoring—Solar Trackers. Analysis of Inventions, posted Jun. 20, 2022 [online], [retrieved Jan. 14, 2025]. Retrieved from internet, https://aenert.com/news-events/energy-news-monitoring/n/solar-trackers-analysis-of-inventions/.

Regal Rexnord, Gearing, posted date unknown [online], [retrieved Jan. 14, 2025]. Retrieved from internet, https://www.regalrexnord.com/products/gearing.

Regal Rexnord, Right Angle Gearing, posted date unknown [online], [retrieved Jan. 14, 2025]. Retrieved from internet, https://www.regalrexnord.com/products/gearing/regal-right-angle-gearing.

Array Technologies, DuraTrack, posted date unknown [online], [retrieved Jan. 14, 2025]. Retrieved from internet, https://arraytechinc.com/products/duratrack/.

Array Technologies, OmniTrack, posted date unknown [online], [retrieved Jan. 14, 2025]. Retrieved from internet, https://arraytechinc.com/products/omnitrack/.

Kinematics ST Series, Solar Actuation you can BANK on, Kinematics-ST-Series-2023-002_.pdf, posted date unknown [online], [retrieved Jan. 14, 2025]. Retrieved from internet, https://www.gokinematics.com/wp-content/uploads/2023/04/Kinematics-ST-Series-2023-_002_.pdf.

Kinematics, Solutions Solar, posted date unknown [online], [retrieved Jan. 14, 2025]. Retrieved from internet, https://www.gokinematics.com/solutions/solar/.

Array Technologies, Array Skylink Tracker System, posted date unknown [online], [retrieved Jan. 14, 2025]. Retrieved from internet, https://arraytechinc.com/products/array-skylink/.

The S-Finger: A Synergetic Externally Powered Digit With Tactile Sensing and Feedback, https://www.researchgate.net/publication/324712259_The_S-Finger_A_Synergetic_Externally_Powered_Digit_With_Tactile_Sensing_and_Feedback (Year 2018).

IR16 Two Way Overrunning Clutch for Solar Photovoltaic, posted date unknown [online], [retrieved Jan. 14, 2025]. Retrieved from internet, https://cnqd007.en.made-in-china.com/product/BjPxFlwMpOhl/China-IR16-Two-Way-Overrunning-Clutch-for-Solar-Photovoltaic.html.

Mousazadeh, H. et al: "A review of principle and sun-tracking methods for maximizing solar systems output", Renewable and Sustainable Energy Reviews Elseviers Science, New York, NY., US, vol. 13, No. 8, Oct. 1, 2009 (Oct. 1, 2009), pp. 1800-1818, XP026339061, ISSN: 1364-0321, DOI: 10.1016/J.RSER.2009.01.022 [retrieved on Feb. 15, 2009].

Extended European Search Report for European Application No. 25217280.4 dated Mar. 25, 2026, 9 pages.

\* cited by examiner

940

1

SYSTEMS AND METHODS FOR GEARBOX AND GEARDRIVE ASSEMBLIES

CROSS-REFERENCE TO RELATED APPLICATIONS

Not applicable.

STATEMENT CONCERNING FEDERALLY SPONSORED RESEARCH AND DEVELOPMENT

Not applicable.

TECHNICAL FIELD

The present disclosure is generally related to gearing assemblies and systems. For example, the present disclosure relates to gearmotor and gearbox assemblies configured to selectively generate and/or transfer a force between an input and an output through an intermediate gearing arrangement.

BACKGROUND

Gearing assemblies and systems are incorporated into in a wide variety of commercial and industrial applications. Depending on the particular application, gearing is often operably coupled to components to transfer a force (e.g., a twisting force or torque) between the components. The force transfer can be, for example, unidirectional (e.g., from one component to another component, such as an input to an output) or bidirectional (e.g., between components, such as input to output and output to input). The forces acting on the gearing can be applied to the gearing by, for example, an output from a motor to an input of the gearing and/or an external load on the gearing output.

Challenges arise when attempting to design and implement gearing assemblies in a robust and economical manner while taking into consideration the undesirable impacts competing forces have on the operation of the gearing assemblies. Application-specific considerations often include balancing various parameters including the available motor force, packaging constraints, cost limitations, power sources, and duty cycle requirements, for instance.

As one example application, gearing can be incorporated into solar tracking arrays. A solar tracking array typically includes multiple photovoltaic panels arranged side-by-side in a row, with the row being pivotably coupled about an anchored support structure. A motor is often operably coupled to the row of panels to pivot the panels relative to the support structure, such that the row tracks the Sun throughout the course of a day. In some installations, multiple rows are mechanically linked (e.g., with drive shafts and universal joints) and driven by a central or primary motor. Gearing integrated into a solar tracking array is typically subjected to bidirectional forces. Each panel in a solar tracking array not only has a nominal load that the gearing must overcome during normal operation, but snow, wind, debris, and other often variable loads can impart forces borne by the gearing. Without proper consideration, these forces have the potential to impede the desired operation of the gearing and coupled components, such as a solar tracking array by exceeding motor and gearing specifications, which ultimately impact the orientation and tracking operation of the panels. Attempts to address the undesirable impacts of these often difficult to avoid operational issues have generally led to the use of oversized motors and gearing that incorporates relatively complex and costly clutching mechanisms.

Gearing, such as the example gearbox and gearmotor assemblies described herein, can be incorporated into various other example applications. These example applications include, but are not limited to, wastewater treatment processing equipment and systems, conveyor equipment and systems, augers/mixing equipment and systems, winching equipment and systems, and semi-trailing loading dock retention equipment and systems. Given the benefit of this disclosure, one skilled in the art will appreciate the various applications into which the gearbox and gearmotor assembly concepts may be incorporated.

Therefore, in view of at least the above, a need exists for improved systems and methods for geardrive and gearbox assemblies.

SUMMARY

Some embodiments described herein can provide a gearmotor assembly comprising: a stepper motor including a motor shaft having a motor axis, wherein the stepper motor is configured to receive input power to selectively rotate the motor shaft about the motor axis; a reduction gearbox including: a reduction gear assembly; a motor shaft coupling configured to operably couple the motor shaft and the reduction gear assembly; and a gearbox coupling operably coupled to the reduction gear assembly and having a gearbox coupling axis; and a torque limiter positioned to operably couple the stepper motor, the reduction gear assembly, and the gearbox coupling when a relative net torque between the stepper motor, the reduction gear assembly, and the gearbox coupling is below a maximum torque and to operably decouple the stepper motor, the reduction gear assembly, and the gearbox coupling when the relative net torque between the stepper motor, the reduction gear assembly, and the gearbox coupling is above the maximum torque.

Other embodiments can provide a gearmotor system, comprising: a driven assembly including a support structure and a driven member operably coupled to the support structure to move relative to the support structure in at least two different directions; a gearmotor assembly comprising: a stepper motor including a motor shaft having a motor axis, wherein the stepper motor is configured to receive input power to selectively rotate the motor shaft about the motor axis; a reduction gearbox including: a reduction gear assembly; a motor shaft coupling configured to operably couple the motor shaft and the reduction gear assembly; and a gearbox coupling configured to operably couple the reduction gear assembly and the driven member; and a torque limiter positioned to operably inhibit a relative net applied torque between the stepper motor, the reduction gear assembly, the gearbox coupling, and the driven member from exceeding a maximum torque.

Some embodiments described herein can provide a gearbox assembly, comprising: a gearbox including: a worm housing; and a cover configured to engage with the worm housing to define a housing interior between the worm housing and the cover; a worm shaft located at least partially within the housing interior; a worm gear located within the housing interior and operably engaged with the worm shaft, the worm gear having a central bore; a gearbox shaft that extends along a gearbox shaft axis; a torque limiter positioned between central bore of the worm gear and the gearbox shaft to inhibit relative rotation between the worm gear and the gearbox shaft when a relative torque between the worm gear and the gearbox shaft about the gearbox shaft axis is below a maximum torque and to permit relative rotation between the worm gear and the gearbox shaft when the relative torque between the worm gear and the gearbox shaft about the gearbox shaft axis is at or above the maximum torque; a first bearing operably engaged with the gearbox shaft at a first axial position along the gearbox shaft axis; and a second bearing operably engaged with the gearbox shaft at a second axial position along the gearbox shaft axis; wherein the gearbox shaft includes multiple axial segments with discrete diameters; and wherein the torque limiter, the first bearing, and the second bearing are engaged with a respective axial segment of the multiple axial segments.

BRIEF DESCRIPTION OF THE DRAWINGS

The accompanying figures, which are incorporated herein and form a part of this specification, illustrate example embodiments of the invention and, together with the description, serve to explain the principles of the invention reflected in the embodiments.

DETAILED DESCRIPTION

Figure 1:
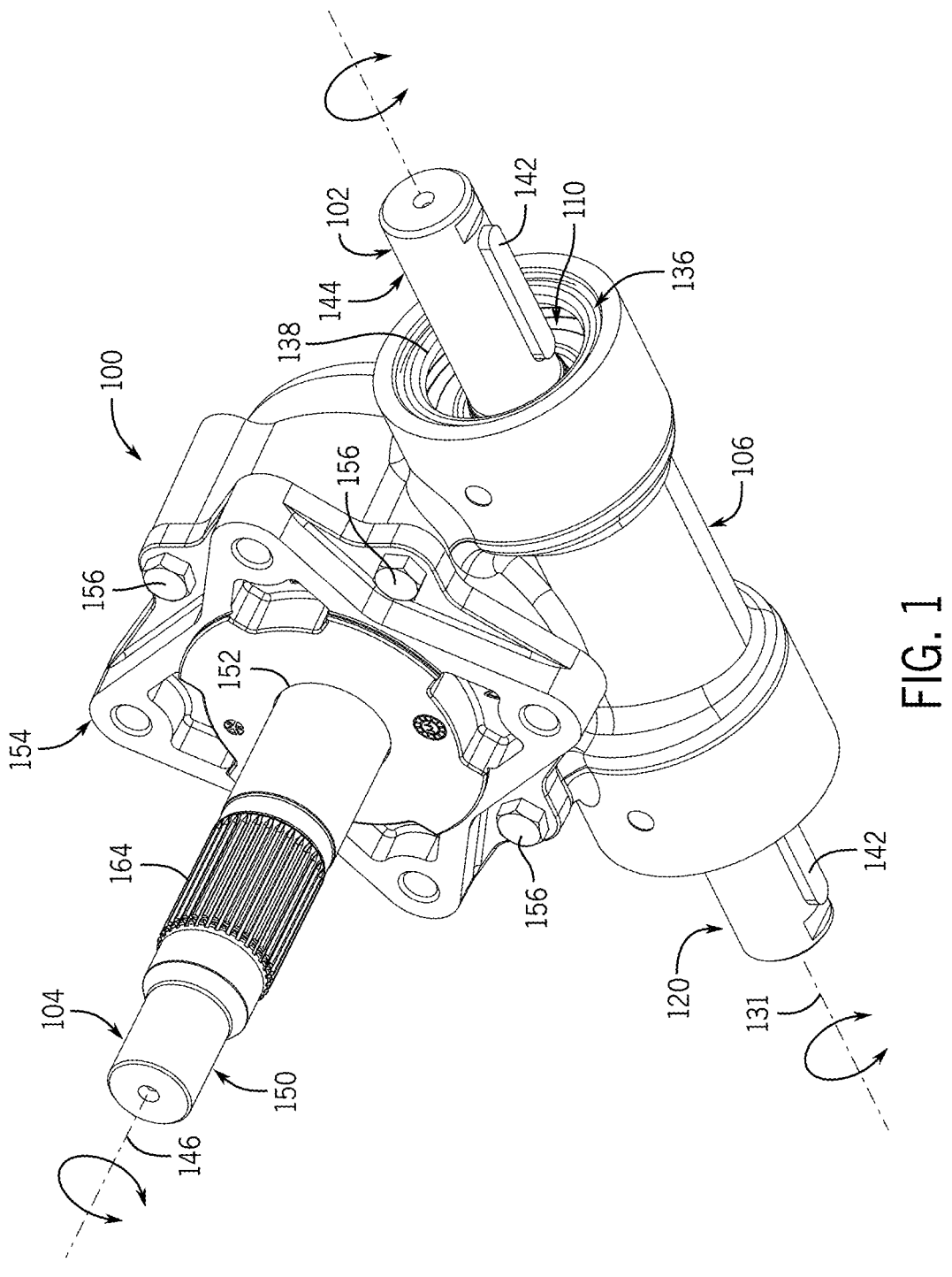
FIG. 1 is an isometric view of an example gearbox assembly.
Figure 2:
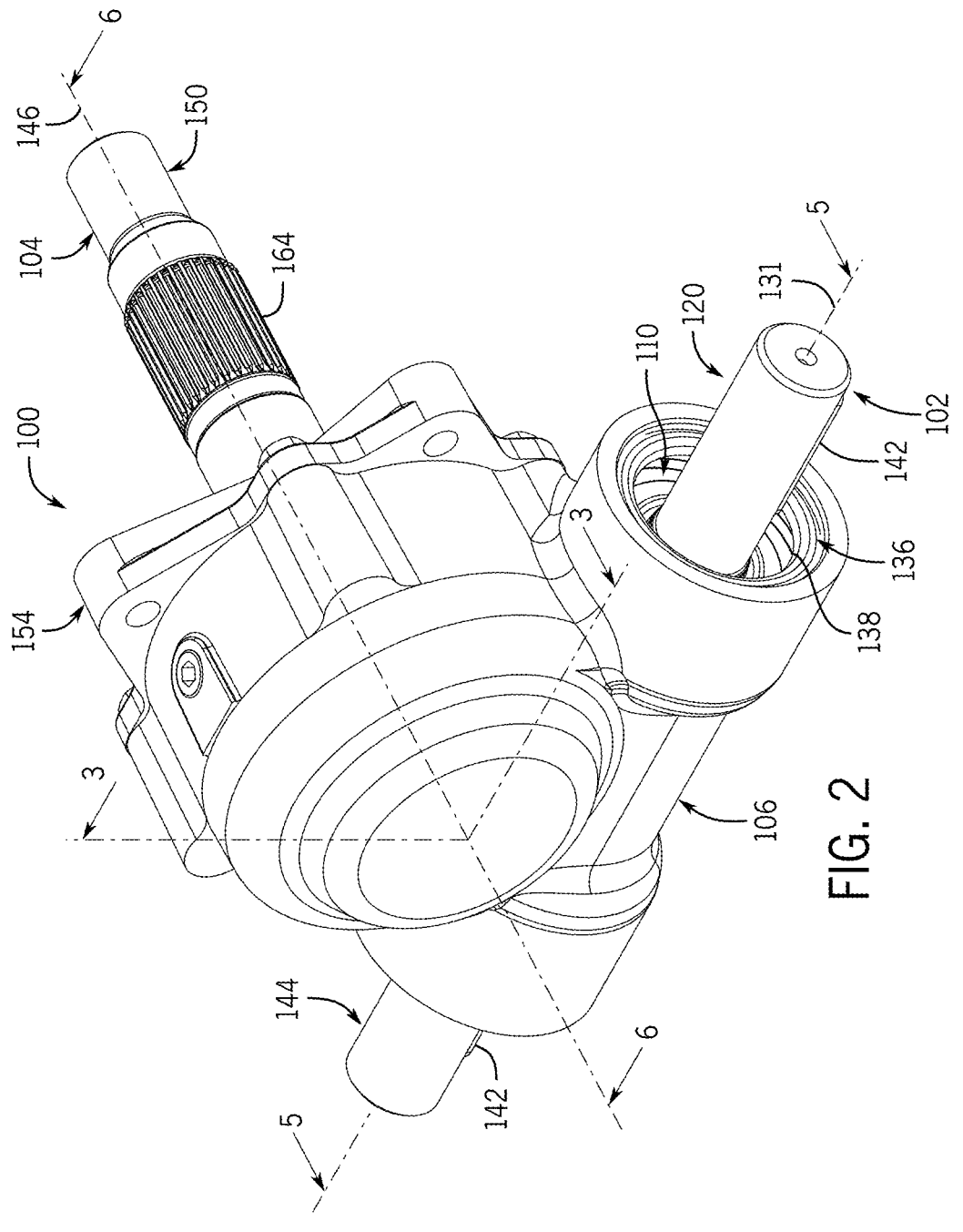
FIG. 2 is an isometric view of the example gearbox assembly shown in FIG. 2.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Given the benefit of this disclosure, various modifications to the illustrated embodiments will be readily apparent to those skilled in the art, and the principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

Also as used herein, unless otherwise limited or defined, "substantially parallel" indicates a direction that is within ±12 degrees of a reference direction (e.g., within ±6 degrees), inclusive. For a path that is not linear, the path can be considered to be substantially parallel to a reference direction if a straight line between end-points of the path is substantially parallel to the reference direction or a mean derivative of the path within a common reference frame as the reference direction is substantially parallel to the reference direction.

Also as used herein, unless otherwise limited or defined, "substantially perpendicular" indicates a direction that is within ±12 degrees of perpendicular a reference direction (e.g., within ±6 degrees), inclusive. For a path that is not linear, the path can be considered to be substantially perpendicular to a reference direction if a straight line between end-points of the path is substantially perpendicular to the reference direction or a mean derivative of the path within a common reference frame as the reference direction is substantially perpendicular to the reference direction.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Additionally, unless otherwise specified or limited, the terms "nominal[ly]," "about," and "approximately," as used herein with respect to a reference value, refer to variations from the reference value of ±15% or less, inclusive of the endpoints of the range. Similarly, the term "substantially equal" (and the like) as used herein with respect to a reference value refers to variations from the reference value of less than ±30%, inclusive. Where specified, "substantially" can indicate in particular a variation in one numerical direction relative to a reference value. For example, "substantially less" than a reference value (and the like) indicates a value that is reduced from the reference value by 30% or more, and "substantially more" than a reference value (and the like) indicates a value that is increased from the reference value by 30% or more.

Also as used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

Throughout the disclosure, references may be made to one or more contextual applications in which the example gearmotor and gearbox assemblies may be incorporated. It is understood that these applications are not exhaustive. Given the benefit of this disclosure, one of ordinary skill will appreciate that the disclosed inventive concepts can be adapted for various other applications. In addition, the terms input and output are not intended to be limiting. For example, in certain applications or scenarios, a force may be applied to a gearmotor assembly and/or a gearbox assembly via an output with a resulting force being transferred to an input. The force transfer can be, for example, unidirectional (e.g., from one component to another component, such as an input to an output) or bidirectional (e.g., between components, such as input to output and output to input). The forces acting on the gearing can be applied to the gearing by, for example, an output from a motor to an input of the gearing and/or an external load on the gearing output.

Embodiments of the disclosed invention can address the various challenges that arise when designing and implementing gearing assemblies in a robust and economical manner while taking into consideration the undesirable impacts competing forces have on the operation of the gearing assemblies.

Referring now to FIGS. 1-5, an example gearbox assembly 100 is illustrated. The gearbox assembly 100 is configured to transmit forces (e.g., torques) between inputs/outputs. In example applications, the energy supplied to the input of the gearbox assembly 100 can be via a motor (e.g., an electric motor), a human (e.g., a hand crank), or other source of energy, and the output of the gearbox assembly 100 can be operably coupled to a device that uses the transferred energy to accomplish a specific task (e.g., altering the position of a moveable member). In one example, a worm shaft 102 can be configured as an input to the gearbox assembly 100 and a gearbox shaft 104 can be configured as an output to the gearbox assembly 100. The gearbox assembly 100 includes a housing 106 that defines an interior 108 within which a worm gear 105 is located. When a force F is applied to, for instance, the worm shaft 102, rotation of the worm shaft 102 causes rotation of the worm gear 105 within the housing 106. As further described below, the worm gear 105 is operably engaged with the gearbox shaft 104, such that rotation of the worm gear 105 may result in rotation of the gearbox shaft 104.

Figure 3:
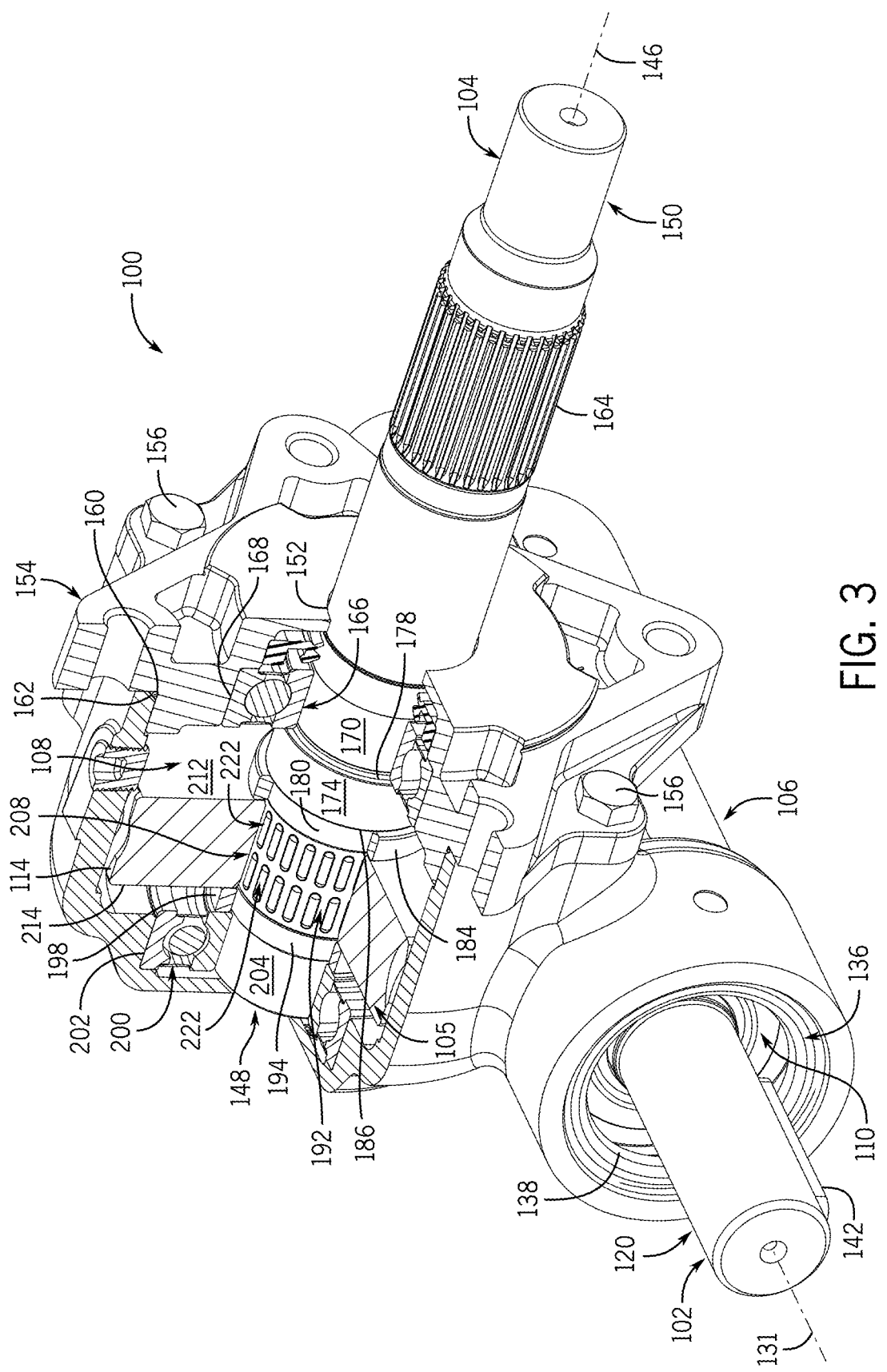
FIG. 3 is an isometric partial section view taken along line 3-3 shown in FIG. 2.
Figure 4:
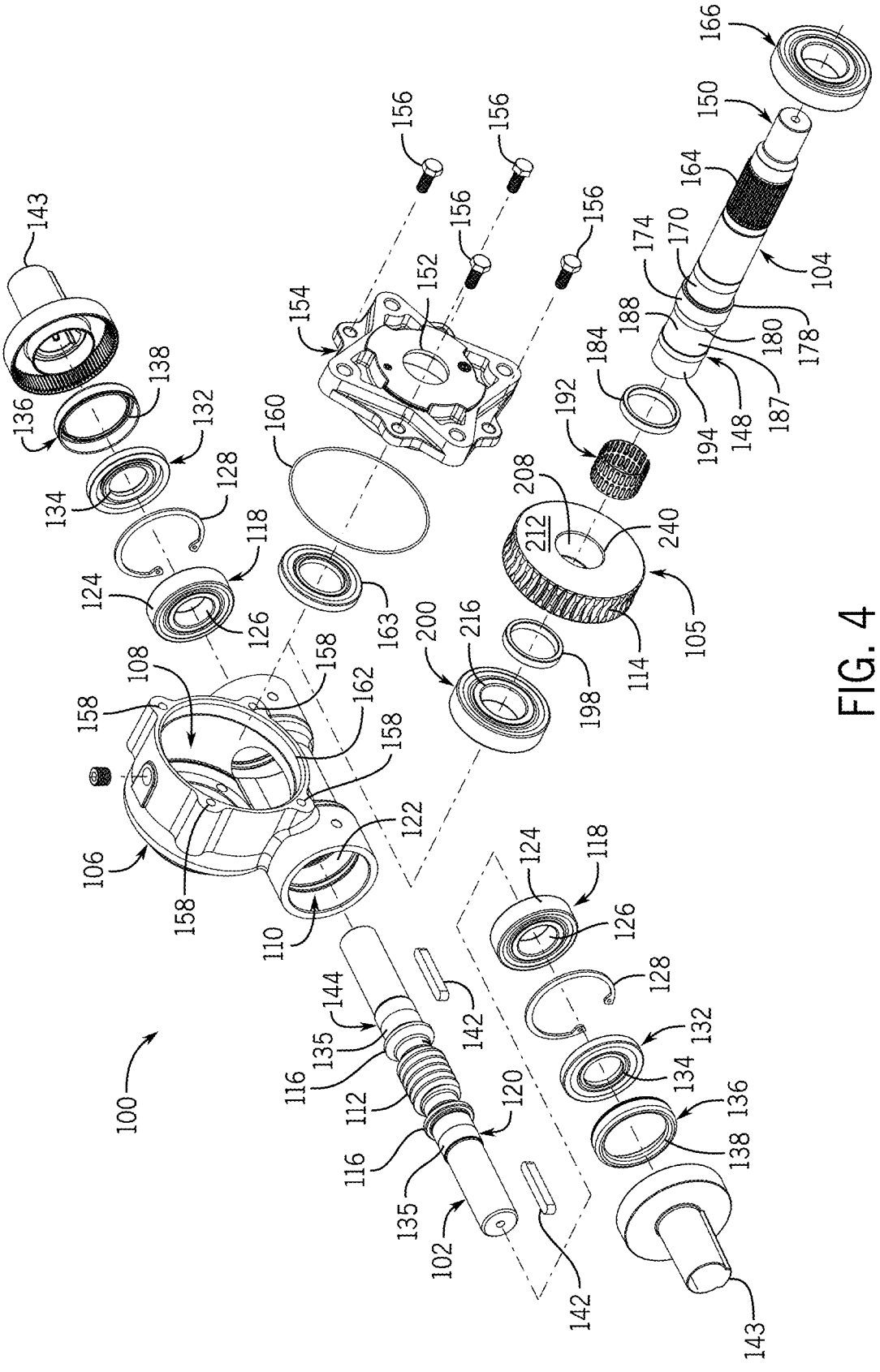
FIG. 4 is an isometric exploded view of the example gearbox assembly shown in FIG. 1, including additional covers.
Figure 5:
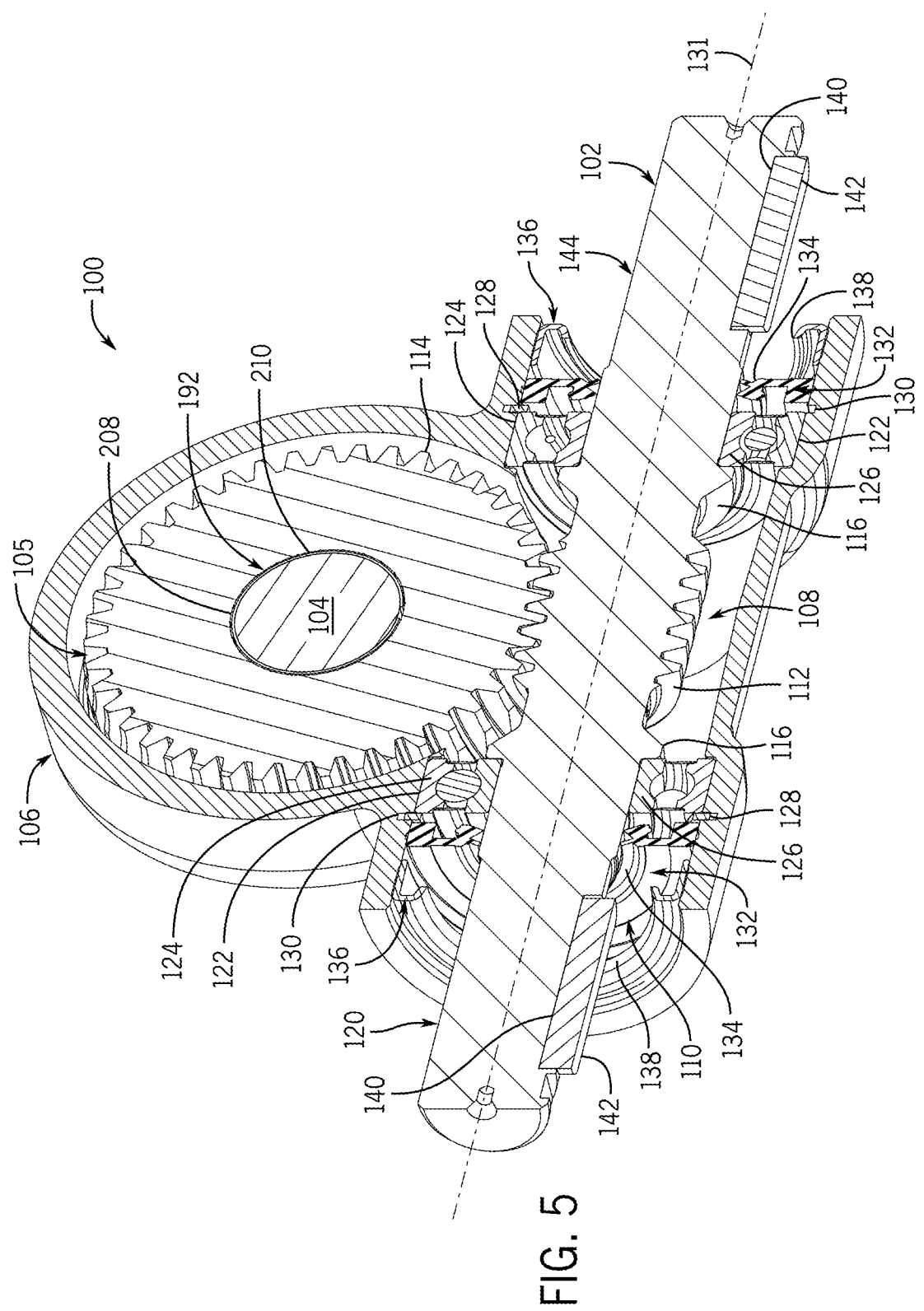
FIG. 5 is an isometric section view taken along line 5-5 shown in FIG. 2.

With specific reference to FIGS. 3-5, the housing 106 may define a generally cylindrical passage 110 within which the worm shaft 102 is at least partially housed. When the worm shaft 102 is seated in the passage 110, worm shaft threads 112 are positioned to mesh with worm gear threads 114. The worm shaft 102 includes a shoulder 116 configured to abut a bearing 118 seated about an end portion 120 of the worm shaft 102. The bearing 118 is sized to seat within a bore 122 formed in the passage 110, such that an outer race 124 of the bearing is engaged with the bore 122 and the inner race 126 is engaged with the end portion 120 of the worm shaft 102. A retaining ring 128 is secured in a groove 130 formed in the passage 110 to capture the bearing 118 against the shoulder 116. Continuing outwardly relative to the worm shaft threads 112 along a worm shaft axis 131, an oil seal 132 is seated in the passage 110 to inhibit oil from passing beyond the oil seal 132 and out of the passage 110. The oil seal 132 is configured with a radially inner lip 134 that engages and seals with an exterior seal surface 135 of the end portion 120 of the worm shaft 102. A debris seal 136 is also seated in the passage 110 to inhibit debris from passing beyond the debris seal 136 and into the passage 110. The debris seal 136 is configured with a radially inner lip 138 that engages and seals with an exterior surface of a component (not shown) rotatably coupled to the worm shaft 102. For example, the end portion 120 of the worm shaft 102 includes a groove 140 into which a key 142 may be mated. The key 142 may further engage with a drive or driven shaft (not shown), so that the drive or driven shaft is rotatably coupled to the worm shaft 102. A cap 143 may also be provided to selectively engage with the end portion 120 of the worm shaft 102 and the passage 110 of the housing 106 during, for instance, manufacturing, assembly, transportation, and maintenance to prevent undesirable contaminates from impacting the gearbox assembly 100.

For completeness, and as illustrated in FIGS. 1-5, the form factor and configuration of components described above in connection with the end portion 120 of the worm shaft 102 is substantially identical to the form factor and configuration of components in connection with the opposite end portion 144 of the worm shaft 102.

Figure 6:
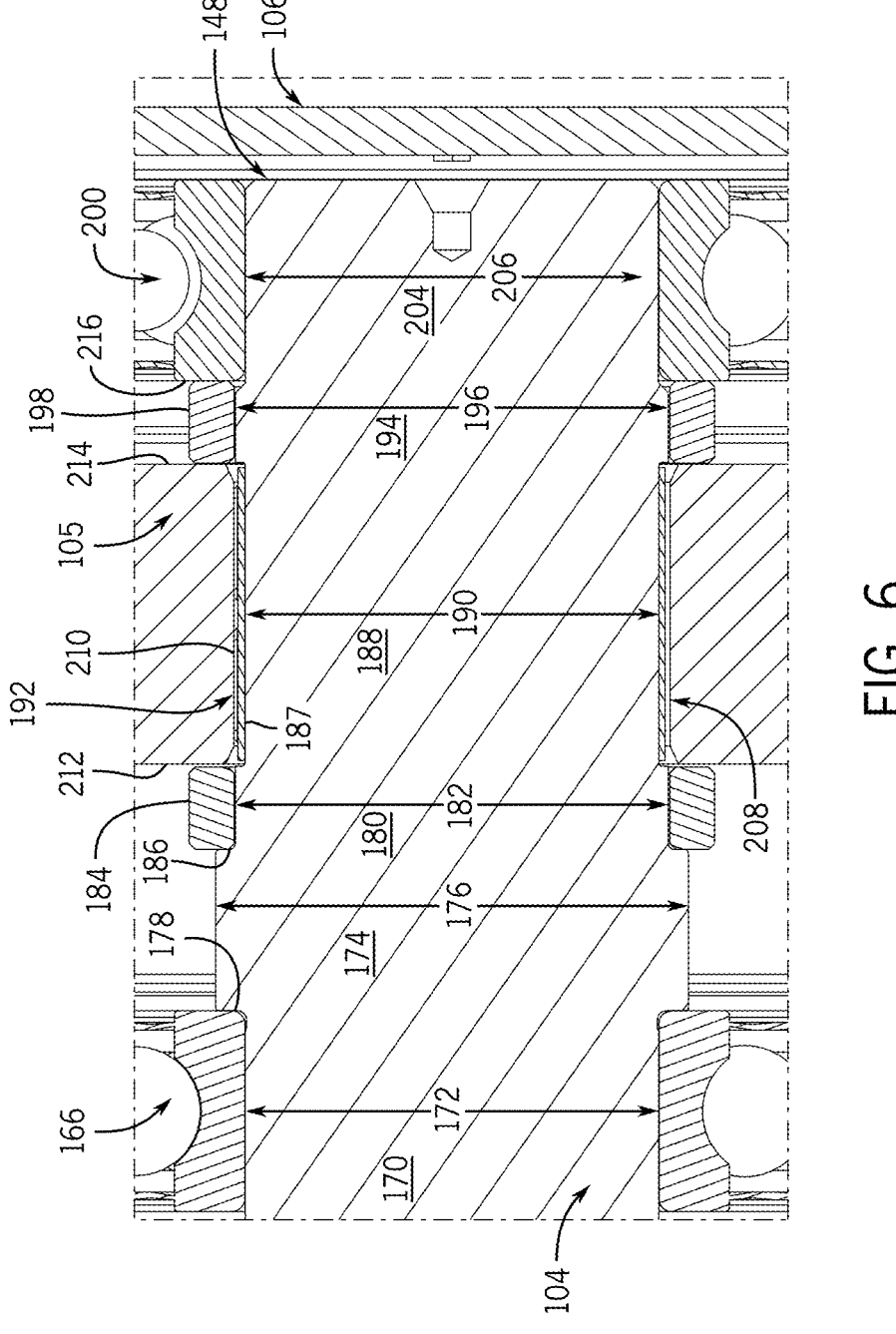
FIG. 6 is a plan detailed section view taken along line 6-6 shown in FIG. 2.
Figure 7:
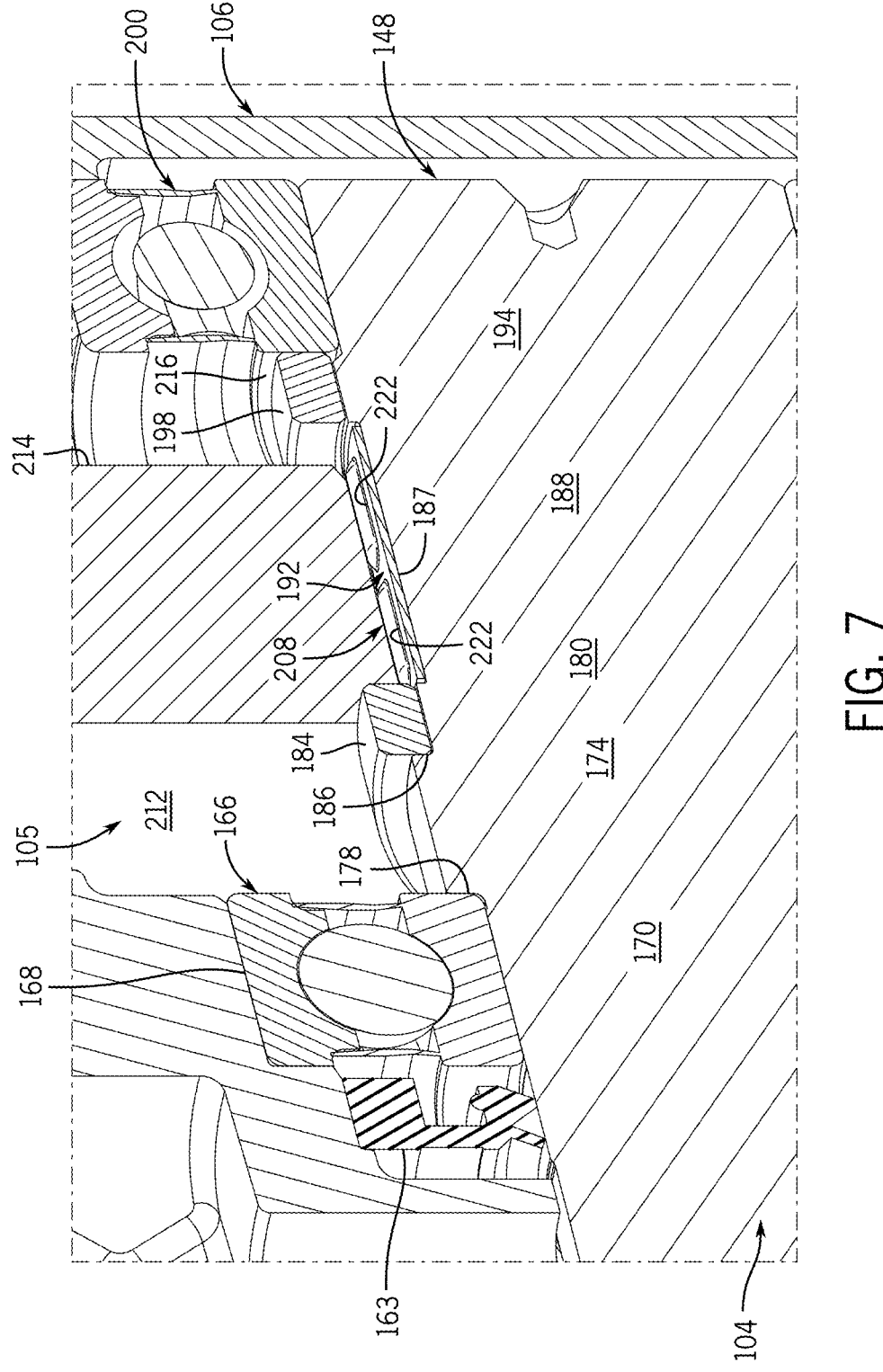
FIG. 7 is an isometric partial section view of FIG. 6, with a portion of the torque limiter exposed.

With continued reference to FIGS. 3-5 and additional reference to FIGS. 6 and 7, the worm gear 105 is operably engaged with the gearbox shaft 104, such that rotation of the worm gear 105 may result in rotation of the gearbox shaft 104. In other words, forces can be transferred between the worm shaft 102 and the gearbox shaft 104. The gearbox shaft 104 extends along a gearbox shaft axis 146 between a proximal end portion 148 to a distal end portion 150. The distal end portion 150 extends through an opening 152 in a cover 154. The cover 154 is configured to be secured to the housing 106 (e.g., via bolts 156) that engage with threaded bores 158 formed in the housing 106. An o-ring 160 is seated on a ledge 162 formed on the housing 106, such that oil within the interior 108 of the housing 106 is inhibited from leaking past the cover 154. A seal 163 is also included to wipe against the gearbox shaft 104, such that oil within the interior 108 of the housing 106 is inhibited from leaking around the gearbox shaft 104 and debris is inhibited from passing between the seal 163 and the gearbox shaft 104 into the housing 106. The distal end portion 150 may define a variety of form factors to, for instance, establish a rotational coupling with a device (not shown). The example gearbox shaft 104 includes splines 164 on the distal end portion 150. Given the benefit of this disclosure, one skilled in the art will appreciate the various coupling arrangements available and consistent with the present disclosure.

With specific reference to FIGS. 3, 4, 6, and 7, the proximal end portion 148 of the gearbox shaft 104 is seated within the housing 106 and engaged with the worm gear 105 for selective force (e.g., torque) transfer between the gearbox shaft 104 and the worm gear 105. The example gearbox shaft 104 defines various axial segments having, in some forms, discrete diameters; the axial segments facilitate operable engagement with other components of the gearbox assembly 100.

In the example gearbox assembly 100, a bearing 166 is sized to fit within a bore 168 formed in the cover 154 and to receive a first axial segment 170 of the gearbox shaft 104. The first axial segment 170 defines a first diameter 172 and an adjacent second axial segment 174 defines a second diameter 176. In the example embodiment, the second diameter 176 is greater than the first diameter 172, such that a first axial rim face 178 is established at the interface between the first axial segment 170 and the second axial segment 174. The bearing 166 may be seated to abut the first axial rim face 178. The gearbox shaft 104 includes a third axial segment 180 that defines a third diameter 182. In the example embodiment, the third diameter 182 is less than the second diameter 176, which defines a second axial rim face 186 at the junction of the second axial segment 174 and the third axial segment 180. A first spacer 184 may be seated on the gearbox shaft 103 in the third axial segment 180 and abuts the second axial rim face 186. In one example, the third diameter 182 is greater than the first diameter 172. The gearbox shaft 104 includes a fourth axial segment 188 that defines a fourth diameter 190. In the example embodiment, the fourth diameter 190 is approximately the same diameter as the first diameter 172. As described below in greater detail, the fourth axial segment 188 is configured to receive a torque limiter 192. The gearbox shaft 104 includes a fifth axial segment 194 that defines a fifth diameter 196. In the example embodiment, the fifth diameter 196 is approximately the same diameter as the third diameter 182. A second spacer 198 may be seated on the gearbox shaft 104 in the fifth axial segment 194. In the example gearbox assembly 100, another bearing 200 is sized to fit within a bore 202 formed in the housing 106 and to receive a sixth axial segment 204 of the gearbox shaft 104. The sixth axial segment 204 defines a sixth diameter 206. In the example embodiment, the sixth diameter 206 is approximately the same diameter as the first diameter 172.

In the example embodiment, the second diameter 176 of the second axial segment 174 is preferably minimized to limit the material of the largest diameter axial segments. The first spacer 184 and the second spacer 198 can be included to help accommodate for various gear mesh and interface tolerances. In one embodiment, the worm gear 105 can be installed without incorporating the first spacer 184 (e.g., an assembly fixture can be used to determine and control the relative positioning of the worm gear 105 relative to the gearbox shaft 104). In this configuration, the second spacer 198 can be included between the worm gear 105 and the bearing 200. The second axial segment 174 and the third axial segment 180 may be maintained as illustrated (e.g., as shown in FIG. 6) or, for example, combined into a single axial segment of uniform diameter.

In some forms, the worm gear 105 is preferably manufactured via a powdered metal manufacturing technique from an alloy, such as an iron copper and copper steel alloy (e.g., FC-0208-50) and application-specific variations thereof. Given the benefit of this disclosure, one skilled in the art will appreciate that other alloys can be used to implement the concepts disclosed herein. The alloy of the example embodiment establishes a macro or apparent hardness of approximately 73HRB. Alternative alloys that establish a similar or application-specific hardness may be incorporated. Use of a worm gear 105 produced from a powdered metal manufacturing technique provide advantages over, for instance, a ductile iron. Advantages include improved performance and operation of the torque limiter 192 (e.g., establishing more consistent and repeatable slip conditions given a variety of operational and environmental parameters, such as the applied torque differential, duration of applied torque differential, duration between slip events), as further discussed below. In other example forms, one skilled in the art will appreciate that the torque limiter functionality can be attributed to other driveline components and thus inserted into the driveline at alternative locations, such that the alternative components can be manufactured from a powdered metal process to obtain the identified benefits.

Figure 8:
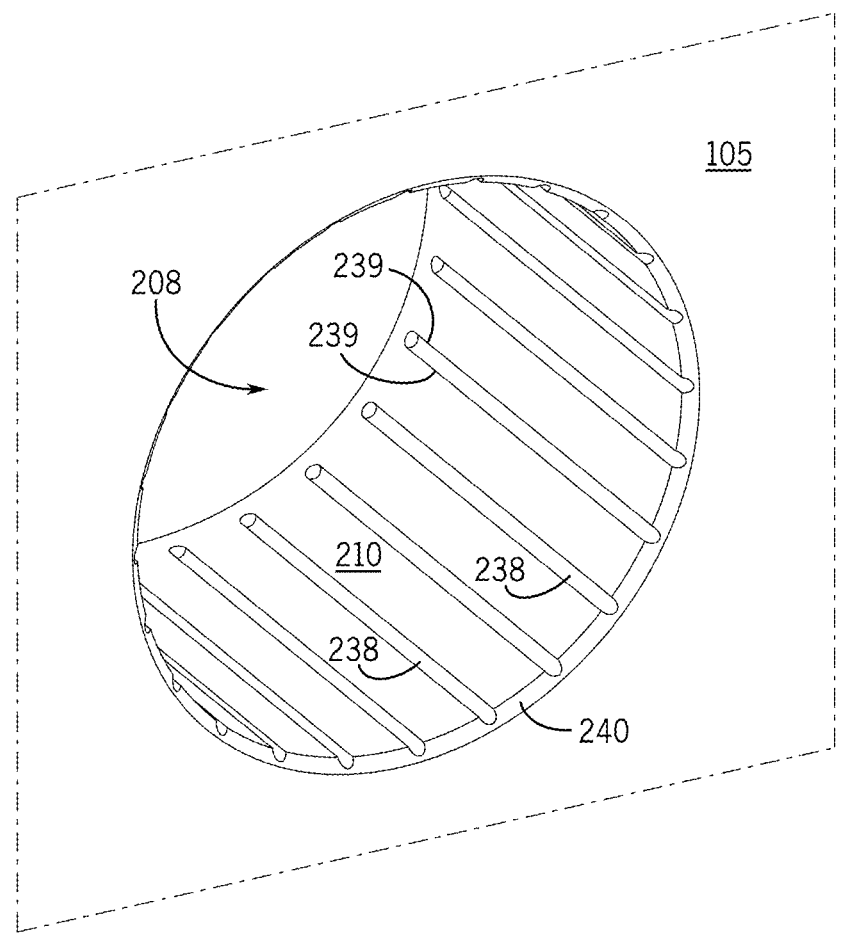
FIG. 8 is an isometric detail view of an example worm gear of the example gearbox assembly shown in FIG. 4.
Figure 9:
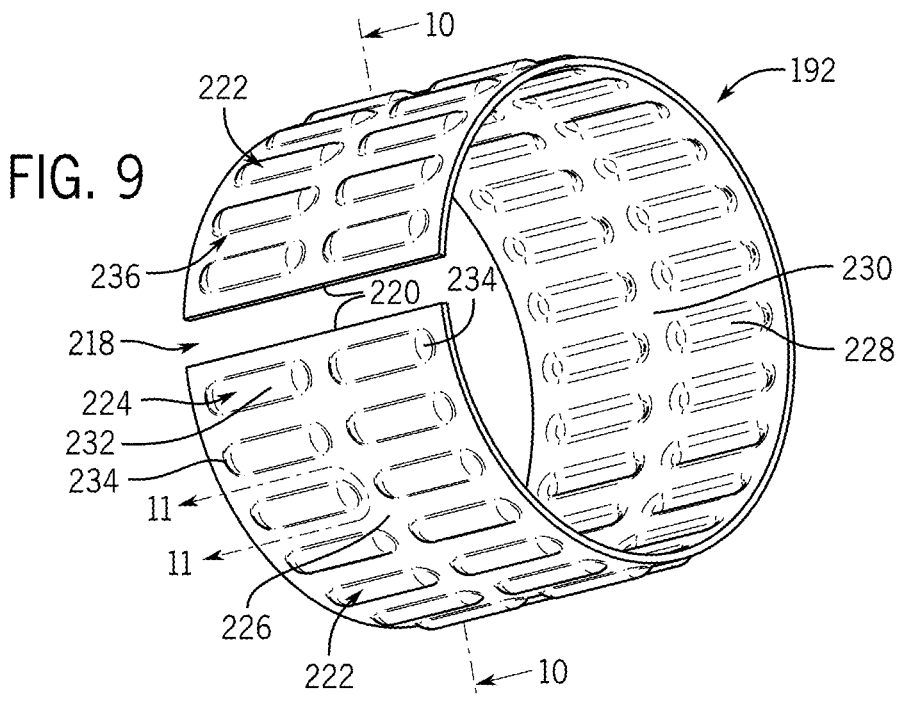
FIG. 9 is an isometric view of an example torque limiter of the example gearbox assembly shown in FIG. 4.
Figure 10:
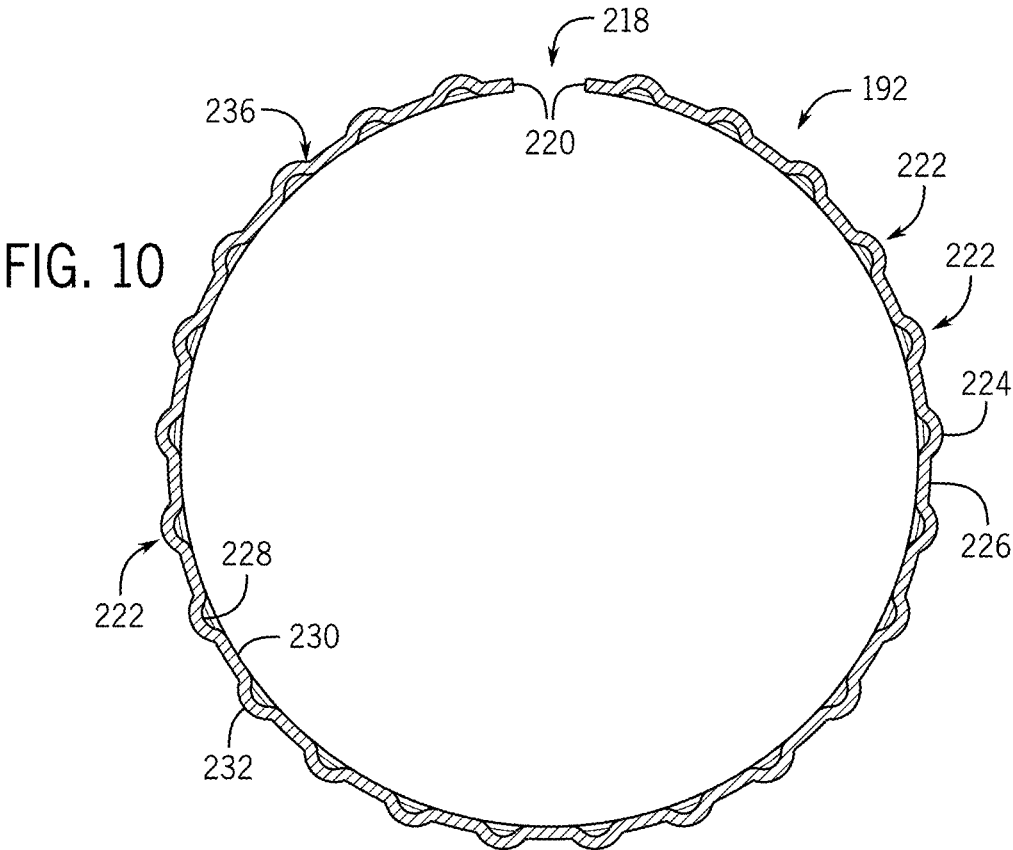
FIG. 10 is a plan section view taken along line 10-10 shown in FIG. 9.
Figure 11:
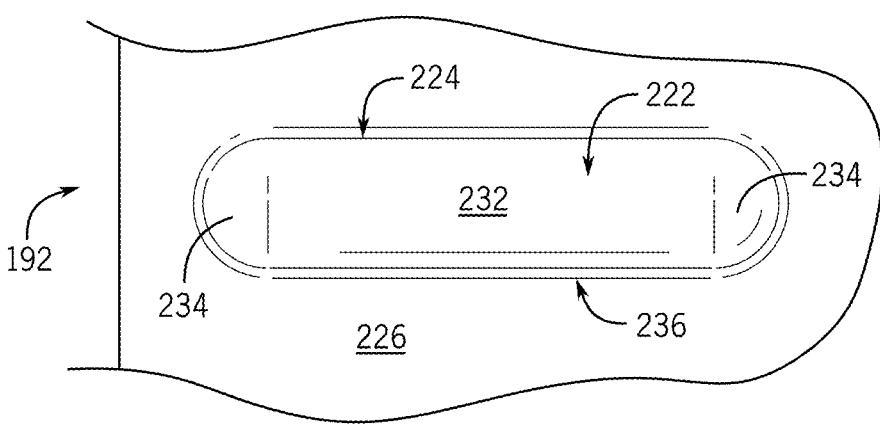
FIG. 11 is a plan detailed view of the area circumscribed by arc 11-11 shown in FIG. 9.
Figure 12:
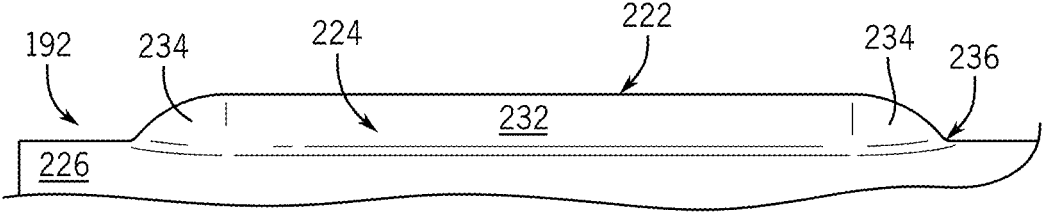
FIG. 12 is a plan detailed view of the area shown in FIG. 11.

In the example embodiment, the worm gear 105, the torque limiter 192, and the gearbox shaft 104 are configured to establish selective force (e.g., torque) transfer between the gearbox shaft 104 and the worm gear 105. For example, the worm gear 105 includes a central bore 208 defining an annular surface 210 (see, for instance, FIG. 8). The torque limiter 192 is generally positioned in the fourth axial segment 188 of the gearbox shaft 104 adjacent an outer surface 187, such that the fourth diameter 190 of the gearbox shaft 104 and dimensions of the torque limiter 192 are adapted for application-specific operating parameters, as discussed in greater detail below. The worm gear 105 also defines a first axial face 212 adjacent the first spacer 184 and a second axial face 214 adjacent the second spacer 198. The axial position of the worm gear 105 along the gearbox shaft axis 146 is generally restrained by the first spacer 184 abutting the second axial rim face 186 and the second spacer 198 abutting an axial inner race face 216 of the bearing 200. In some example embodiments, the axial length of the torque limiter 192 can be adapted to accommodate application-specific operational requirements. The form factors of, for instance, the fourth axial segment 188 of the gearbox shaft 104 and/or the annular surface 210 of the worm gear 105 can be scaled or sized accordingly to cooperate with the axial length (or other dimensions) of the torque limiter 192. For instance, if the axial length of the example torque limiter 192 is altered between about 25 mm and about 39 mm (or increased/decreased some other defined amount/dimension), the fourth axial segment 188 of the gearbox shaft 104 and/or the annular surface 210 within the central bore 208 of the worm gear 105 can be resized accordingly to establish the desired engagement and overlap at the interfaces between the torque limiter 192 and the gearbox shaft 104 and the worm gear 105.

With additional reference to FIGS. 8-12, further details of the example torque limiter 192 and its operation are described in more detail. Given the benefit of this disclosure, one skilled in the art will appreciate the various compatible torque limiters that may be adapted for use depending on, for example, application-specific parameters. For instance, while the example torque limiter 192 is in the form of a torque collar incorporating frictional forces and material properties (e.g., elasticity and hardness) to obtain desired operational torque-limiting characteristics, the torque-limiting functionality of a torque limiter may be accomplished by clutch-based couplings (e.g., cones, plates, etc.) employing friction surfaces/materials and spring force, fluid-based viscous couplings, and other conventional devices that allow relative slip or movement between surfaces when a relative force differential is applied.

In some forms, the example torque limiter 192 is configured to establish a minimal difference between the initial static torque required to initiate slipping relative to the torque limiter 192 and a running or dynamic torque differential to maintain the slip condition. When the static to dynamic value is nearing the idealized 1:1 ratio, the shock, impact, and/or acceleration/deceleration that occurs during a transition between a synchronized rotational condition and a relative slip condition is also minimized. Furthermore, minimizing the difference between a slip torque value and a running torque value results in transition dynamics that impart lesser stresses and wear on the various components. A static to dynamic torque ratio closer to 1:1 also reflects a lower initial peak delta torque between the initial static breakaway torque and the running torque. In addition, the example configuration of the torque limiter 192 also helps to minimize variability between transitional slip events that can result, at least in part, from time-dependent factors (e.g., a long duration, period, or dwell between delta torque events that are sufficient enough to result in a slip condition). Further still, operational performance of the torque limiter 192 can be enhanced by use of a torque limiter having an axially longer form factor (e.g., an axial length as comparted to a nominal diameter), such that a similar overall compressive force is distributed over a larger interface area. In one form, an axial length of a torque limiter is about 0.25 to 2 times (and preferably about 0.5 to 1.5 times in some embodiments) the nominal diameter of the torque limiter (e.g., from an imaginary central axis to an imaginary ring positioned approximately between the radially outermost surface and radially innermost surfaces of the torque limiter).

Figure 29:
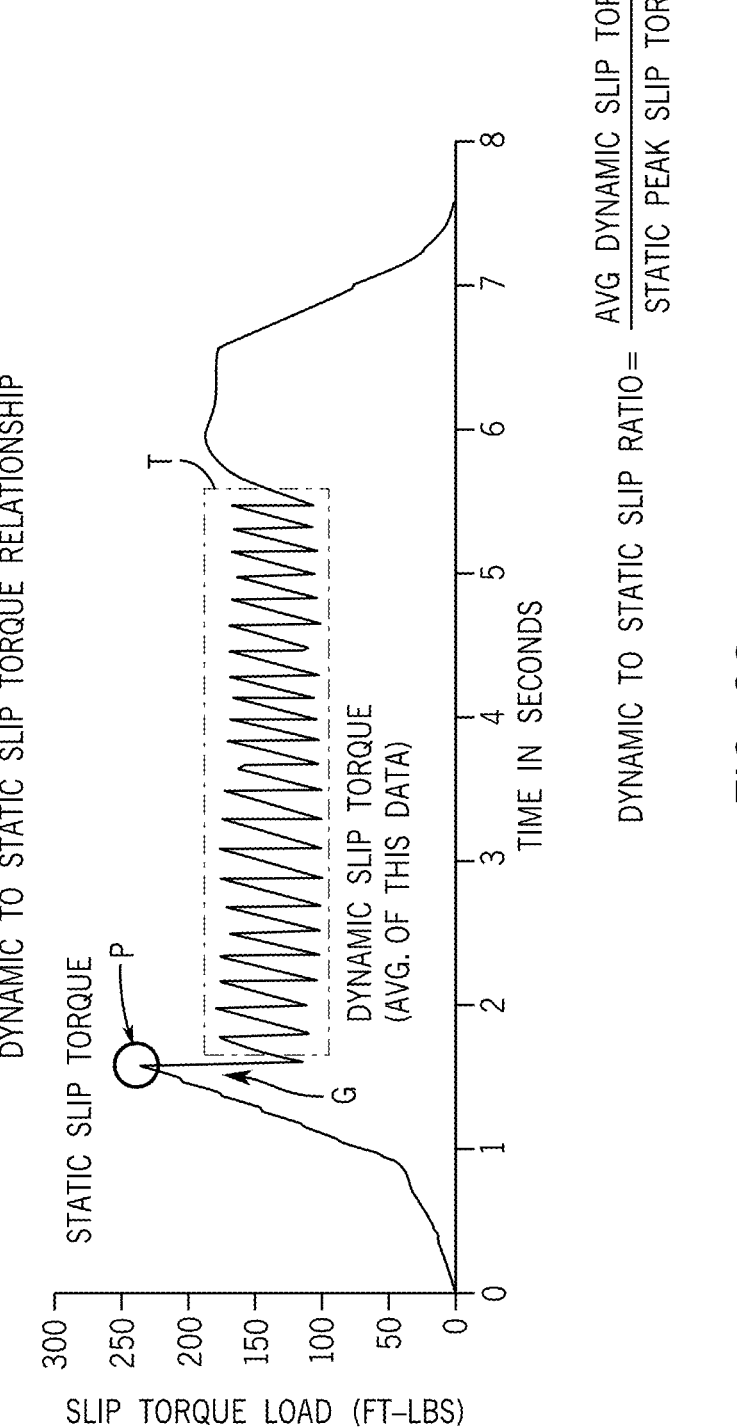
FIG. 29 is an example plot of conventional dynamic-static slip torque relationships.

With reference to FIG. 29, an example plot of conventional dynamic-static slip torque relationships are graphically illustrated, such as what may occur with use of a cone clutch. An initial static slip torque occurs at peak P. The running or dynamic torque is often quite variable, cycling between a wider range (e.g., the upper-most value being about four times the lower-most value). An approximate average value of the dynamic slip torque can be determined by optionally excluding an initial transitory gap G (e.g., 0.2 seconds between the initial static slip point peak P and the oscillatory dynamic slip torque data measurements) and averaging data over a period of time T (e.g. ~4 seconds). In some example arrangements, the dynamic-to-static slip torque ratio can be approximately below 60% (i.e., a percentage representation of average dynamic slip torque/static peak slip torque). While operable, this ratio is below the idealized 1:1 (i.e., 100%). In addition, the large range of cyclical variability of the measured dynamic slip torque is not ideal and can result in jerky, fluctuating movement of any coupled components (e.g., an output shaft) imparting undesirable stresses. Even if the dynamic slip torque oscillations subside over time, the example approximately two second period of variable response displaying a wider range of torque can inhibit desired operation. Of course, given the benefit of this disclosure, one skilled in the art will appreciate the various alternatives and modifications within the scope of the invention that are available to approximate the ratio.

Figure 30A:
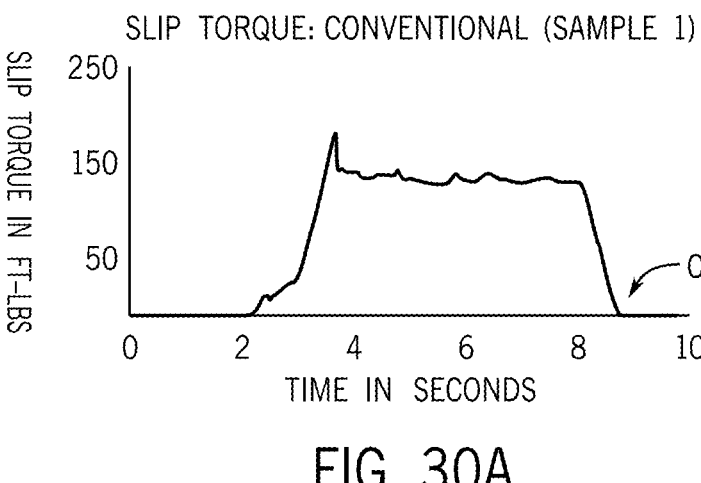
FIGS. 30A, 30B, and 30C are example plots of three conventional dynamic-static slip torque data sets.
Figure 30B:
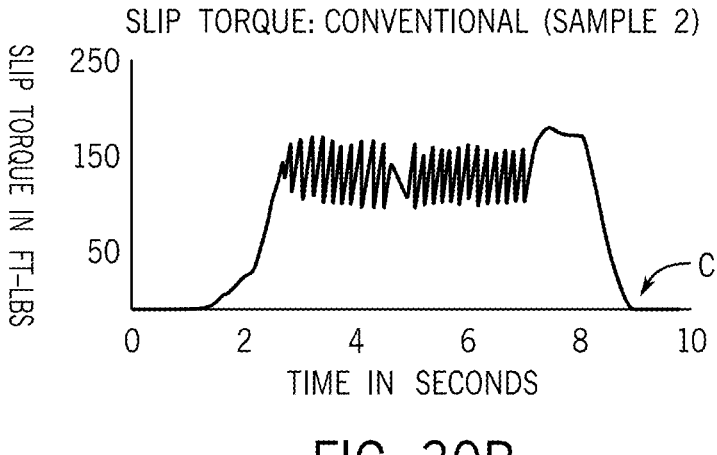
Figure 30C:
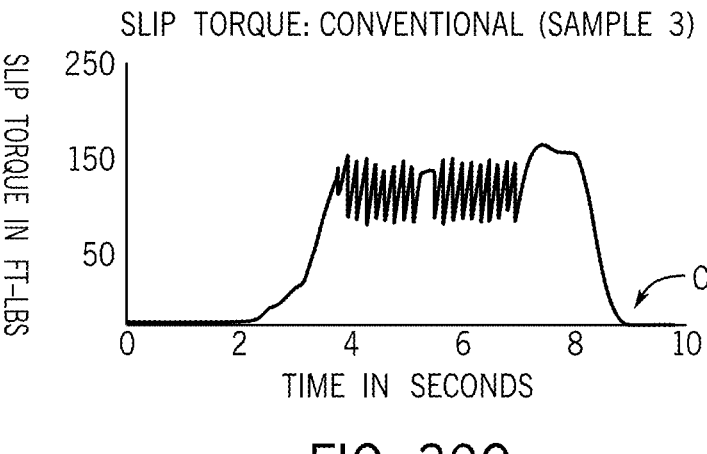
Figure 31A:
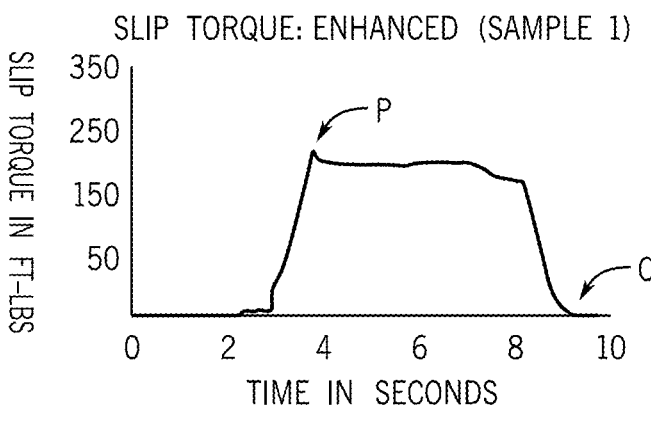
FIGS. 31A, 31B, and 31C are example plots of three enhanced dynamic-static slip torque data sets.
Figure 31B:
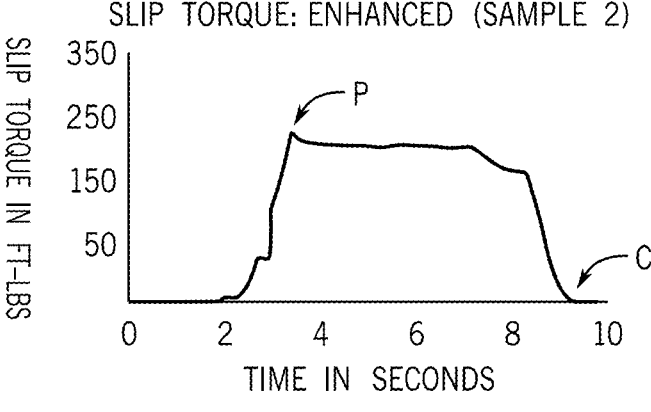
Figure 31C:
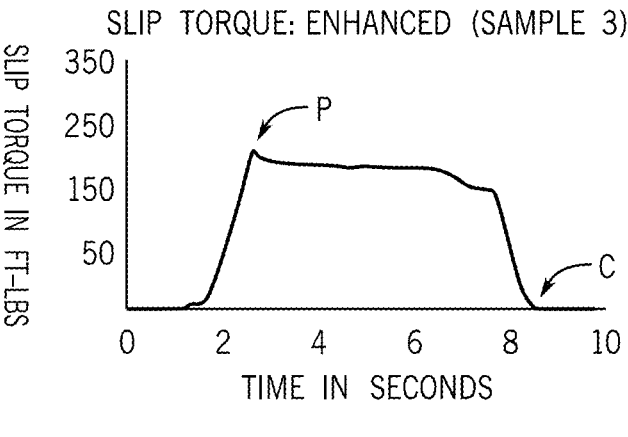

With additional reference to FIGS. 30A, 30B, and 30C, example plots of conventional dynamic-static torque slip data sets are graphically illustrated. These plots show, for instance, the wider range of slip torque values between the static peak and the dynamic period, as well as within the dynamic response period. Turning to FIGS. 31A, 31B, and 31C, example plots of enhanced dynamic-static slip torque data sets (such as those obtained by use of the example torque limiter 192) are illustrated. As shown, the delta or difference between the initial static slip torque peak P and the subsequent period of running or dynamic torque is minimized to approach the idealized 1:1 ratio (i.e., 100%). The overall response is also appreciably flatter and settles into the average dynamic slip torque value within a shorter period after the static slip torque peak P. The slip torque variability can be reduced at least in duration, frequency, and/or range (e.g., upper and lower bounds of deviation are reduced). In addition, the transition between a slip condition and a coupled condition can be smoother and more gradual, as generally reflected by the larger radius curve segment C illustrated as the slip torque transitions toward 0 ft-lbs in each of the plots (e.g., compare sharper curve segment C in FIG. 30A to curve segment C in FIG. 31A).

In some embodiments, the example torque limiter 192 is configured to be used with a grease-based lubricant, such as MOLYKOTE® P-1500 (DuPont de Nemours, Inc.) and other lubricants with similar application-specific properties. The grease can be applied to the torque limiter 192 as mounted between the gearbox shaft 104 and the worm gear 105. In addition, in some embodiments, an oil-based lubricant, such as synthetic polyalkylene glycol (PAG) ISO VG220 including MOLYKOTE® L-2122 Synthetic Gear Oil—ISO VG 220 (DuPont de Nemours, Inc.) and other lubricants with similar application-specific properties, is introduced into the interior 108 of the housing 106. Notably, it has been found that the oil-based lubricant does not appreciably wash out or hamper the operability of the grease-based lubricant, such that the desired lubrication properties of each type of lubrication are realized within the gearbox assembly 100. Additionally, the entire contents of the example gearbox assembly 100 (including the torque limiter 192) may be lubricated primarily or only with oil, such as synthetic polyalkylene glycol (PAG) ISO VG220 including MOLYKOTE® L-2122 Synthetic Gear Oil—ISO VG 220 (DuPont de Nemours, Inc.) and other lubricants with similar application-specific properties, for simplified assembly. The use of oil-based lubrication between the torque limiter 192 and the gearbox shaft 104 can aid achieving a lower slip torque as comparted to use of grease-based lubricants.

In the example embodiment, the example torque limiter 192 is positioned between the central bore 208 of the worm gear 105 and the gearbox shaft 104 to operably rotationally couple the worm gear 105 and the gearbox shaft 104 when a relative net torque between the worm gear 105 and the gearbox shaft 104 about the gearbox shaft axis 146 is below a maximum torque. That is, the torque limiter 192 can be configured to inhibit relative rotation between, for instance, the worm gear 105 and the gearbox shaft 104 when a relative net torque between the worm gear 105 and the gearbox shaft 104 about the gearbox shaft axis 146 is below a maximum torque. And the torque limiter 192 can be configured to permit relative rotation (e.g., slip) between the worm gear 105 and the gearbox shaft 104 when the relative net torque between the worm gear 105 and the gearbox shaft 104 is above the maximum torque. From a practical application standpoint, when the force (e.g., net torque) is at the maximum torque, the components can typically be transitioning between the static and dynamic relative states (e.g., beginning to slip or beginning to sync). The maximum torque can be influenced by various design parameters. For instance, the material properties and surface finishes of the worm gear 105, the gearbox shaft 104, and the torque limiter 192 interact statically and dynamically to influence the maximum force and torque that can be transferred by the engagement. In addition, the relative sizing of the components, especially at or adjacent to the interface surfaces, can influence the force/torque transfer characteristics and dynamics. Moreover, the presence, absence, quality, quantity, temperature, etc. of lubricants can also influence the maximum torque, as well as other environmental conditions, such as the ambient temperature and humidity within which the torque limiter is operating. As discussed, in one embodiment oil and grease are used as combined lubricants. The example net applied torque can be considered the combined resultant torque that the gearbox assembly 100 is transferring. For instance, an input force applied to rotate the worm shaft 102 can be summed (e.g., additive and/or subtractive) with the internal resistive forces of the gearbox assembly 100 and the resistive forces of a component coupled to and driven by the gearbox shaft 104 to determine a net applied torque.

In some embodiments, the gearbox assembly 100 may include the example torque limiter 192 to prevent or inhibit excessive force or torque transfer to an operably coupled motor or internal/external drivetrain component(s). In other forms, the form factors and engagement of the worm shaft 102 and the worm gear 105 establish a self-locking configuration that inhibits back driving of an operably coupled motor. This can be accomplished when the gear reduction of the worm shaft 102 and the worm gear 105 are sufficiently high, such as for example a 43:1 reduction. Given the benefit of this disclosure, one skilled in the art will appreciate the various other application-specific ratios/reductions generally establishing the self-locking configuration. In other forms, a one-way clutch or brake device can be incorporated to aid operation of the torque limiter to inhibit back driving of a coupled motor. Given the benefit of this disclosure, one skilled in the art will appreciate the desired and alternative placement of a torque limiter 192 within the overall system (e.g., the combined gearbox assembly and operably coupled motor) to effectively define one or more desired slip locations (i.e., where the drivetrain will be dynamically decoupled when the torque characteristics meet the design parameters).

The example torque limiter 192 is in the form of a split ring defining a gap 218 between opposite ends 220. The nominal inner and outer diameters of the torque limiter 192 can be adapted to provide the desired interface engagements. For example, the nominal inner diameter of the torque limiter 192 can be sized smaller than the nominal fourth diameter 190 of the fourth axial segment 188 of the gearbox shaft 104. In one embodiment, the nominal inner diameter of the torque limiter 192 relative to the nominal fourth diameter 190 dimension is about 1% to 10% less, and can be adapted to achieve application-specific parameters. The torque limiter 192 includes multiple contours 222 that, in the example embodiment, can define protrusions 224 that extend generally radially outward from an outer surface 226 of the torque limiter 192. The contours 222 can also define corresponding dimples 228 that extend generally radially outward from an inner surface 230. The example protrusions 224 define substantially arcuate central surfaces 232 between respective arcuate end surfaces 234. A radiused base 236 is formed where the protrusion 224 departs from the outer surface 226. In some examples, the nominal outer diameter of the torque limiter 192 (as defined by the diameter of an imaginary circle that is generally tangential to the radially outermost central surfaces 232 of the protrusions 224) relative to the nominal inner diameter of the central bore 208 of the worm gear 105 is about 1% to 10% greater, preferably about 1.5% in some embodiments.

The relative material properties and sizing between, for example, the fourth diameter 190 of the gearbox shaft 104, the torque limiter 192, and the central bore 208 of the worm gear 105, can be configured to interact and establish the nominal maximum torque that can be transmitted via the torque limiter 192. With specific reference to FIG. 8, a portion of the example worm gear 105 is shown after engagement with the example torque limiter 192. As shown, in use the protrusions 224 of the torque limiter form grooves 238 in the inner surface 210 of the central bore 208. The grooves 238 extend from a chamfered insertion edge 240 and along the central bore 208 with, in one example embodiment, preferably substantially parallel side edges 239. In some embodiments, the grooves 238 have a maximum depth from the inner surface 210 of about 180-300 micrometers, with other depths being available based on application-specific considerations. More consistent slip torque dynamics have been observed when the grooves 238 define relatively consistent grooves (e.g., minimizing steps, tappers, or other inconsistencies along the side edges 239 or depth of the grooves 238). In some forms, the grooves 238 provide more advantageous formfactors when formed in a powder metal (e.g., FC-0208-50) as comparted to a ductile iron (e.g., 80-60-03). The grooves 238 are generally shaped to reflect the inverse of the central surfaces 232 of the protrusions 224. The chamfered insertion edge 240 also aids insertion of the torque limiter 192, as the contours 222 are engaged with the inner surface 210 of the central bore 208. The example contours 222 can form the grooves 238, such that the protrusions 224 of the torque limiter 192 are seated and restrained in the grooves 238 to inhibit relative rotation between the torque limiter 192 and the worm gear 105 female/outer component. In the example embodiment, therefore, the torque limiter 192 is configured to move or slip relative to the gearbox shaft 104 (e.g., relative to the outer surface 187 of the fourth axial segment 188 of the gearbox shaft 104). Given the benefit of this disclosure, one skilled in the art will appreciate that the relative coupling and configuration can be adapted. For instance, the contours 222 can be inverted, such that the protrusions 224 extend radially inward to restrain the torque limiter 192 and the gearbox shaft 104, with the torque limiter 192 being configured to slip relative to the worm gear 105.

The torque limiter 192 can also be adapted to establish application-specific coupling/slipping characteristics. For instance, the contours 222 and relative interfaces with the example gearbox shaft 104 and worm gear 105 can be configured to provide a dynamic-to-static slip torque ratio approximately greater than 0.5, greater than 0.6, greater than 0.8, and greater than 0.9. The contours 222 of the example torque limiter 192 (i.e., torque collar) are configured to resiliently compress nominally radially inward (e.g., with the elastic material property range) when engaged between the annular inner surface 210 of the worm gear 105 and the outer surface 187 of the fourth axial segment 188 of the gearbox shaft 104.

During use the torque limiter 192 is configured to allow force, such as torque, to be transferred via the torque limiter 192 when the applied force is below a maximum amount. When the applied force exceeds the maximum amount, the torque limiter 192 functions to allow relative slip (e.g., rotation) between mating components, which inhibits more than the maximum amount of force from being transferred between mating components. During this relative movement or slip, the torque limiter 192 is also providing a resistive force (e.g., drag) that operates to return the system to a state of synchronized movement or rotation of the particular components coupled via the torque limiter 192. In the example gearbox assembly 100, the torque limiter 192 can be configured to limit the amount of force transferred between the worm shaft 102 and the gearbox shaft 104, whether the force is applied or resisted via the worm shaft 102, the gearbox shaft 104, some combination of the worm shaft 102 and the gearbox shaft 104, and/or as a result of internal resistance within the gearbox assembly 100 (e.g., resulting from an internal malfunction or component failure). In some embodiments, an input torque can be applied at one end of the worm shaft 102, such as by a shaft driven by an electric motor. The opposite end of the worm shaft 102 may be connected by another shaft to, for instance, another gearbox assembly. The input torque is transferred to the worm gear 105 and, provided it remains below a maximum force or torque, is further transferred via the torque limiter 192 to the gearbox shaft 104.

The gearbox shaft 104 can be coupled with any number of components to impart the applied force. For instance, the gearbox shaft 104 can be operably engaged with transmission components of wastewater treatment processing equipment and systems, conveyor equipment and systems, augers/mixing equipment and systems, winching equipment and systems, and semi-trailing loading dock retention equipment and systems. In addition, the gearbox assembly 100 can be used in context of solar panel tracker systems that adjust the orientation of photovoltaic panels to efficiently track or align the panel with rays of the Sun. Solar panel tracker systems are often grouped into large farms or arrays, where a single prime motor is linked via a drivetrain to discrete rows of panels. In some arrangements, the gearbox assembly 100 can be operably configured at each adjacent row to both transfer forces between adjacent gearboxes and also adjust the orientation or the clock position of solar panels via a rotatable mounting structure operably coupled to receive torque from the gearbox shaft 104. As appreciated by one of ordinary skill, forces relevant to the gearbox assembly 100 and the integrated torque limiter 192 include, for instance, the applied motor torque, internal resistive forces, and external forces (e.g., wind and snow loads on the solar panels). The gearbox assembly 100, and particularly the torque limiter 192, can be configured to limit the maximum net torque to reduce the potential for undesirable stresses, which can impact the operability and/or the functionality of the gearbox assembly 100 and/or an overall system in which the gearbox assembly 100 is integrated.

Figure 13:
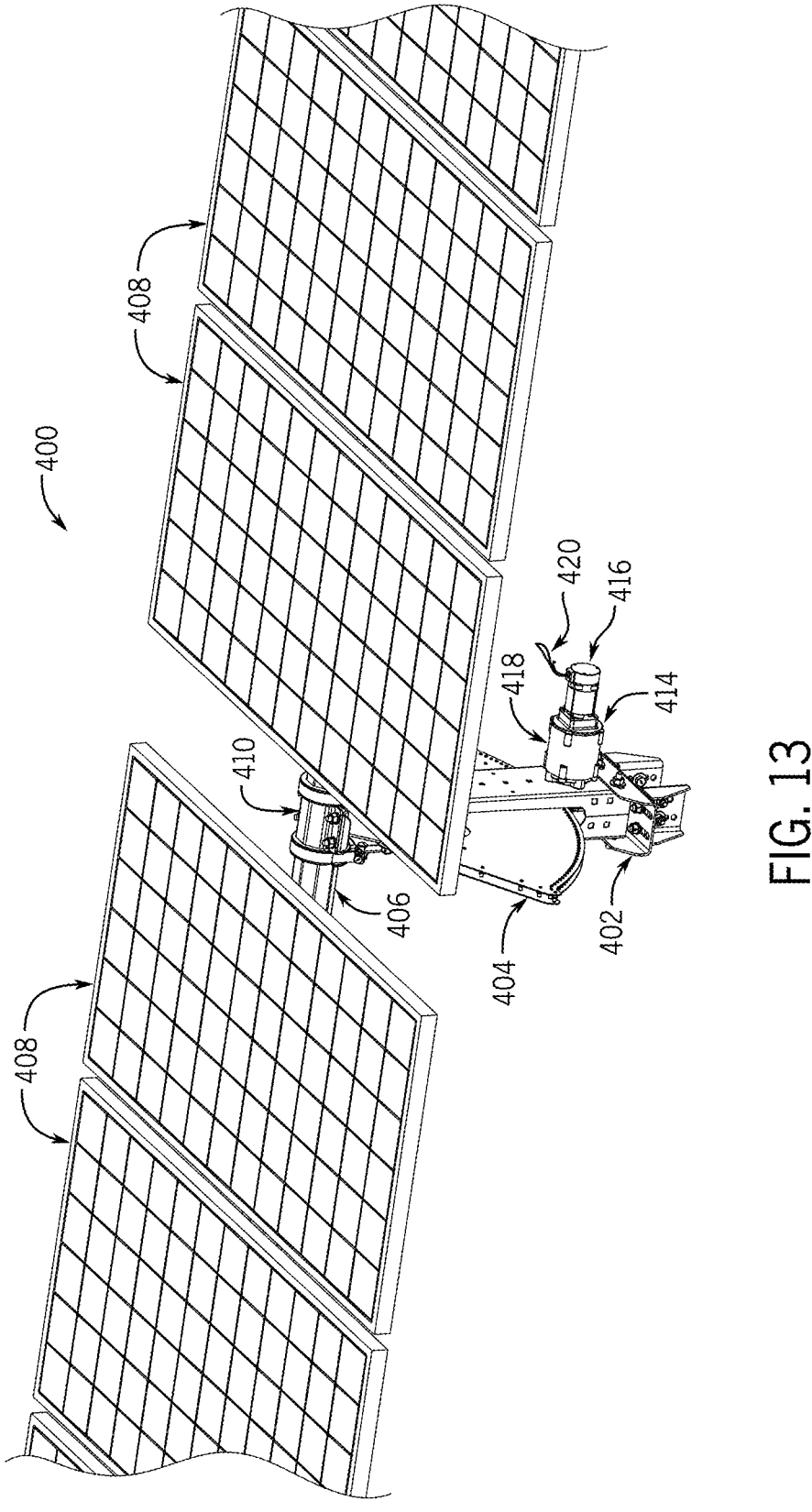
FIG. 13 is an isometric view of an example gearmotor assembly in an example application environment.
Figure 14:
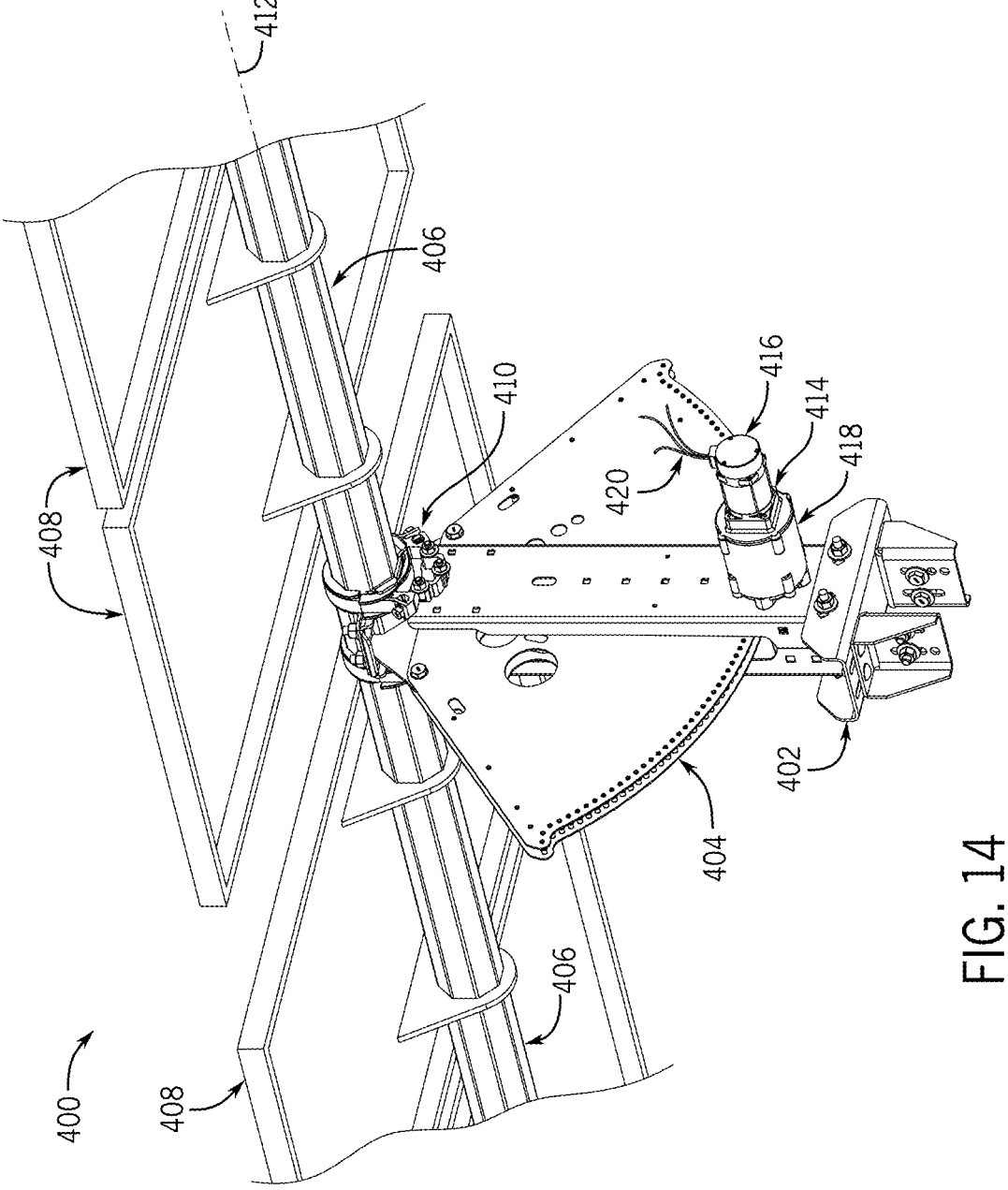
FIG. 14 is an isometric view of the example gearmotor assembly shown in FIG. 13.

An example solar panel tracker system 400 is illustrated in FIGS. 13 and 14. The example solar panel tracker system 400 includes a support structure 402, a pivot gear 404, support tubes 406, and solar panels 408. The support structure 402 can be a post or other structure configured to establish a secure mount or anchor for the overall solar panel tracker system 400. The pivot gear 404 includes an upper coupling 410 rotatably coupled with and relative to the support structure 402. In the example shown, the support tubes 406 extend from the upper coupling 410 and support multiple solar panels 408. As a result, when the pivot gear 404 is urged in either direction about a tracker pivot axis 412, the support tubes 406 and the coupled solar panels 408 selectively move to, for instance, track rays of the Sun to enhance the functionality of the solar panels 408. In some embodiments, the pivot gears 404 (or similar mechanisms) of multiple discrete rows of solar panel tracker systems can be mechanically linked, such that the solar panels 408 can be adjusted by a single input (e.g., by a single electric motor). This type of centralized control and adjustment can be facilitated, for instance, by the gearbox assembly 100 (e.g., shown in FIG. 1).

Figure 15:
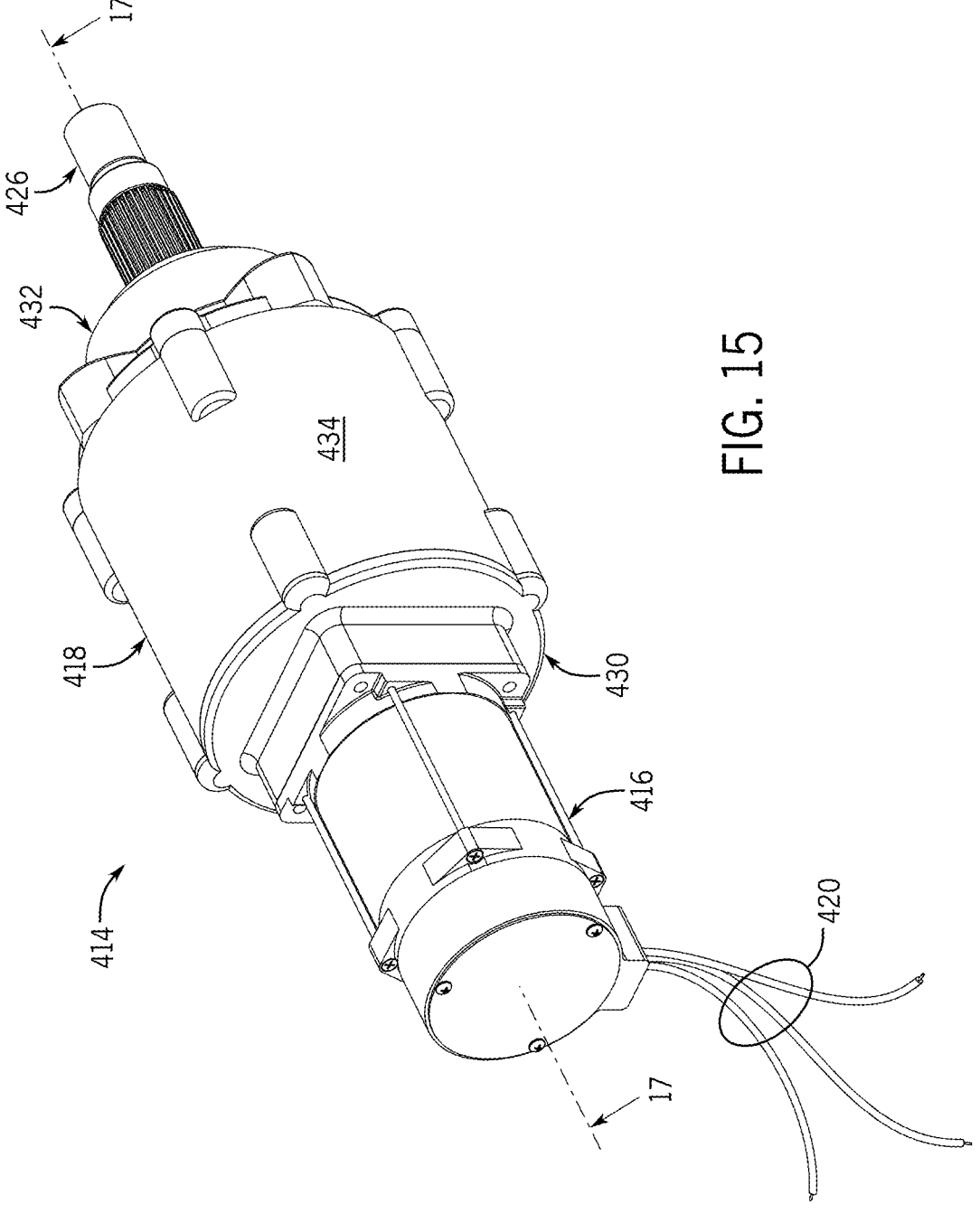
FIG. 15 is an isometric view of the example gearmotor shown in FIG. 13.
Figure 16:
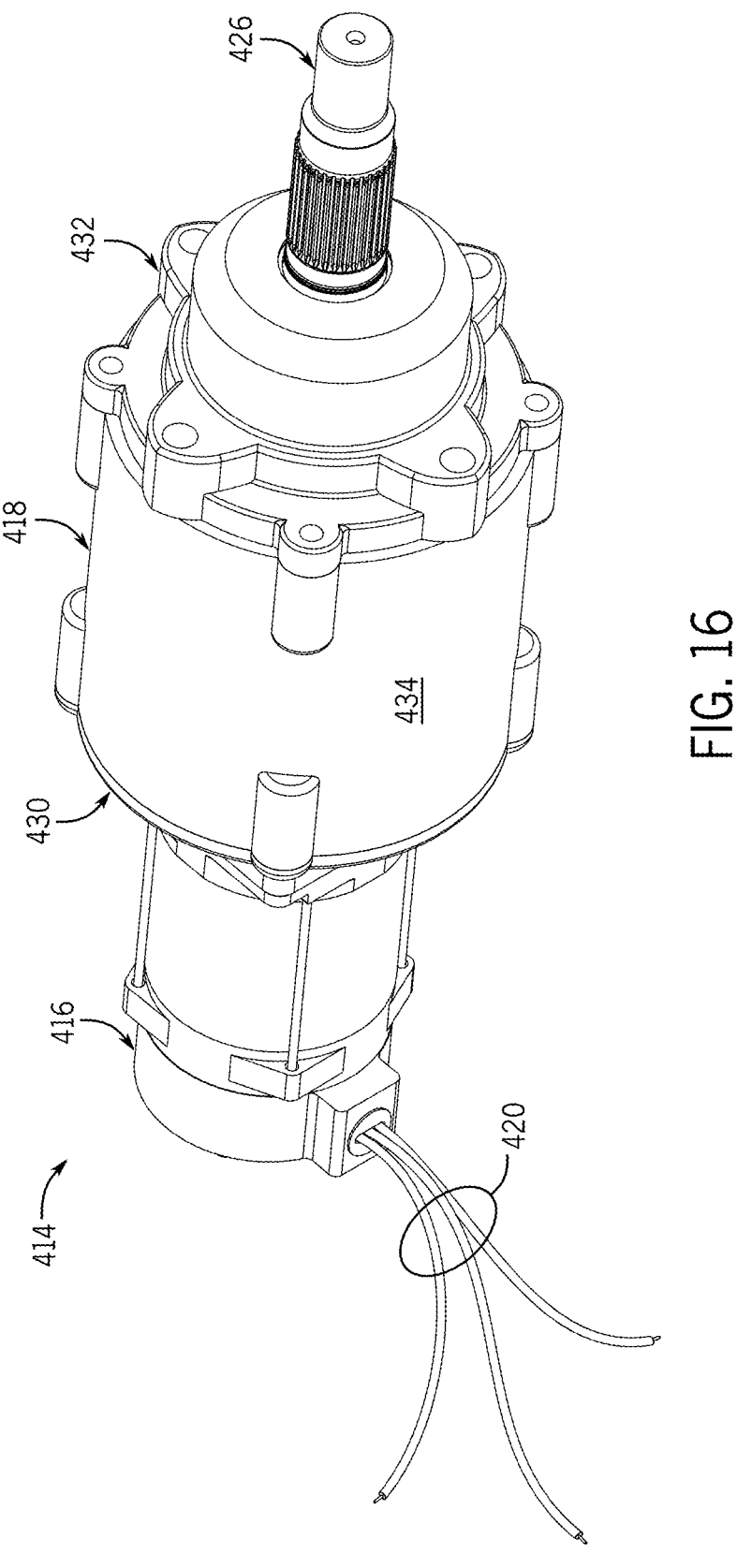
FIG. 16 is an isometric view of the example gearmotor shown in FIG. 15.
Figure 17:
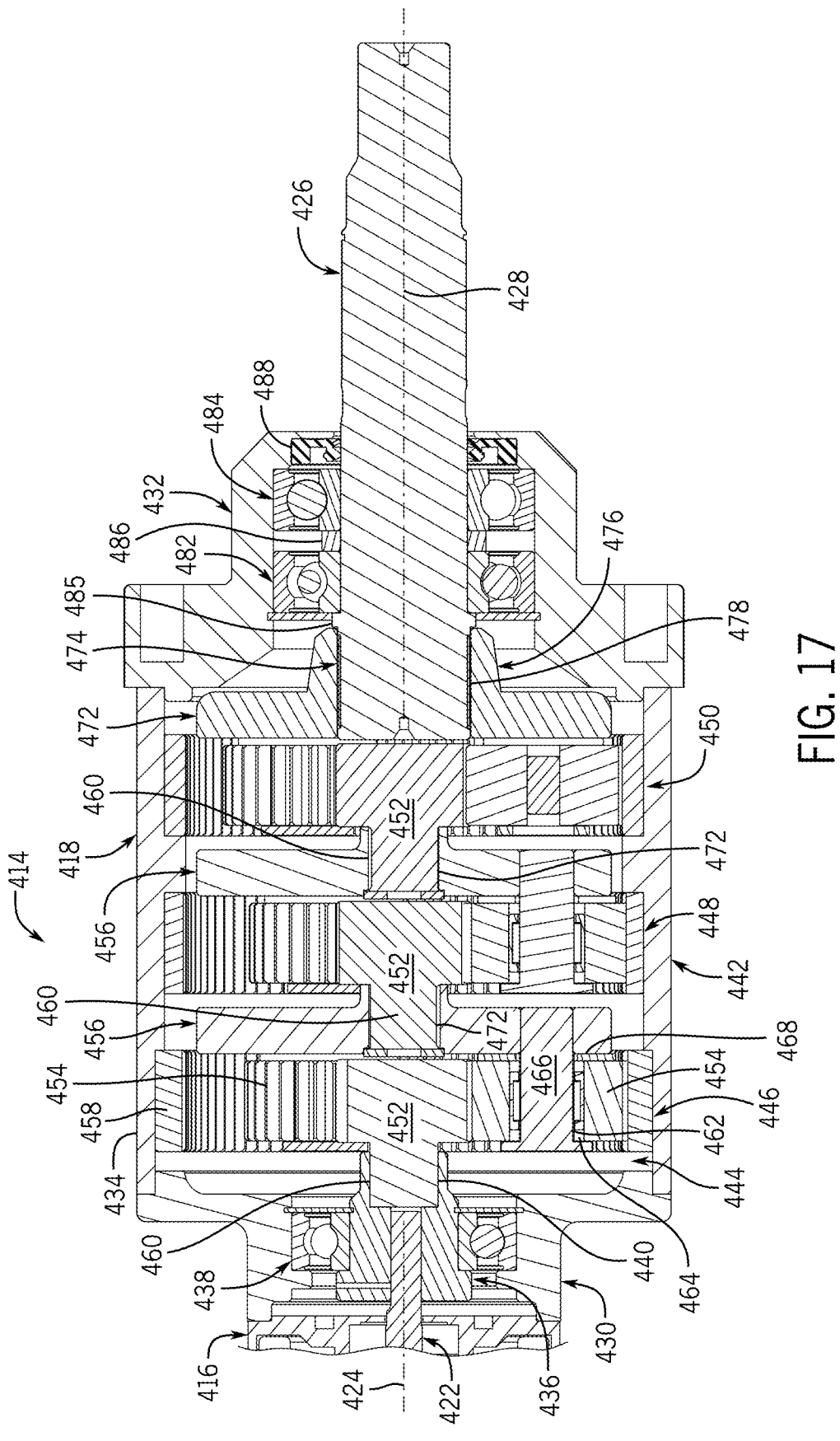
FIG. 17 is a plan partial section view taken along line 17-17 shown in FIG. 15.
Figure 18:
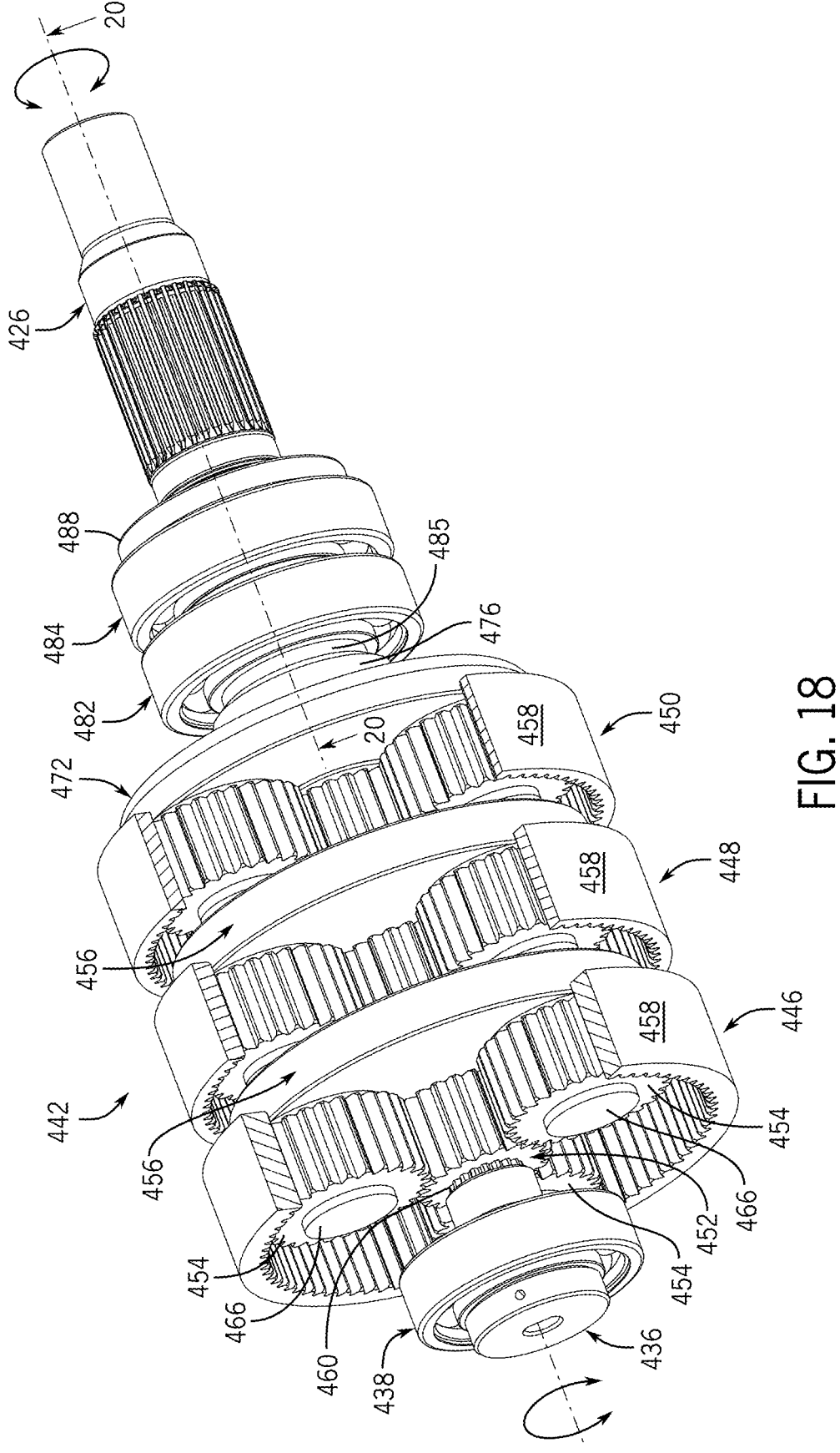
FIG. 18 is an isometric partial section view of an example reduction gear assembly of the example gearmotor shown in FIG. 15.
Figure 19:
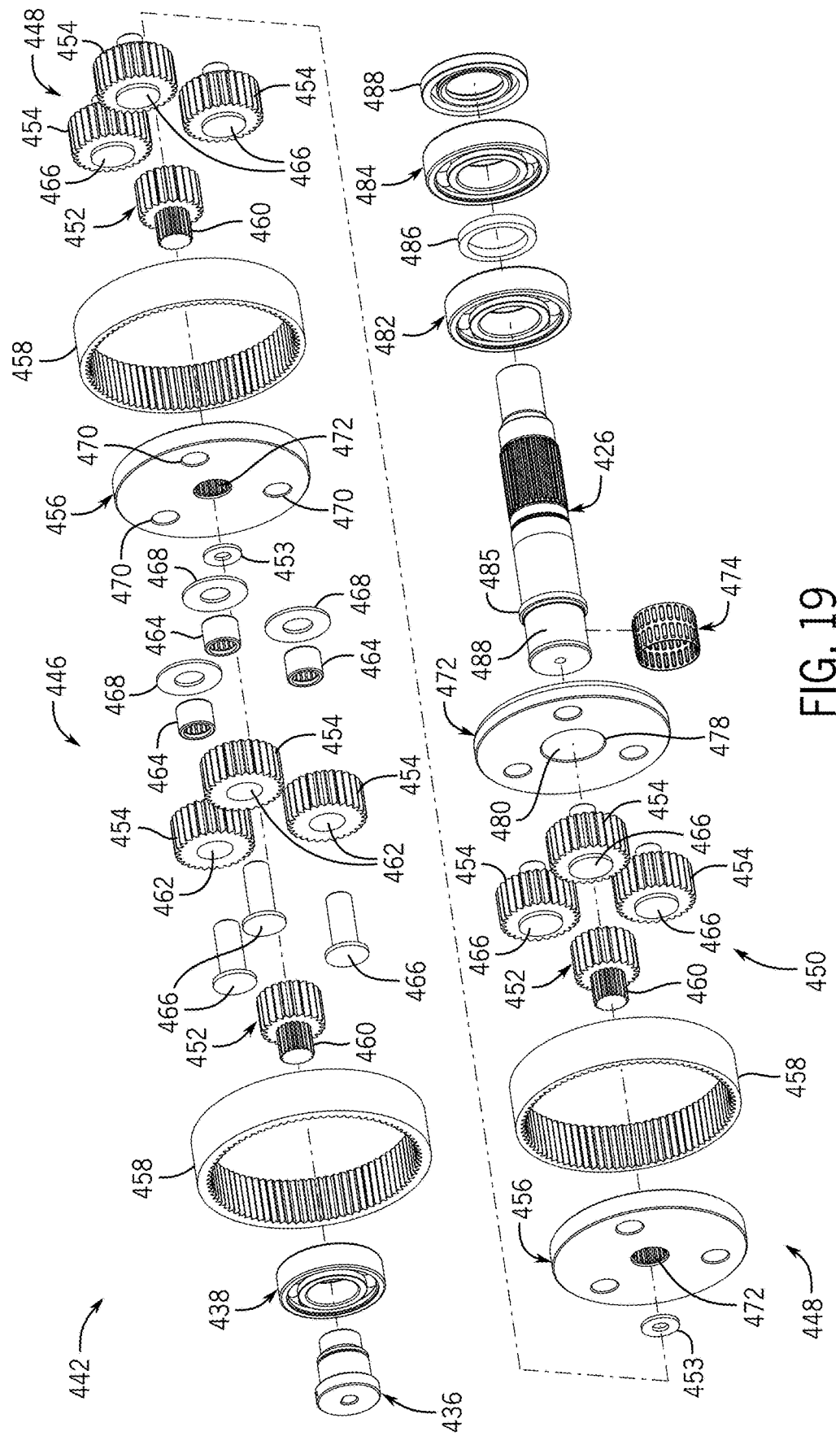
FIG. 19 is an isometric exploded view of the example reduction gear assembly shown in FIG. 18.
Figure 20:
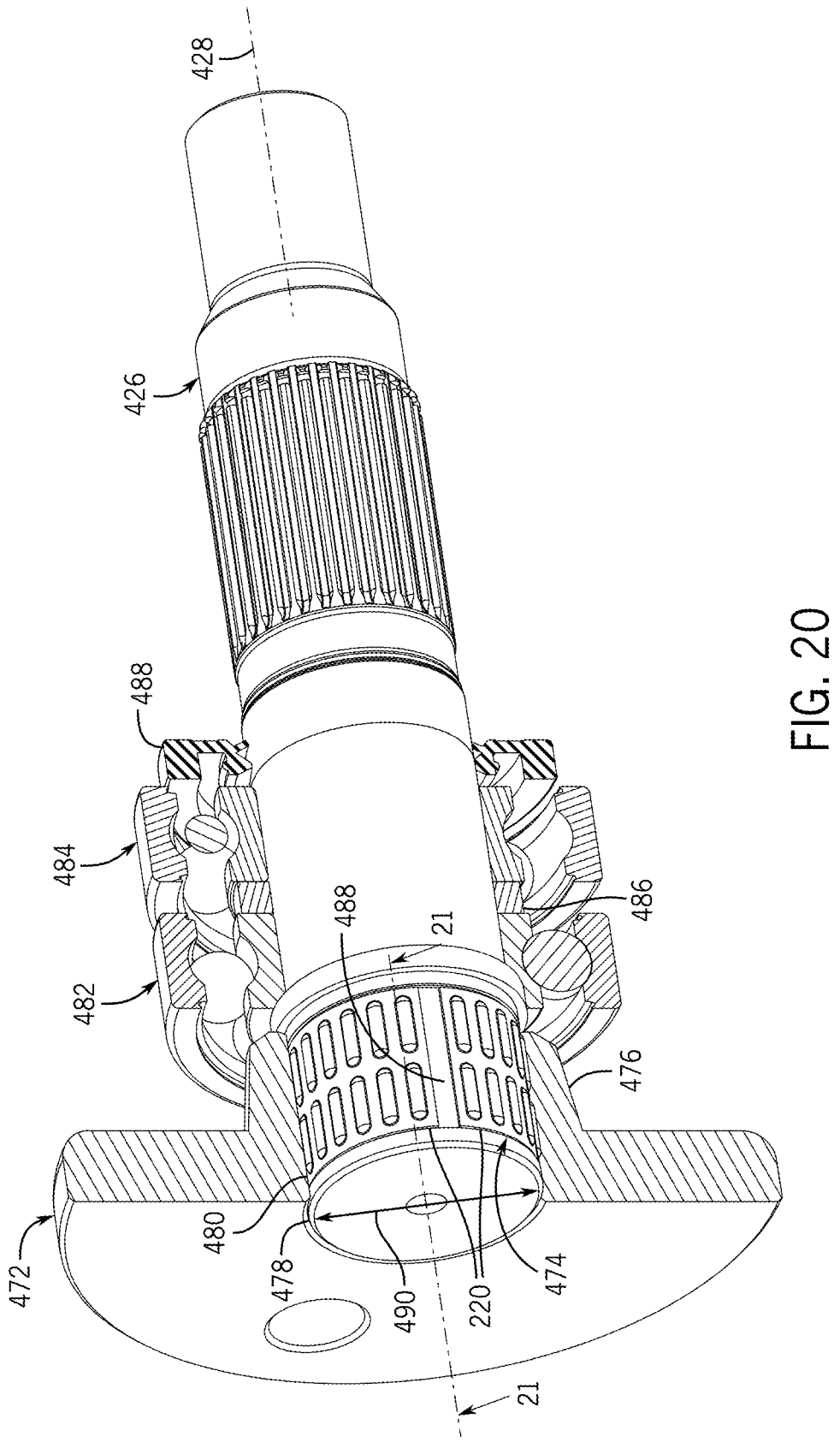
FIG. 20 is an isometric partial section view taken along line 20-20 shown in FIG. 18.
Figure 21:
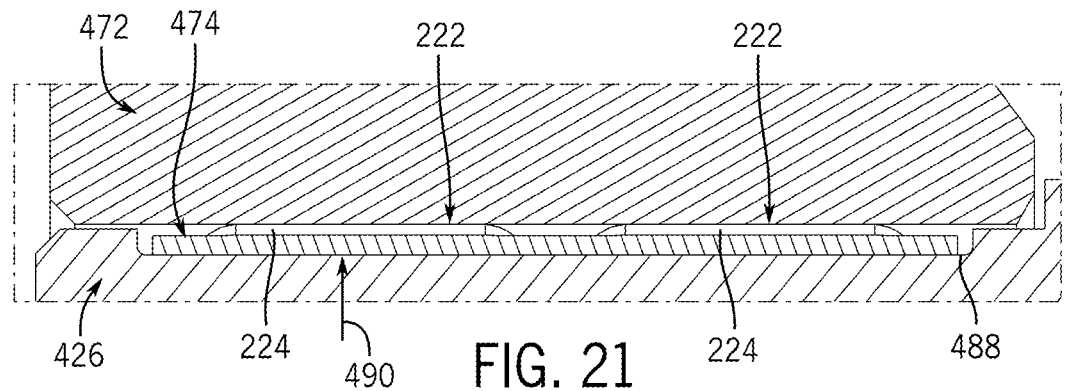
FIG. 21 is a plan detail section view taken along line 21-21 in FIG. 20.
Figure 22:
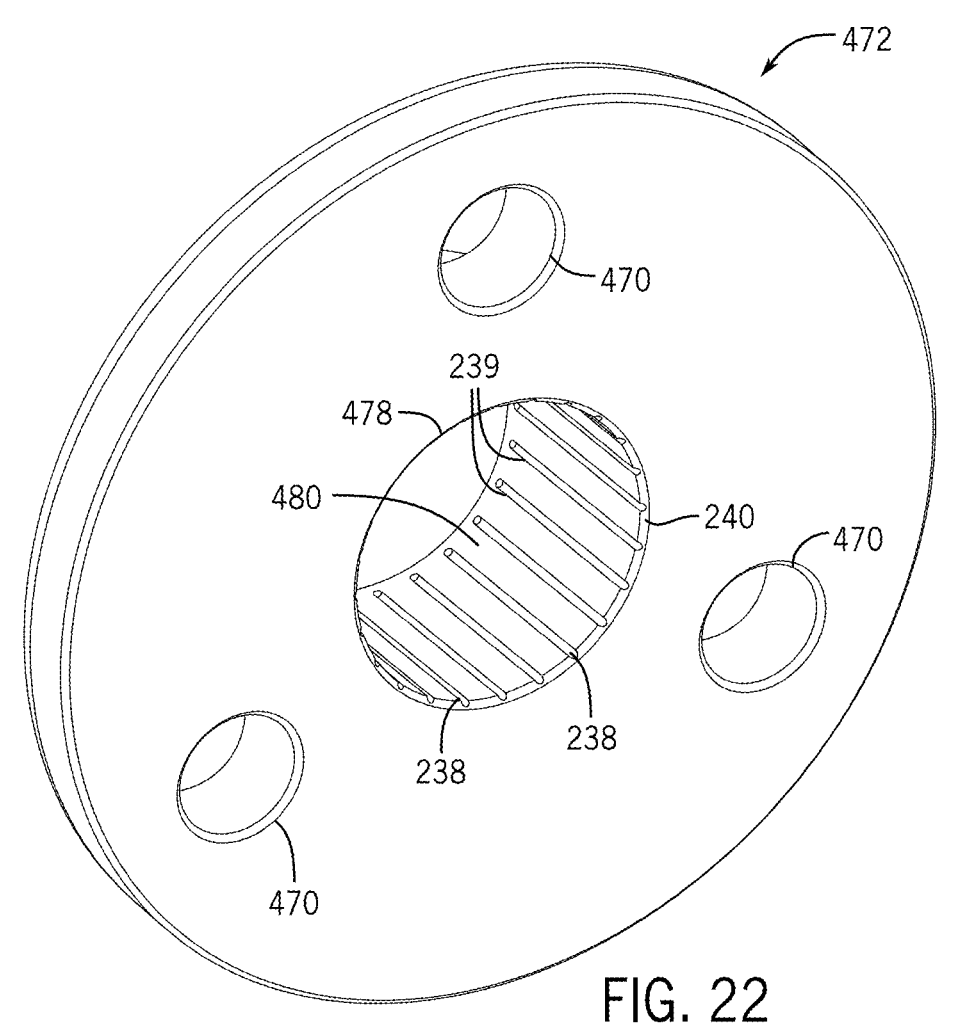
FIG. 22 is an isometric view of an example planet carrier of the example reduction gear assembly shown in FIG. 18.
Figure 23:
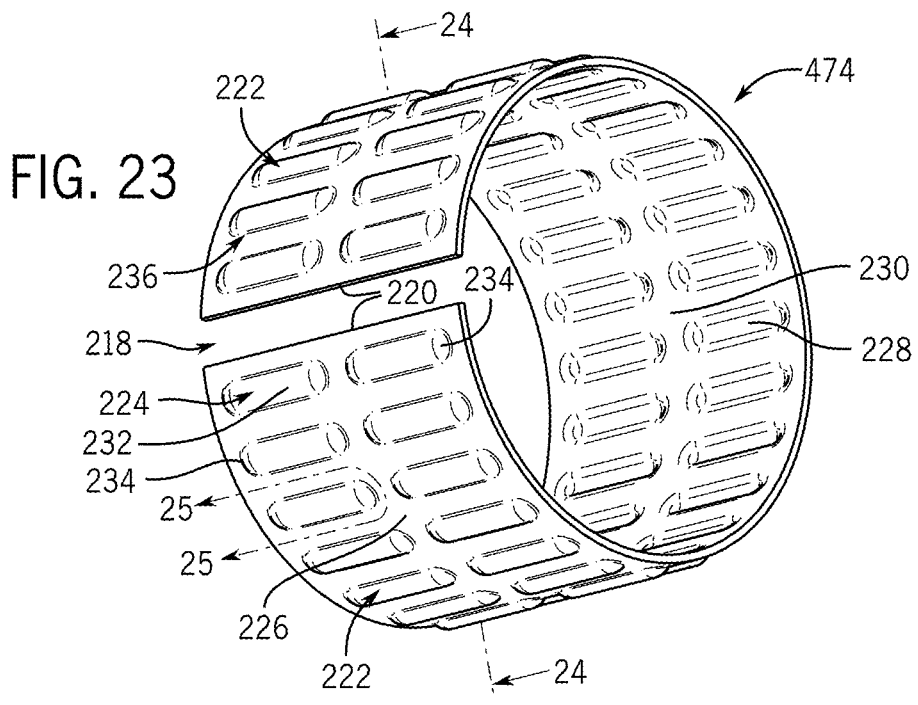
FIG. 23 is an isometric view of an example torque limiter of the example reduction gear assembly shown in FIG. 18.
Figure 24:
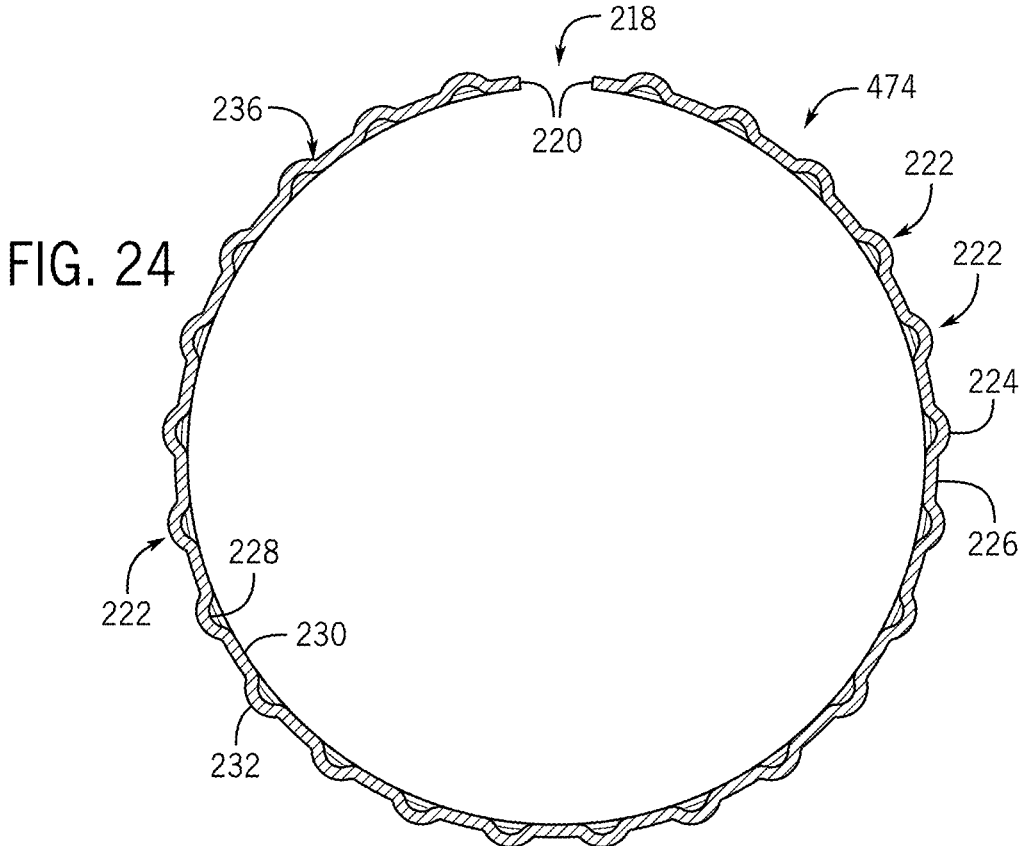
FIG. 24 is a plan section view taken along line 24-24 shown in FIG. 23.
Figure 25:
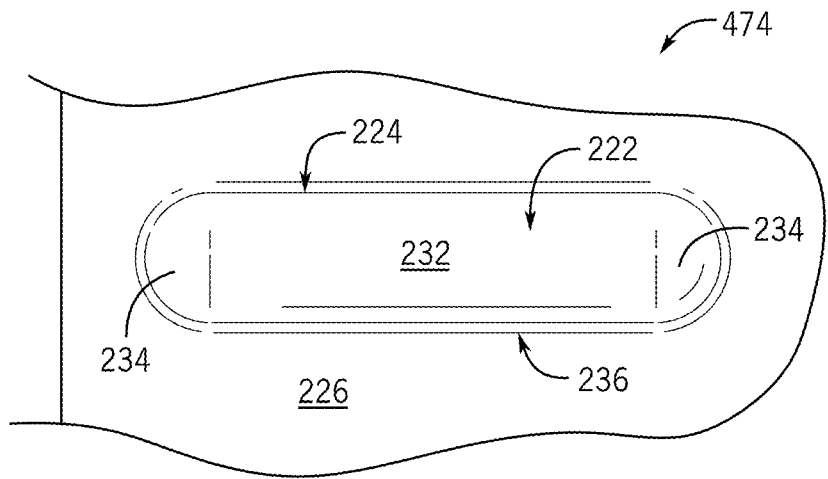
FIG. 25 is a plan detailed view of the area circumscribed by arc 25-25 shown in FIG. 23.
Figure 26:
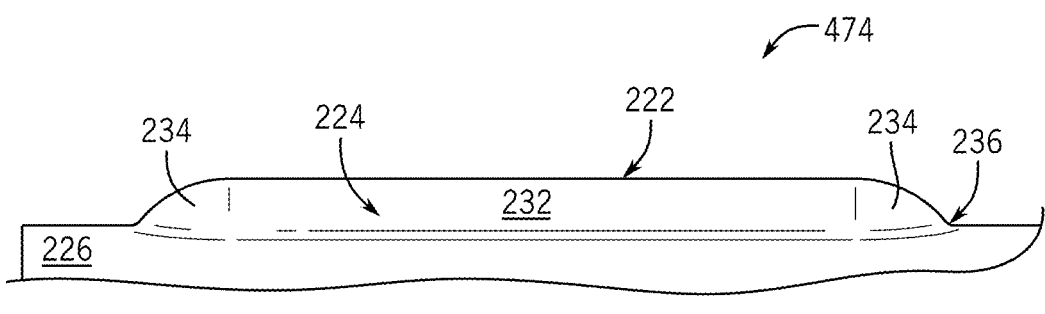
FIG. 26 is a plan detailed view of the area shown in FIG. 25.

With additional reference to FIGS. 15 and 16, a more decentralized or discrete solar panel tracker system 400 can be accomplished with the incorporation of an example gearmotor assembly 414. The gearmotor assembly 414 can be, in some embodiments, mounted to the individual support structures 402 and operatively coupled to the pivot gear 404. For example, the gearmotor assembly 414 can be bolted to the support structure 402 and operably engaged (e.g., via a pinion gear) with the pivot gear 404. The example gearmotor assembly 414 can also be used in a variety of other applications. For example, an example gearmotor assembly 414 can be incorporated in a gearmotor system such as those found in wastewater treatment processing equipment and systems, conveyor equipment and systems, augers/mixing equipment and systems, winching equipment and systems, and semi-trailing loading dock retention equipment and systems. The gearmotor system can include a driven assembly including a support structure (e.g., support structure 402) and a driven member (e.g., the pivot gear 404 and coupled support tubes 406 with solar panels 408) operably coupled to the support structure to move relative to the support structure in at least two different directions (e.g., clockwise and counterclockwise about a rotational axis).

Figure 32A:
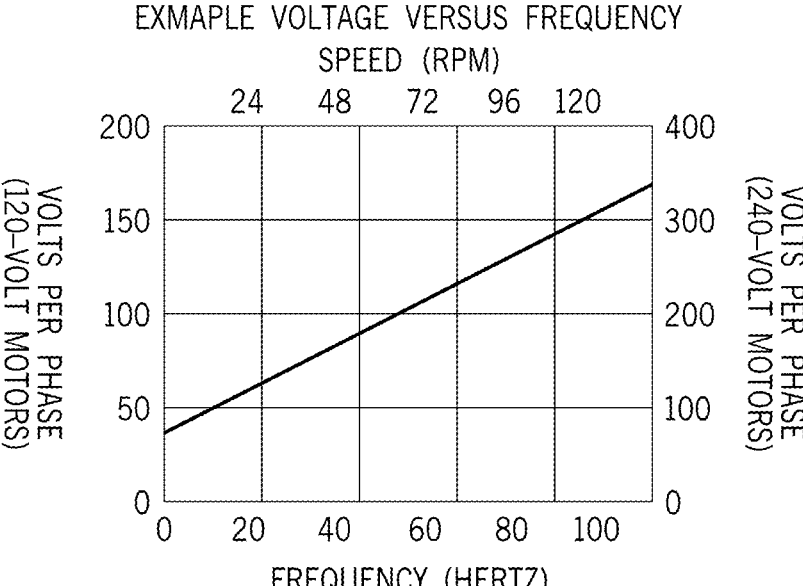
FIG. 32A is an example representation of voltage and frequency relationships of an example motor.

The example gearmotor assembly 414 includes a motor 416 and a reduction gearbox 418. In the example shown, power feed wires 420 are electrically coupled to a power supply (not shown) to provide input power to operate the motor 416 and any associated control electronics. In one form, the motor 416 is a stepper motor, such as a synchronous stepper motor and/or a hybrid stepper motor. In some forms, the motor 416 is configured and operable to output a nominal 72 revolutions per minute (when supplied a nominal frequency of 60 hertz)—with other nominal motor revolutions per minute available depending on application-specific parameters and/or specifications (as shown, for instance, in Table 1 below). An example of typical speed (revolutions per minute) and frequency (hertz) is illustrated in FIG. 32A.

TABLE 1

| Speed-Frequency Relationships for Example Motor (72 RPM at 60 Hz) | |
| --- | --- |
| Frequency (hertz) | Speed (revolutions per minute) |
| 10 | 12 |
| 20 | 24 |
| 30 | 36 |
| 40 | 48 |
| 50 | 60 |
| 60 | 72 |
| 70 | 84 |
| 80 | 96 |

As one example, the motor 416 can have a relatively native low-speed, for instance, often pure stepper motors have high speed ranges in the thousands (e.g., 3000 to 6000 revolutions per minute) when configured to operate on available 120 volts 60 hertz alternating current without an additional motor controller. In some forms, a start/run capacitor can be incorporated to create a phase-shifting network to provide the hybrid stepper motor three phases when the supply is nominally 120 volts and 60 hertz. Furthermore, an example capacitor in the phase-shifting network can be included to facilitate the motor windings start and running operation. Alternating current (AC)-direct current (DC)-AC transformation of the phases, such as with a variable frequency drive, can add complexity and cost. In some forms, however, the motor can be configured to operate in combination with a DC-front end inverter configured to receive direct current control and power (e.g., via a battery or other power storage device) and to output synchronous alternating current at the desired voltage and frequency.

Figure 32B:
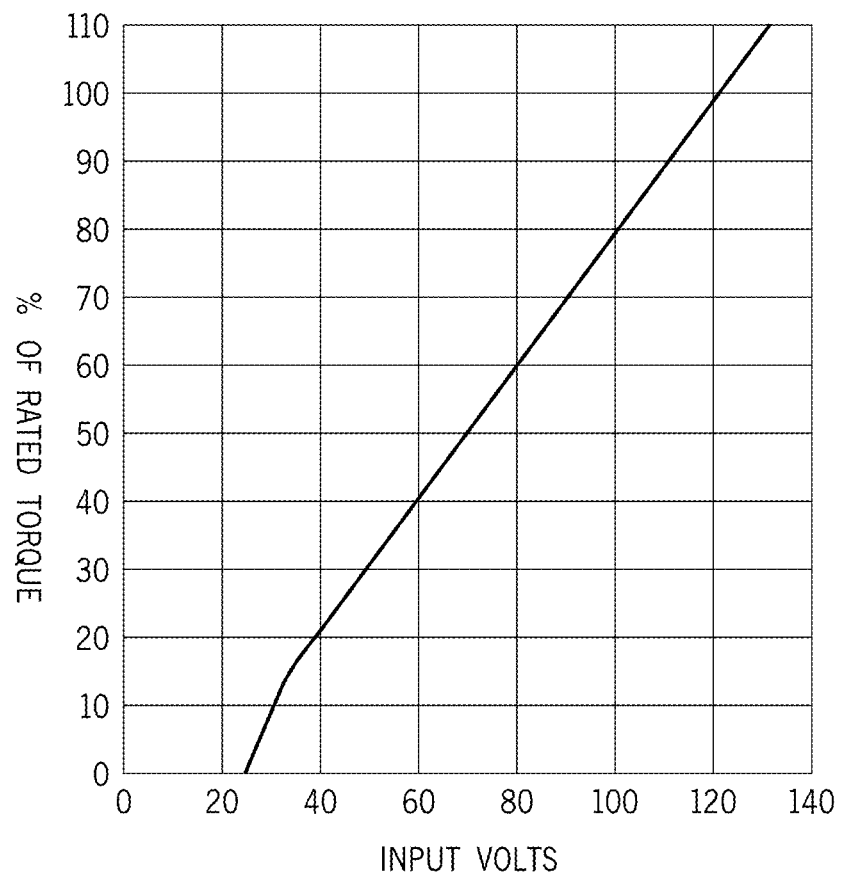
FIG. 32B is an example representation of torque and voltage relationships of an example motor.

With reference to example FIG. 32B, the percentage of motor torque can be controlled/influenced via the input voltage. The example permanent magnet construction of the AC hybrid motor provides a relatively limited residual torque that can help maintain or hold the rotor in position (e.g., stationary) when the motor is deenergized. Through similar properties borne from the electromagnetic construction, a high starting current is realized. Starting and steady-state currents are nominally the same. Rapid starting, stopping, and reversing capabilities are a result of the design advantages of the example motor. In one example embodiment, the motor 416 is configured to operate on an input power that is supplied to the motor 416 at nominally 120 volts and 60 hertz alternating current. In other embodiments, an inverter can be provided and configured to convert an input power from a direct current to an alternating current suitable to operate the motor 416. For instance, the inverter may be provided a nominal 24 volts direct current (e.g., as provided via an electrical coupling with one or more example solar panels 408) and configured to output a nominal 120 volts 60 hertz alternating current that is suitable to operate the motor 416. Given the benefit of this disclosure, one skilled in the art will appreciate the various applicable application-specific power inputs/outputs and conversion/conditioning modifications.

With continued reference to FIGS. 15 and 16, the motor 416 and the reduction gearbox 418 of the example gearmotor assembly 414 are generally aligned. For instance, a motor shaft 422 of the motor 416 defines a motor axis 424 and a gearbox coupling 426 of the reduction gearbox 418 defines a gearbox coupling axis 428, with the motor axis 424 and the gearbox coupling axis 428 being generally collinear or coaxial when the motor 416 and the reduction gearbox 418 are coupled. When the gearmotor assembly 414 is mounted to the support structure 402, the gearbox coupling axis 428 and/or the motor axis 424 can be arranged to be parallel with the tracker pivot axis 412. In the example embodiment, the motor 416 is coupled (e.g., bolted) to an input cover 430 of the reduction gearbox 418. The reduction gearbox 418 also includes an output cover 432, with the input cover 430 and the output cover 432 being coupled (e.g., bolted) to a central reduction housing 434. Given the benefit of this disclosure, one skilled in the art will appreciate the various other compatible form factors of the gearmotor assembly 414.

With additional reference to FIG. 17-20, the motor 416 is operably coupled to the reduction gearbox 418 to, in some instances, transfer a force (e.g., torque) output by the motor 416 into and through the reduction gearbox 418. The motor 416 is configured to received input power to selectively rotate the motor shaft 422 about the motor axis 424 (e.g., in discrete steps), which provides a desired input to the reduction gearbox 418 to result in a desired output from the reduction gearbox 418, provided no resistance or obstruction. In the example embodiment, the motor shaft 422 extends into a motor shaft coupling 436 that is configured to operably couple the motor shaft 422 and a reduction gear assembly 442 within the reduction gearbox 418. The motor shaft coupling 436 is configured to axially receive the motor shaft 422 and rotatably couple the motor shaft 422 and the motor shaft coupling 436, such that the motor shaft 422 and motor shaft coupling 436 can be rotated together about the motor axis 424 during use. The motor shaft coupling 436 is rotationally supported by a bearing 438 (e.g., a ball bearing) seated in the reduction housing 434. In the example shown, the motor shaft coupling 436 also includes a splined bore 440 adapted to operably engage with a reduction gear assembly 442. In another iteration, the motor shaft coupling 436 is removed entirely (along with bearing 438) and the motor input shaft 422 couples directly to the sun gear 452.

In one embodiment, the reduction gear assembly 442 comprises a multi-stage planetary gear system, such as the three-stage planetary gear system illustrated in the example embodiment. In the example embodiment, the reduction gearbox 418 establishes a greater than 50 to 1 reduction, a greater than 80 to 1 reduction, a greater than 90 to 1 reduction, and a greater than 100 to 1 reduction. Given the benefit of this disclosure, one skilled in the art will appreciate the compatible gear reductions. The reduction gear assembly 442 is generally located within an interior 444 of the reduction gearbox 418 and comprises a first stage input planetary gear assembly 446, a second stage intermediate planetary gear assembly 448, and a third stage output planetary gear assembly 450. The example planetary gear assemblies 446, 448, 450 are generally similar in construction and assembly. The input planetary gear assembly 446 includes a sun gear 452, planet gears 454, a planet carrier 456, and a ring gear 458. The sun gear 452 includes a splined shaft 460 that is operably coupled to the motor shaft coupling 436. A washer 453 can be seated between a sun gear 452 and the planet carrier 456. The sun gear 452 is configured to engage with the planet gears 454 mounted on the planet carrier 456. Each planet gear 454 has a central opening 462 into which a planet bearing 464 (e.g., a needle bearing) is seated. A planet bearing pin 466 extends partially through the planet bearing 464 and a planet washer 468 is also mounted to the planet bearing pin 466. The planet bearing pin 466 further extends into a planet pin bore 470 formed in the planet carrier 456, such that the planet bearing pin 466 couples the planet gear 454, the planet bearing 464, and the planet washer 468 with the planet carrier 456.

The second stage intermediate planetary gear assembly 448 and the third stage output planetary gear assembly 450 are substantially similar to the first stage input planetary gear assembly 446. Only the first stage planetary gear assembly 446 is shown more fully exploded in FIG. 19. In addition, for ease of assembly, the ring gears 458 can be of different thickness to aid assembly of each ring gear 458 into the interior 444 of the reduction housing 434. The intermediate planetary gear assembly 448 includes a sun gear 452 with a splined shaft 460 that is configured to engage with a splined opening 472 in the planet carrier 456 of the input planetary gear assembly 446, such that rotation of the planet carrier 456 of the input planetary gear assembly 446 imparts rotation to the sun gear 452 of the intermediate planetary gear assembly 448. Similarly, the output planetary gear assembly 450 includes a sun gear 452 with a splined shaft 460 that is configured to engage with a splined opening 472 in the planet carrier 456 of the intermediate planetary gear assembly 448, such that rotation of the planet carrier 456 of the intermediate planetary gear assembly 448 imparts rotation to the sun gear 452 of the output planetary gear assembly 450.

In the example reduction gear assembly 442, the output planetary gear assembly 450 includes a distinct output planet carrier 472 configured to enable a force-limiting transfer between the reduction gear assembly 442 and the gearbox coupling 426. In some embodiments, a torque limiter 474 can be positioned to operably inhibit a relative net applied torque between the 416 motor, the reduction gear assembly 442, the gearbox coupling 426, and any coupled driven member from exceeding a maximum torque, which can be based on an application-specific force threshold.

The example output planet carrier 472 includes a central portion 476 that defines a central bore 478 having an annular interior surface 480. In general, the central portion 476 defines an adequately rigid cross-section in view of particular application-specific functional parameters. The central portion 476, in some example forms, can be generally tapered and about twice the thickness (in the axial direction) as the outer portion of the output planet carrier 472 to establish, in the example embodiment, the interior surface 480 of desired relative dimensions. Given the benefit of this disclosure, one skilled in the art will appreciate the alternative form factors (e.g., the relative thickness of the central portion) to accomplish an application-specific force/torque engagement and transfer (e.g., the cooperating structures defining sufficiently rigid form factors and sections in consideration of the application-specific parameters). With specific reference to FIGS. 17 and 20, the gearbox coupling 426 is supported by the output cover 432 of the reduction gearbox 418 by an inboard bearing 482 adjacent an annular lip 485 formed on the gearbox coupling 426 and an outboard bearing 484 separated by a spacer 486. A seal 488 is further included to inhibit the ingress of undesirable debris into the reduction gearbox 418. One skilled in the art will appreciate the various bearing types and arrangements that can be incorporated in view of particular application preferences.

In some forms, the output planet carrier 472 (similar to the worm gear 105) can be manufactured via a powdered metal manufacturing technique from an alloy, such as an iron copper and copper steel alloy (e.g., FC-0208-50) and application-specific variations thereof. Given the benefit of this disclosure, one skilled in the art will appreciate that other alloys can be used to implement the concepts disclosed herein. The alloy of the example embodiment establishes a macro or apparent hardness of approximately 73HRB. Alternative alloys that establish a similar or application-specific hardness may be incorporated. Use of an output planet carrier 472 produced from a powdered metal manufacturing technique provide advantages over, for instance, a ductile iron. Advantages include improved performance and operation of the torque limiter 474 (e.g., establishing more consistent and repeatable slip conditions given a variety of operational and environmental parameters, such as the applied torque differential, duration of applied torque differential, duration between slip events), as further discussed below. In other example forms, one skilled in the art will appreciate that the torque limiter functionality can be attributed to other driveline components and thus inserted into the driveline at alternative locations, such that the alternative components can be manufactured from a powdered metal process to obtain the identified benefits.

With additional reference to FIGS. 21-26, addition details of the example torque limiter 474 and its operation are described in more detail. The gearbox coupling 426 defines a cylindrical exterior surface 488 that is sized to engage with the torque limiter 474, and similarly the output planet carrier 472 defines the central bore 478 (and the interior surface 480) that is also sized to engage with the torque limiter 474. In the example embodiment, the torque limiter 474 can be positioned and configured to operably couple the stepper motor 416, the reduction gear assembly 442, and the gearbox coupling 426 when a relative net force (e.g., torque) between the stepper motor 416 about the motor axis 424, the reduction gear assembly 442, and the gearbox coupling 426 about the gearbox coupling axis 428 is below a maximum net torque. Moreover, in the example embodiment, the torque limiter 474 can be positioned and configured to operably decouple the stepper motor 416, the reduction gear assembly 442, and the gearbox coupling 426 when the relative net torque between the stepper motor 416 about the motor axis 424, the reduction gear assembly 442, and the gearbox coupling 426 about the gearbox coupling axis 428 is at or above the maximum torque. Depending on the particular configuration, the torque limiter 474 can be configured to couple/decouple one, multiple, or all of the force/torque transmission components of the gearmotor assembly 414. Given the benefit of this disclosure, one skilled in the art will appreciate the various compatible torque limiters that can be adapted for use depending on, for instance, application-specific parameters. For instance, while the example torque limiter 474 is in the form of a torque collar incorporating frictional forces and material properties (e.g., elasticity and hardness) to obtain desired operational torque-limiting characteristics, the torque-limiting functionality of a torque limiter may be accomplished by clutch-based couplings (e.g., cones, plates, etc.) employing friction surfaces/materials and spring force, fluid-based viscous couplings, and other conventional devices that allow relative movement (e.g., slip) between surfaces when a relative net force is applied.

In some forms, and similar to the example torque limiter 192, the example torque limiter 474 is configured to establish a minimal difference between the initial static torque required to initiate slipping relative to the torque limiter 474 and a running or dynamic torque differential to maintain the slip condition. When the static to dynamic value is nearing the idealized 1:1 ratio, the shock, impact, and/or acceleration/deceleration that occurs during a transition between a synchronized rotational condition and a relative slip condition is also minimized. Furthermore, minimizing the difference between a slip torque value and a running torque value results in transition dynamics that impart lesser stresses and wear on the various components. A static to dynamic torque ratio closer to 1:1 also reflects a lower initial peak delta torque between the initial static breakaway torque and the running torque. In addition, the example configuration of the torque limiter 474 also helps to minimize variability between transitional slip events that can result, at least in part, from time-dependent factors (e.g., a long duration, period, or dwell between delta torque events that are sufficient enough to result in a slip condition). Further still, operational performance of the torque limiter 474 can be enhanced by use of a torque limiter having an axially longer form factor (e.g., an axial length as compared to a nominal diameter), such that a similar overall compressive force is distributed over a larger interface area. In one form, an axial length of a torque limiter is about 0.25 to 2 times (and preferably about 0.5 to 1.5 times in some embodiments) the nominal diameter of the torque limiter (e.g., from an imaginary central axis to an imaginary ring positioned approximately between the radially outermost surface and radially innermost surfaces of the torque limiter).

Again, referring to FIG. 29, an example plot of conventional dynamic-static slip torque relationships are graphically illustrated, such as what may occur with use of a cone clutch. An initial static slip torque occurs at peak P. The running or dynamic torque is often quite variable, cycling between a wider range (e.g., the upper-most value being about four times the lower-most value). An approximate average value of the dynamic slip torque can be determined by optionally excluding an initial transitory gap G (e.g., 0.2 seconds between the initial static slip point peak P and the oscillatory dynamic slip torque data measurements) and averaging data over a period of time T (e.g. ~4 seconds). In some example arrangements, the dynamic-to-static slip torque ratio can be approximately below 60% (i.e., a percentage representation of average dynamic slip torque/static peak slip torque). While operable, this ratio is below the idealized 1:1 (i.e., 100%). In addition, the large range of cyclical variability of the measured dynamic slip torque is not ideal and can result in jerky, fluctuating movement of any coupled components (e.g., an output shaft) imparting undesirable stresses. Even if the dynamic slip torque oscillations subside over time, the example approximately two second period of variable response displaying a wider range of torque can inhibit desired operation. Of course, given the benefit of this disclosure, one skilled in the art will appreciate the various alternatives and modifications within the scope of the invention that are available to approximate the ratio.

With additional reference to FIGS. 30A, 30B, and 30C, example plots of conventional dynamic-static torque slip data sets are graphically illustrated. These plots show, for instance, the wider range of slip torque values between the static peak and the dynamic period, as well as within the dynamic response period. Turning to FIGS. 31A, 31B, and 31C, example plots of enhanced dynamic-static slip torque data sets (such as those obtained by use of the example torque limiter 474) are illustrated. As shown, the delta or difference between the initial static slip torque peak P and the subsequent period of running or dynamic torque is minimized to approach the idealized 1:1 ratio (i.e., 100%). The overall response is also appreciably flatter and settles into the average dynamic slip torque value within a shorter period after the static slip torque peak P. The slip torque variability can be reduced at least in duration, frequency, and/or range (e.g., upper and lower bounds of deviation are reduced). In addition, the transition between a slip condition and a coupled condition can be smoother and more gradual, as generally reflected by the larger radius curve segment C illustrated as the slip torque transitions toward 0 ft-lbs in each of the plots (e.g., compare sharper curve segment C in FIG. 30A to curve segment C in FIG. 31A).

In some embodiments, the example torque limiter 474 is configured to be used with a grease-based lubricant, such as MOLYKOTE® P-1500 (DuPont de Nemours, Inc.) and other lubricants with similar application-specific properties. The grease can be applied to the torque limiter 474 as mounted between the gearbox coupling 426 and the output planet carrier 472. In addition, in some embodiments, an oil-based lubricant, such as synthetic polyalkylene glycol (PAG) ISO VG220 including MOLYKOTE® L-2122 Synthetic Gear Oil—ISO VG 220 (DuPont de Nemours, Inc.) and other lubricants with similar application-specific properties, is introduced into the interior of the reduction gearbox

418. Notably, it has been found that the oil-based lubricant does not appreciably wash out or hamper the operability of the grease-based lubricant, such that the desired lubrication properties of each type of lubrication are realized within the gearmotor assembly 414. Additionally, the entire contents of the example gearmotor assembly 414 (including the torque limiter 474) may be lubricated primarily or only with oil, such as synthetic polyalkylene glycol (PAG) ISO VG220 including MOLYKOTE® L-2122 Synthetic Gear Oil-ISO VG 220 (DuPont de Nemours, Inc.) and other lubricants with similar application-specific properties, for simplified assembly. The use of oil-based lubrication between the torque limiter 474 and the gearbox coupling 426 can aid achieving a lower slip torque as comparted to use of grease-based lubricants.

In the example embodiment, the example torque limiter 474 is positioned between the central bore 478 of the output planet carrier 472 and the gearbox coupling 426 to rotationally couple the output planet carrier 472 and the gearbox coupling 426 when a relative net torque between the output planet carrier 472 and the gearbox coupling 426 about the gearbox coupling axis 428 is below a maximum torque. That is, the torque limiter 474 can be configured to inhibit relative rotation between, for instance, the output planet carrier 472 and the gearbox coupling 426 when a relative net torque between the output planet carrier 472 and the gearbox coupling 426 about the gearbox coupling axis 428 is below a maximum torque. And the torque limiter 474 can be configured to permit relative rotation (e.g., slip) between the output planet carrier 472 and the gearbox coupling 426 when the relative net torque between the output planet carrier 472 and the gearbox coupling 426 is above the maximum torque. From a practical application standpoint, when the force (e.g., net torque) is at the maximum torque, the components can typically be transitioning between the static and dynamic relative states (e.g., beginning to slip or beginning to sync). The maximum torque can be influenced by various design parameters. For instance, the material properties and surface finishes of the output planet carrier 472, the gearbox coupling 426, and the torque limiter 474 interact statically and dynamically to influence the maximum force and torque that can be transferred by the engagement. In addition, the relative sizing of the components, especially at or adjacent to the interface surfaces, can influence the torque-transfer characteristics and dynamics. Moreover, the presence, absence, quality, quantity, temperature, etc. of lubricants can also influence the maximum torque, as well as other environmental conditions, such as the ambient temperature and humidity within which the torque limiter is operating. As discussed, in one embodiment, oil and grease are used as combined lubricants. The example net applied torque can be considered the combined resultant torque that the gearmotor assembly 414 is transferring. For instance, an input force applied by the motor 416 to rotate the reduction gear assembly 442 can be summed (e.g., additive and/or subtractive) with the internal resistive forces of the gearmotor assembly 414 and the resistive forces of a component coupled to and driven by the gearbox coupling 426 to determine a net applied torque.

In some embodiments, the gearmotor assembly 414 includes the example torque limiter 474 to prevent or inhibit back driving an operably coupled motor (e.g., when the motor is off/unpowered and an applied torque through the gearmotor assembly 414 is sufficient to urge the coupled motor to rotate). In some forms, a one-way clutch or brake device can be incorporated to aid operation of the torque limiter to inhibit back driving of a coupled motor. Given the benefit of this disclosure, one skilled in the art will appreciate the desired and alternative placement of a torque limiter 474 within the overall system to effectively define one or more desired slip locations (i.e., where the drivetrain will be dynamically decoupled when the torque characteristics meet the design parameters).

The example torque limiter 474 is similar to the torque limiter 192, such that the same reference numerals will be used to identify similar features. The example torque limiter 474 is illustrated in the form of a split ring defining a gap 218 between opposite ends 220. The nominal inner and outer diameters of the torque limiter 474 can be adapted to provide the desired interface engagements. For example, the nominal inner diameter of the torque limiter 474 can be sized smaller than the nominal outer diameter 490 of the exterior surface 488 of the gearbox coupling 426. In one embodiment, the nominal inner diameter of the torque limiter 474 relative to the nominal exterior surface 488 dimension is about 1% to 10% less, and can be adapted to achieve application-specific parameters. The torque limiter 474 includes multiple contours 222 that, in the example embodiment, can define protrusions 224 that extend generally radially outward from an outer surface 226 of the torque limiter 192. The contours 222 can also define corresponding dimples 228 that extend generally radially outward from an inner surface 230. The example protrusions 224 define substantially arcuate central surfaces 232 between respective arcuate end surfaces 234. A radiused base 236 is formed where the protrusion 224 departs from the outer surface 226. In some examples, the nominal outer diameter of the torque limiter 474 (as defined by the diameter of an imaginary circle that is generally tangential to the radially outermost central surfaces 232 of the protrusions 224) relative to the nominal inner diameter of the central bore 478 of the output planet carrier 472 is about 1% to 10% greater, preferably about 1.5% in some embodiments.

The relative material properties and sizing between, for example, the outer diameter 490 of the gearbox coupling 426, the torque limiter 474, and the central bore 478 of the output planet carrier 472, can be configured to interact and establish the nominal maximum torque that can be transmitted via the torque limiter 474. With specific reference to FIG. 22, a portion of the example output planet carrier 472 is shown after engagement with the example torque limiter 474. As shown, in use the protrusions 224 of the torque limiter 474 form grooves 238 in the interior surface 480 of the central bore 478. The grooves 238 extend from a chamfered insertion edge 240 and along the central bore 478 with, in one example embodiment, preferably substantially parallel side edges 239. In some embodiments, the grooves 238 have a maximum depth from the interior surface 480 of about 180-300 micrometers, with other depths being available based on application-specific considerations. More consistent slip torque dynamics have been observed when the grooves 238 define relatively consistent grooves (e.g., minimizing steps, tappers, or other inconsistencies along the side edges 239 or depth of the grooves 238). In some forms, the grooves 238 provide more advantageous formfactors when formed in a powder metal (e.g., FC-0208-50) as comparted to a ductile iron (e.g., 80-60-03). The grooves 238 are generally shaped to reflect the inverse of the central surfaces 232 of the protrusions 224. The chamfered insertion edge 240 also aids insertion of the torque limiter 474, as the contours 222 are engaged with the interior surface 480 of the central bore 478. The example contours 222 can form the grooves 238, such that the protrusions 224 of the torque limiter 474 are seated and restrained in the grooves 238 to inhibit relative rotation between the torque limiter 474 and the output planet carrier 472 female/outer component. In the example embodiment, therefore, the torque limiter 474 is configured to move or slip relative to the gearbox coupling 426 (e.g., relative to the exterior surface 488 of the gearbox coupling 426). Given the benefit of this disclosure, one skilled in the art will appreciate that the relative coupling and configuration can be adapted. For instance, the contours 222 can be inverted, such that the protrusions 224 extend radially inward to restrain the torque limiter 474 and the gearbox coupling 426, with the torque limiter 474 being configured to slip relative to the output planet carrier 472.

The torque limiter 474 can also be adapted to establish application-specific coupling/slipping characteristics. For instance, the contours 222 and relative interfaces with the example gearbox coupling 426 and output planet carrier 472 can be configured to provide a dynamic-to-static slip torque ratio approximately greater than 0.5, greater than 0.6, greater than 0.8, and greater than 0.9. The contours 222 of the example torque limiter 474 (i.e., torque collar) are configured to resiliently compress nominally radially inward (e.g., with the elastic material property range) when engaged between the interior surface 480 of the output planet carrier 472 and the exterior surface 488 of the gearbox coupling 426.

During use the torque limiter 474 is configured to allow force, such as torque, to be transferred via the torque limiter 474 when the applied force is below a maximum amount. In some embodiments, the relative net applied torque is a torque differential between a driven assembly torque urging the driven assembly and a motor torque urging the reduction gearbox. When the net applied force exceeds the maximum amount, the torque limiter 474 functions to allow relative movement or slip between mating components, which inhibits more than the maximum amount of force being transferred. During this relative movement or slip, the torque limiter 474 is also providing a resistive force (e.g., drag) that operates to return the system to a state of synchronized movement or rotation of the particular components coupled via the torque limiter 474. In the example gearmotor assembly 414, the torque limiter 474 can be configured to limit the amount of force transferred between the output planet carrier 472 of the reduction gear assembly 446 and the gearbox coupling 426, whether the force is applied or resisted via the output planet carrier 472, the gearbox coupling 426, some combination of the output planet carrier 472 and the gearbox coupling 426, and/or as a result of internal resistance within the gearmotor assembly 414 (e.g., resulting from an internal malfunction or component failure).

In some embodiments, an input torque can be applied to the reduction gear assembly 442 by the motor 416. The input torque is transferred via the reduction gear assembly 442 to the output planet carrier 472 and, provided below a maximum force or torque, further transferred via the torque limiter 474 to the gearbox coupling 426. The gearbox coupling 426 can be engaged with any number of components to impart the applied force and accommodate bidirectional force transfers. For instance, the gearbox coupling 426 can be operably engaged with transmission components of wastewater treatment processing equipment and systems, conveyor equipment and systems, augers/mixing equipment and systems, winching equipment and systems, and semi-trailing loading dock retention equipment and systems. In addition, the gearmotor assembly 414 can be used in context of the example solar panel tracker systems 400 that, in some embodiments, adjust the orientation of solar panels 408 to efficiently track or align the solar panel 408 with rays of the Sun. Solar panel tracker systems are often grouped into large farms or arrays, where a single prime mover motor is linked via a drivetrain to discrete rows of panels. In some arrangements, the gearmotor assembly 414 can be operably configured at each adjacent row to both transfer forces between adjacent gearboxes and also adjust the orientation or clocking of solar panels 408 via a rotatable mounting structure (e.g., pivot gear 404 and support tubes 406) operably coupled to receive torque from the gearbox coupling 426. As appreciated by one of ordinary skill, forces relevant to the gearmotor assembly 414 and the integrated torque limiter 474 include, for instance, the applied motor torque, internal resistive forces, and external forces (e.g., wind and snow loads on the solar panels). The gearmotor assembly 414, and particularly the torque limiter 474, can be configured to limit the maximum torque to reduce the potential for undesirable stresses, which can impact the operability and/or the functionality of the gearmotor assembly 414 and/or an overall system in which the gearmotor assembly 414 is integrated.

Figure 27:
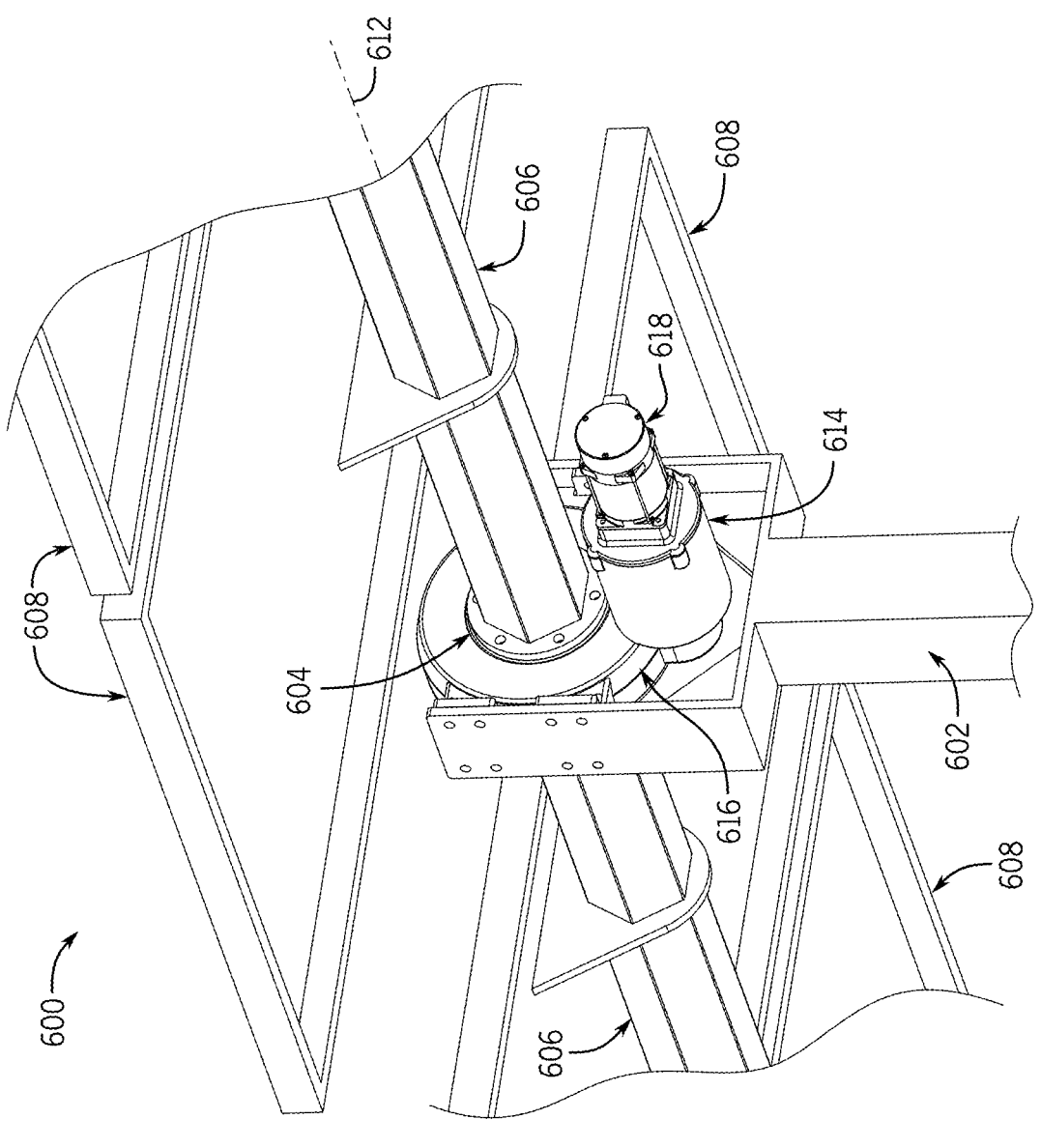
FIG. 27 is an isometric view of another example gearmotor assembly in another example application environment.
Figure 28:
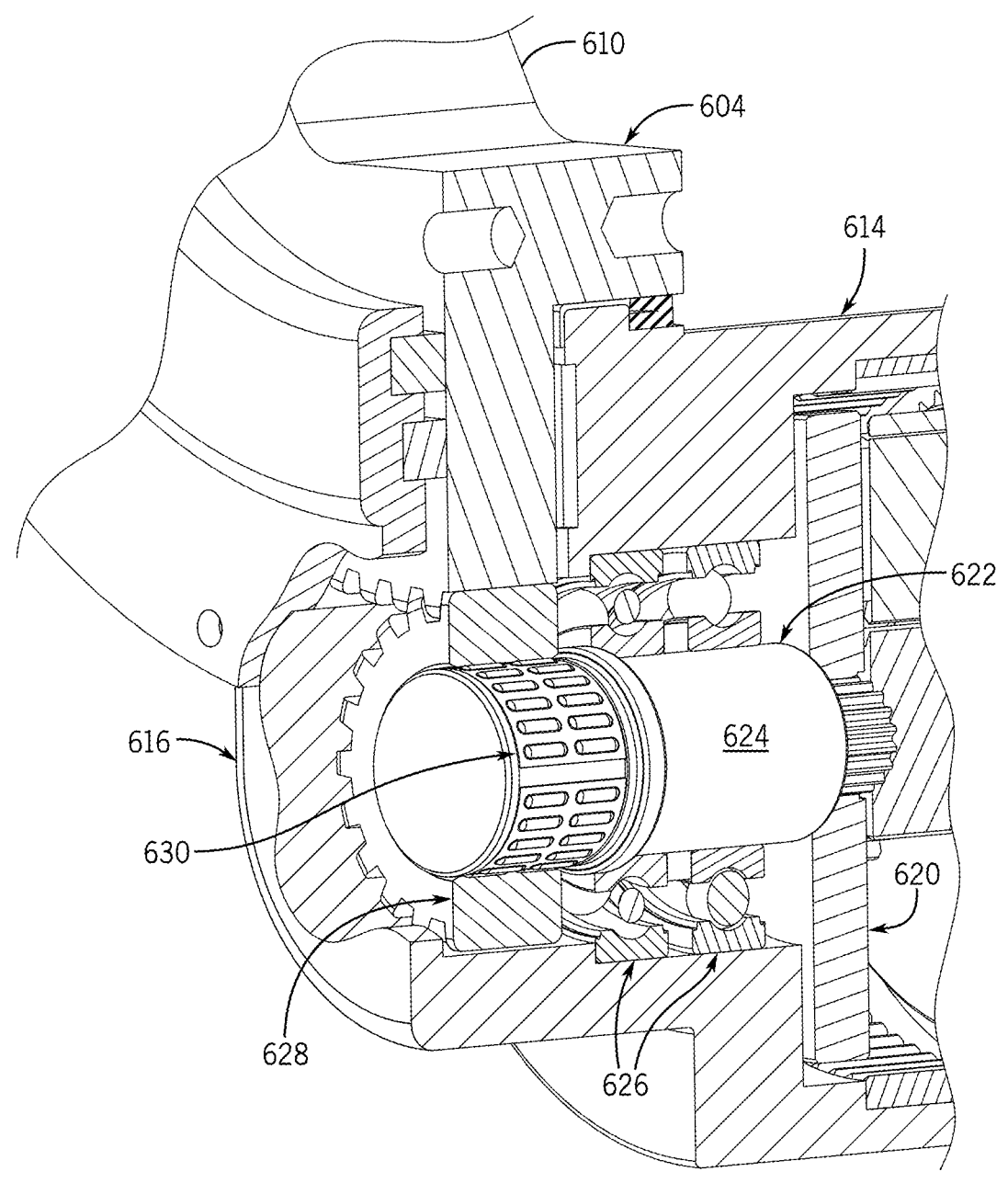
FIG. 28 is an isometric partial section view of the example gearmotor assembly shown in FIG. 27.

Given the benefit of this disclosure, one skilled in the art will further appreciate that the example gearmotor assembly 414 can take on a variety of other form factors. For example, the relative functional positioning of the example torque limiter 474 can be altered. In some embodiments, a torque limiter can be operably positioned to engage with the motor shaft coupling 436, the input planetary gear assembly 446, or the intermediate planetary gear assembly 448. In still other embodiments, more than one torque limiter can be incorporated, with each having differing levels of force transmissions capabilities (e.g., discrete torque limiters integrated with the motor shaft coupling 436, the input planetary gear assembly 446, and the intermediate planetary gear assembly 448). As a result, different driveling components can be adapted and designed to account for the torque limiting capabilities. With reference to FIGS. 27 and 28, another example embodiment of a solar panel tracker system 600 is illustrated. The example solar panel tracker system 600 includes a support structure 602, a ring gear 604, support tubes 606, and solar panels 608. The support structure 602 can be a post or other structure configured to establish a secure mount for the overall solar panel tracker system 600. The ring gear 604 defines tube mount 610. In the example shown, the support tubes 606 extend from the tube mount 610 and support multiple solar panels 608. As a result, when the ring gear 604 is urged in either direction about a tracker pivot axis 612, the support tubes 606 and the coupled solar panels 608 selectively move to, for instance, track rays of the Sun to enhance the functionality of the solar panels 608.

A gearmotor assembly 614 can include, in some embodiments, a housing 616 mounted to the individual support structures 602. For example, the gearmotor assembly 614 can be bolted to the support structure 602 and operably engaged with the ring gear 604. Similar to the gearmotor assembly 414, the gearmotor assembly 614 can incorporate a reduction gear assembly (not shown) driven by a motor 618. In this embodiment, an output planet carrier 620 is configured to support a gearbox coupling 622. The gearbox coupling 622 includes a shaft 624 coupled with the output planet carrier 620 and supported in the housing 616 by bearings 626. A coupler 628 (e.g., spur gear) is operably coupled to the shaft 624 via a torque limiter 630. The arrangement of the torque limiter 630 between the coupler 628 and the shaft 624 establishes the level of force (e.g., torque) that can be transmitted between the coupler 628 and the shafter 624, and thus can provide functional protection to various drivetrain components, such as the motor 618, reduction gear assembly, coupler 628, ring gear 604, support tubes 606, solar panels 608, and other components of the solar panel tracking system 600.

The example gearmotor assembly 614 can also be used in a variety of other applications. For example, an example gearmotor assembly 614 can be incorporated in a gearmotor system such as in connection with transmission components of wastewater treatment processing equipment and systems, conveyor equipment and systems, augers/mixing equipment and systems, winching equipment and systems, and semi-trailing loading dock retention equipment and systems. The gearmotor system can include a driven assembly including a support structure (e.g., support structure 602) and a driven member (e.g., the ring gear 604 and coupled support tubes 606 and solar panels 608) operably coupled to the support structure to move relative to the support structure in at least two different directions (e.g., about a rotational axis).

Several additional example embodiments and arrangements are illustrated in FIGS. 33-42. The additional embodiments include alternative example gearmotor configurations. Given the benefit of this disclosure, one skilled in the art will appreciate the variety of further iterations and implementations available and, in some instances, tailored configurations in view of application-specific parameters.

In some forms, a back drive prevention device can be incorporated into the drivetrain (e.g., closer to or at the input or the output of the system) to facilitate operation of the integrated torque limiter (e.g., to define the preferred relative slip location between components). In general, certain gear pairings are relatively more or less susceptible to inhibiting being back driven. For instance, the worm gear 105 and worm shaft 102 often establish what is considered to be a non-back driving gear pairing. On the other hand, the example embodiments incorporating the reduction gear assembly 442 and the ring gear 604 are generally considered back drivable, such that use of a back drive prevention device can be advantageous in certain embodiments and/or applications.

As appreciated by one of ordinary skill when given the benefit of this disclosure, a back drive prevention device may take a variety of forms, such as mechanical or electrical devices. Back drive prevention devices can include, for instance, non-back drivable mechanisms using a mechanical cam effect arrangement, a one-way clutch arrangement, a fluidic valve arrangement, and the like. Moreover, the back drive prevention device can also include various forms of motor brake arrangements (e.g., electromagnetic, induction, solenoid actuated, armature actuated, etc.).

In one example embodiment, a back drive prevention device comprises a non-back driving mechanism configured to incorporate a cam lock principle (e.g., driving an output via an input is permitted, but driving the input via the output is inhibited as one or more roller pins are wedged between a roller pin and a fixed housing/collar). Further example details of several non-back driving mechanisms are included below.

Figure 33:
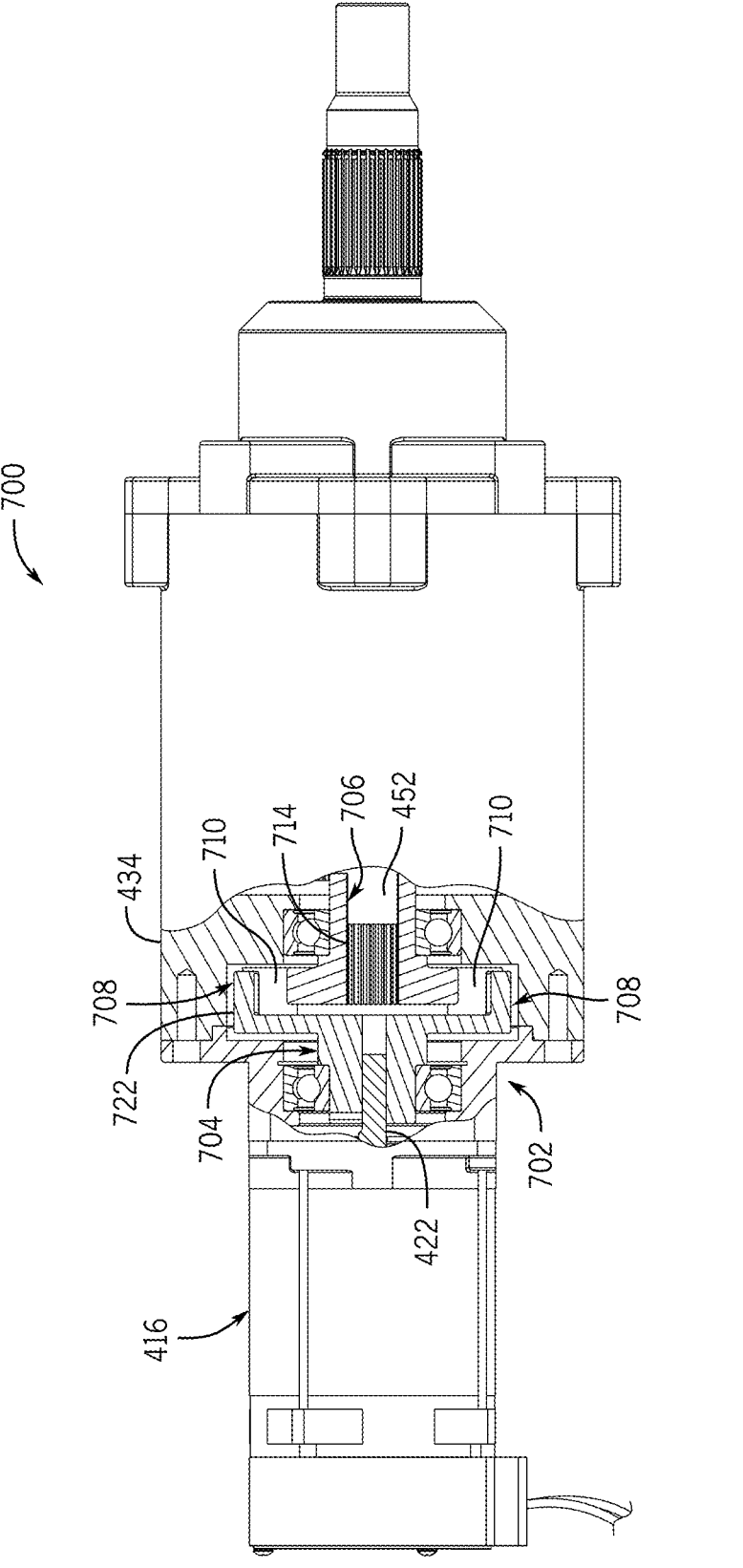
FIG. 33 is a plan partial section view of another example gearmotor assembly.
Figure 34:
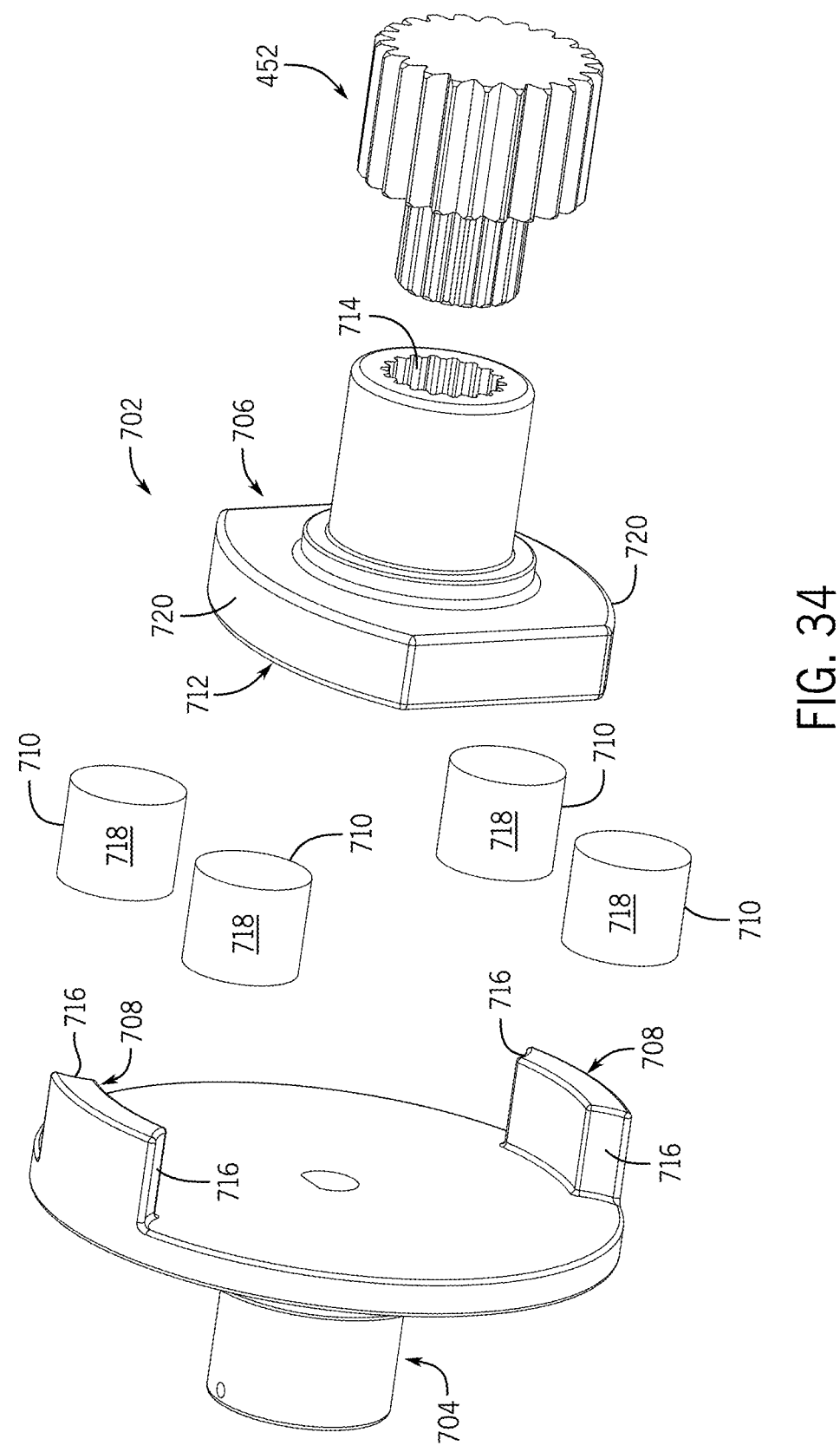
FIG. 34 is an isometric exploded view of an example back drive prevention device shown in FIG. 33.

The location of the back drive prevention device can be at various positions within and along a gearmotor assembly. With reference to FIG. 33, an additional example gearmotor assembly 700 is shown. The gearmotor assembly 700 is similar to that disclosed and described in connection with gearmotor assembly 414. With additional reference to FIG. 34, the gearmotor assembly 700 incorporates an example embodiment of a back drive prevention device 702 operably positioned generally between the motor 416 and an internal reduction gear assembly (not shown).

The example back drive prevention device 702 is in the form of a cam-lock style device configured to permit rotation when torque is applied to an input member 704 and inhibit rotation when torque is applied to an output member 706. When a force is applied to rotate the input member 704, such as when the motor shaft 422 of the coupled motor 416, a pair of axially extending arms 708 rotated into engagement with respective rollers 710. The rollers 710 then engage with the cam portion 712 (shown with one example simplified geometry in FIG. 34), such that the rotational torque is transferred to rotate the output member 706. At least one roller 710 is typically incorporated to establish the torque transfer, with two or more providing additional engagement interfaces. Additionally, as with all of the example embodiments, while a pair of arms 708 located opposite each other (i.e., about 180 degrees), more or fewer arms can be included and circumferentially spaced equally or unequally. In the example embodiment, the output member 706 defines a splined bore 714 configured to operably engage the sun gear 452. While various form factors of the input member 704, the output member 706, and the rollers 710 are available, the arms 708 of the input member 704 can include curved engagement faces 716 that are configured to cooperate with exterior surfaces 718 of the rollers 710.

The example back drive prevention device 702 is also configured to inhibit rotation of the output member 706 resulting in torque transfer to or rotation of the input member 704. For example, the output member 706 defines a cam profile 720 that is configured to engage with and wedge at least one of the rollers 710 between the output member 706 and, in one example embodiment, an interior surface 722 of the reduction housing 434 that is fixed relative to rotation of the input member 704 and the output member 706.

The relative example positioning of the back drive prevention device 702 (i.e., proximate the input) can result in reduced torque on the back drive prevention device 702, but increased impact load on the back drive prevention device 702 may be experienced while driving from the output member 706 due to additional speed increase with an example approximately 109:1 gear ratio. This configuration, however, also permits mounting of the gearmotor assembly 700 consistent with conventional manners/supports (e.g., as illustrated in FIG. 13). The coupling between the output member (e.g., the splined bore 714) and the sun gear 452 may introduce additional backlash, and inherent free play within the back drive prevention device 702 may contribute to the total free play of the geartrain, such that the couplings and the back drive prevention device 702 can be configured with desirable mating and tolerances to minimize these aspects.

Figure 35:
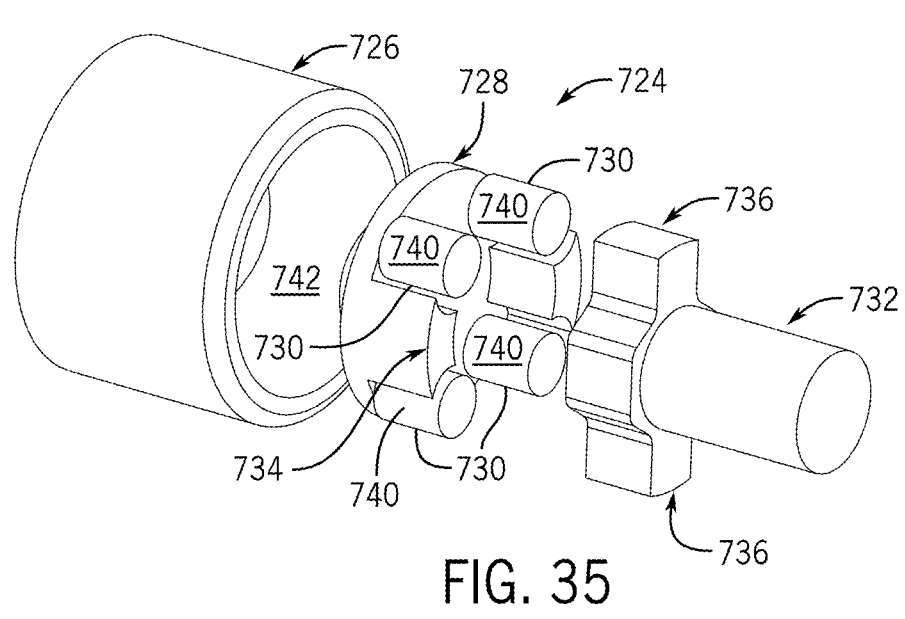
FIG. 35 is an isometric exploded view of another example back drive prevention device.
Figure 36A:
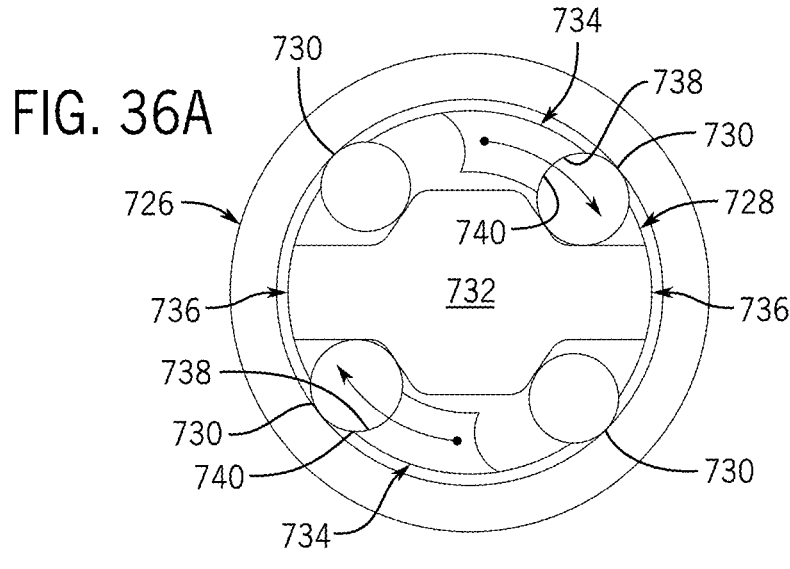
FIG. 36A is a plan view of the example back drive prevention device shown in FIG. 35 permitting rotation.
Figure 36B:
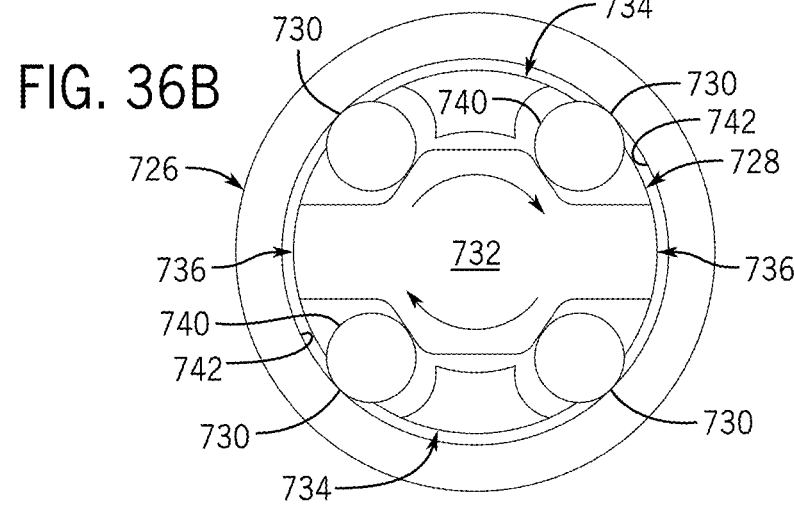
FIG. 36B is a plan view of the example back drive prevention device shown in FIG. 35 inhibiting rotation.

Turning to FIG. 35, an additional example embodiment of a back drive prevention device 724 is illustrated. The back drive prevention device 724 is similar to the cam-lock type described above. The back drive prevention device 724 includes a relatively fixed ring or housing 726, an input member 728, a set of rollers 730, and an output member 732. The rollers 730 are positioned between arms 734 of the input member 728 and cams 736 of the output member 732, with the input member 728, rollers 730, and output member 732 being at least partially within the housing 726. With additional reference to the schematic representation in FIG. 36A, when a rotational force or torque is applied to the input member 728 (e.g., in the clockwise direction as show in FIG. 36A), arcuate surfaces 738 on the arms 734 of the input member 728 rotate into engagement with a mating exterior surface 740 of the rollers 730, which in turn engage with the cams 736 to drive rotation of the output member 732. As shown, the input member 728 can be rotated clockwise or counterclockwise, with corresponding rotation of the output member 732. With additional reference to the schematic representation in FIG. 36B, when a rotational force or torque is applied to the output member 732 (e.g., in the clockwise direction as shown in FIG. 36B), the cams 736 are configured to engage with the exterior surfaces 740 of the rollers 730 and urge the rollers 730 into an interior surface 742 of the housing 726, which results in binding between the output member 732, the one or more rollers 730, and the housing 726. Therefore, the rotation of the output member 732 (in either the clockwise or counterclockwise directions in the as-shown configuration) in inhibited from transferring rotation or torque to the input member 728. Given the benefit of this disclosure, one skilled in the art will apricate the variations and application-specific embodiments of a back drive prevention device.

Figure 37:
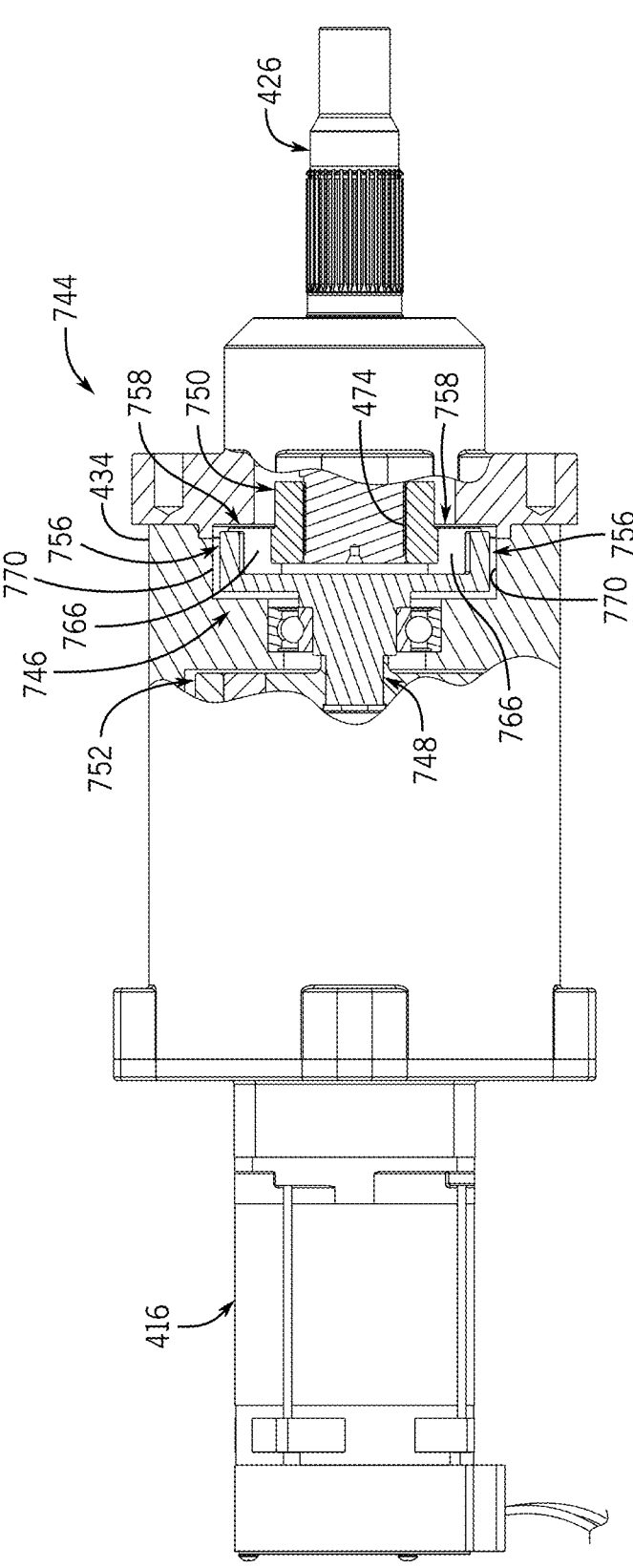
FIG. 37 is a plan partial section view of a further example gearmotor assembly.

As noted above, the location of the back drive prevention device can be at various positions within and along a gearmotor assembly. With reference to FIG. 37, an additional example gearmotor assembly 744 is shown. The gearmotor assembly 744 is similar to that disclosed and described in connection with gearmotor assembly 414. With additional reference to FIG. 38, the gearmotor assembly 744 incorporates an example embodiment of a back drive prevention device 746 operably positioned generally between an internal reduction gear assembly (not shown) and the example gearbox coupling 426.

The additional example back drive prevention device 746 is also in the form of a cam-lock style device configured to permit rotation when torque is applied to an input member 748 and inhibit rotation when torque is applied to an output member 750. In this configuration, an example output planet carrier 752 is in splined engagement with the input member via splines 754. When a force is applied to rotate the input member 748, such as when the motor 416 engages the reduction gear assembly to drive the output planet carrier 752, arms 756 are rotated into engagement with respective rollers 758. The rollers 758 then engage with cam portion 760 (shown with one example simplified geometry in FIG. 38), such that the rotational torque is transferred to rotate the output member 750. At least one roller 758 is typically incorporated to establish the torque transfer, with two or more providing additional engagement interfaces. In the example embodiment, the output member 750 defines a bore 762 configured to operably engage the torque limiter 474, thus permitting relative rotation between the torque limiter 474 and the gearbox coupling 426 as described herein.

Again, while various form factors of the input member 748, the output member 750, and the rollers 758 are available, the arms 756 of the input member 748 can include curved engagement faces 764 that are configured to cooperate with exterior surfaces 766 of the rollers 758. As with the other example back drive prevention devices, this additional example back drive prevention device 746 is also configured to inhibit rotation of the output member 750 resulting in torque transfer to or rotation of the input member 748. For example, the output member 750 defines a cam profile 768 that is configured to engage with and wedge at least one of the rollers 758 between the output member 750 and, in one example embodiment, an interior surface 770 of the reduction housing 434 that is fixed relative to rotation of the input member 748 and the output member 750.

The relative positioning of the back drive prevention device 746 (i.e., proximate the output) can result in the torque on the back drive prevention device 746 being similar to a slip torque. Lesser impact loads on the back drive prevention device 746 may be experienced while driving from the output member 750 due to no additional speed increase. This configuration also permits mounting of the gearmotor assembly 744 consistent with conventional manners/supports (e.g., as illustrated in FIG. 13). Moreover, this configuration establishes less free play and clearance as comparted to the relative input positioning described in connection with the FIG. 33 embodiment.

As noted, certain gear parings with relatively higher reduction ratios can establish an inherent inhibition of back driving. However, many of these parings result in efficiency below about 50%. For example, a traditional slew drive configuration (e.g., with an input perpendicular to an output) can have a gear train efficiency of about 46%, whereas a configuration that eliminates the undesirable gear pairings and optionally incorporates a back drive prevention device can achieve efficiencies of about 90% (such as the example arrangement illustrated in FIG. 27). In still other gear arrangements, such as traditional centralized configurations that incorporate a right-angle gearbox, efficiency can be as low as about 19% and improved to about 89% when optimizing inline components, eliminating the right-angle gearing, and optionally incorporating a back drive prevention device (such as the example arrangement illustrated in FIG. 13). The following describes additional example embodiments that provide efficient solutions incorporating non-back driving functionality, such as via a back drive prevention device using a cam effect.

Figure 39:
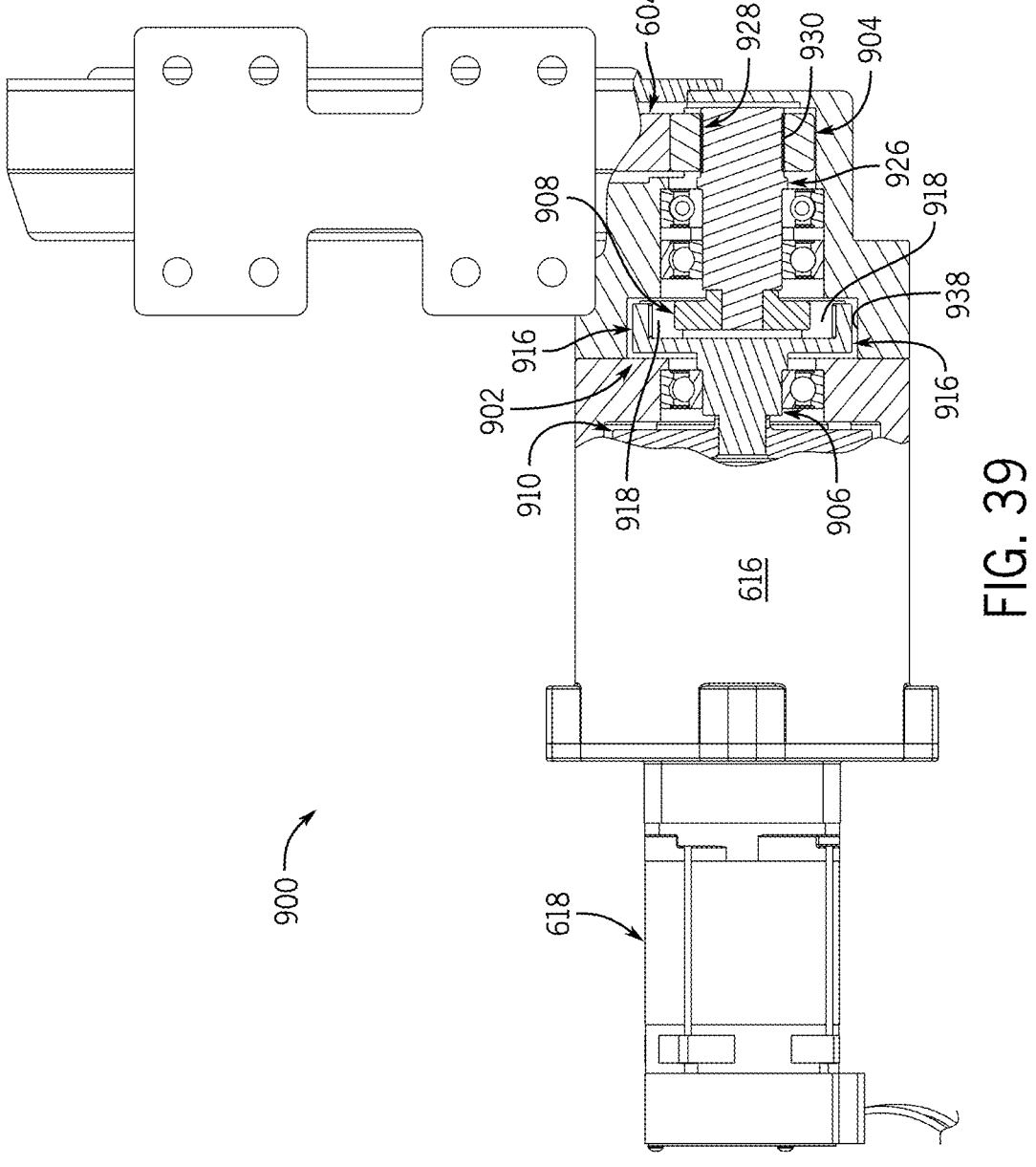
FIG. 39 is a plan partial section view of another example gearmotor assembly and example geartrain.
Figure 40:
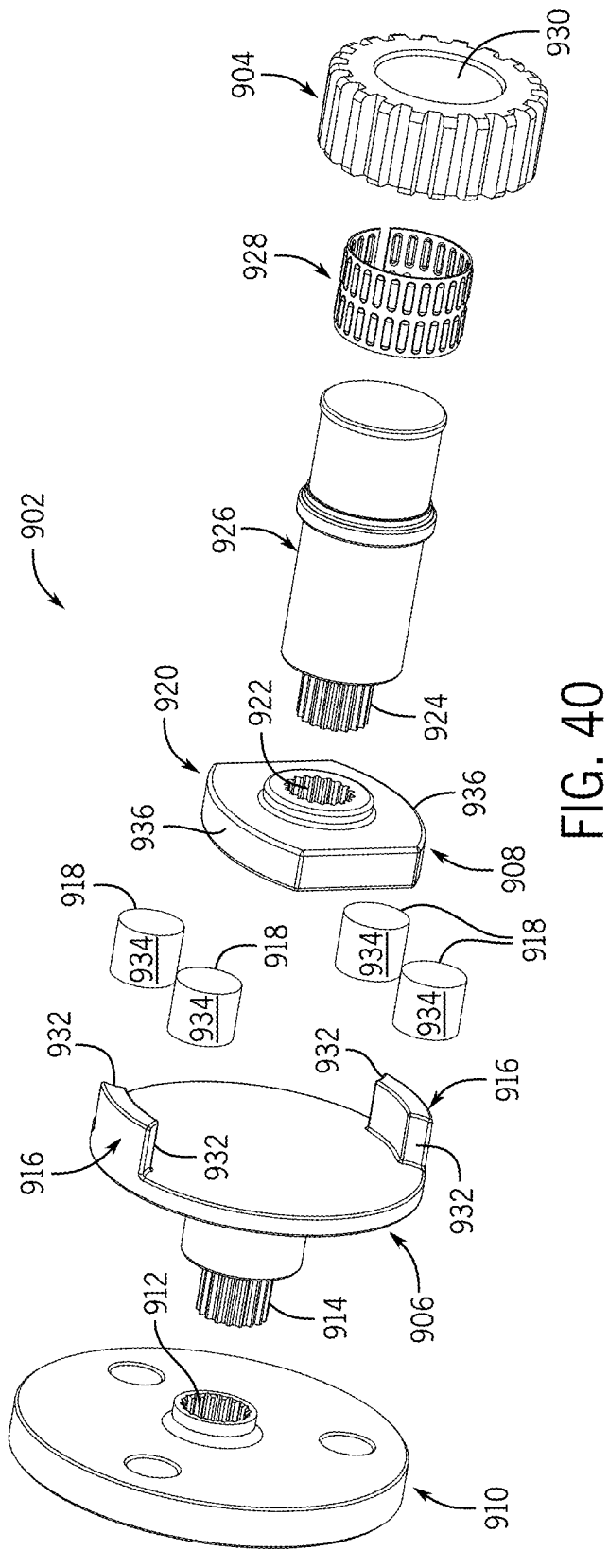
FIG. 40 is an isometric exploded view of another example back drive prevention device shown in FIG. 39.

With reference to FIGS. 39 and 40, an offset parallel gearing configuration is illustrated similar to the arrangement described in connection with FIGS. 27 and 28. An example gearmotor assembly 900 is configured to engaged with and drive a ring gear 604. In this embodiment, the gearmotor assembly 900 incorporates a back drive prevention device 902. Again, the particular example back drive prevention device 902 is of the cam-effect type, but other types (e.g., electrical motor brakes) can be incorporated. The example geartrain (not completely shown) establishes a higher efficiency solution as compared to conventional slew drives (e.g., planetary and spur versus worm). Additional cost benefits are realized in certain applications, such as solar tracking, as use of a torque limiter reduces the desired sturdiness of the gearbox on the drive line shaft that may be beneficial to back hold on wind events and other external loads applying a tiling torque into the system. In some embodiments, torque limiting during wind events reduces the load on a solar panel, unlike conventional slew drive arrangements that hold/restrain the solar panel such that much of the external wind forces/external loads act on or impact the solar panel.

Figure 38:
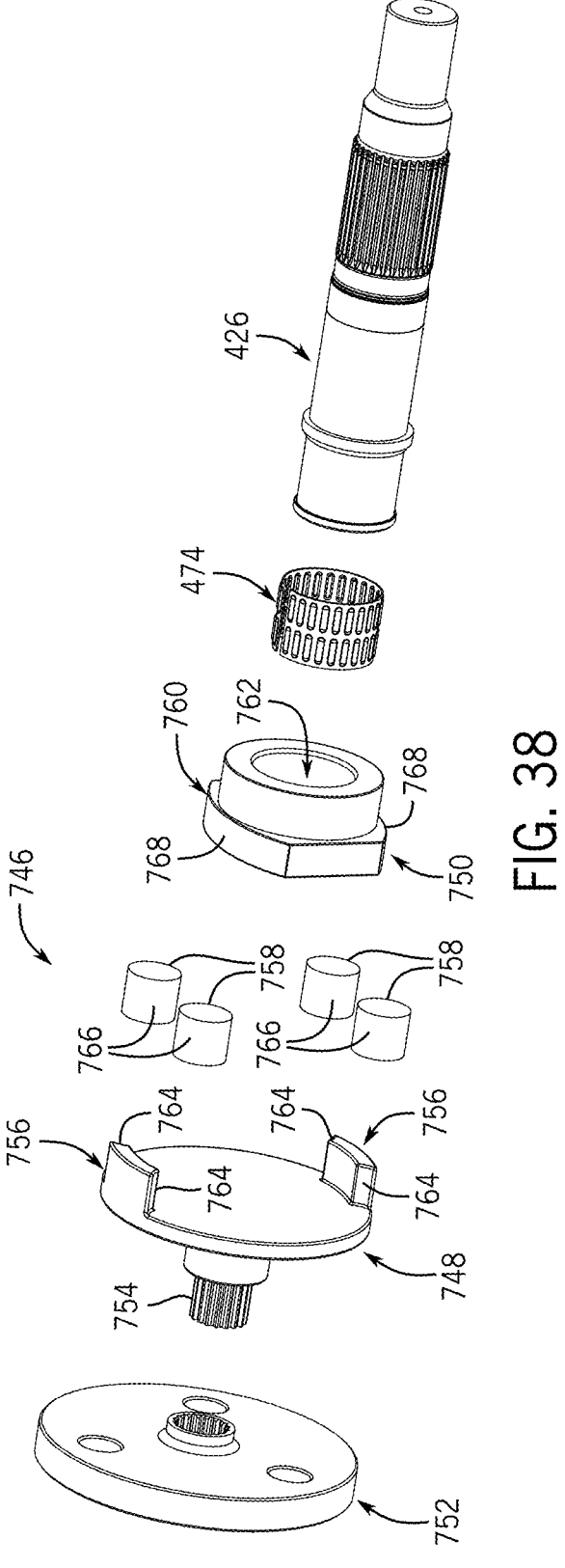
FIG. 38 is an isometric exploded view of a further example back drive prevention device shown in FIG. 37.

With continued reference to FIGS. 39 and 40, the example gearmotor assembly 900 and incorporated back drive prevention device 902 are similar to those described in connection with FIGS. 37 and 38. The location of the back drive prevention device 902 is operably positioned generally between an internal reduction gear assembly (not shown) and the example gearbox coupler in the example form of a spur gear 904, which is operably engaged with the ring gear 604.

This additional example back drive prevention device 902 is also in the form of a cam-lock style device configured to permit rotation when torque is applied to an input member 906 and inhibit rotation when torque is applied to an output member 908. In this configuration, an example output planet carrier 910 includes a splined bore 912 that is in splined engagement with a splined shaft 914 of the input member 906. When a force is applied to rotate the input member 906, such as when the motor 618 engages the reduction gear assembly to drive the output planet carrier 910, arms 916 are rotated into engagement with respective rollers 918. The roller 918 then engages with cam portion 920 (shown with one example simplified geometry in FIG. 40), such that the rotational torque is transferred to rotate the output member 908. Again, while a pair of arms 916 and a set of four rollers 918 are illustrated, the arrangement can be adapted to operably include one or more arms 916 circumferentially spaced (equally or otherwise) and one or more rollers 918. In the example embodiment, the output member 908 defines a splined bore 922 configured to operably engage a splined shaft 924 of a shaft 926. The shaft 926 engages with a torque limiter 928 that is seated in engagement with an interior surface 930 of the spur gear 904. As described above, the torque limiter 928 is configured to inhibit and permit relative slip between the shaft 926 and the spur gear 904, thus allowing the ring gear 604 (and hence coupled components) to react to a load while inhibiting (in combination with the back drive prevention device 902) force transfer back through the balance of the gearmotor assembly 900.

Similar to input member 748, the arms 916 of the input member 906 are configured with arcuate engagement faces 932 that cooperate with exterior surfaces 934 of the rollers 918. As with the other example back drive prevention devices, this further example back drive prevention device 902 inhibits rotation of the output member 908 from resulting in torque transfer to or rotation of the input member 906. For example, the output member 908 defines a cam profile 936 that is configured to engage with and wedge at least one of the rollers 918 between the output member 908 and an interior surface 938 of the housing 616, which is fixed relative to rotation of the input member 906 and the output member 908. Therefore, the ring gear 604 (and any coupled components, such as solar panels) can transfer force and torque back to the spur gear 904. Given that the back drive prevention device 902 inhibits the output member 908 from rotating the input member 906, once the force or torque exceeds the amount allowed for transfer by the torque limiter 928 arrangement, the spur gear 904 and coupled torque limiter 928 will slip and rotate relative to the shaft 926, thus allowing movement of the ring gear 604 and coupled components while inhibiting forces back into the drivetrain of the gearmotor assembly 900.

Figure 41A:
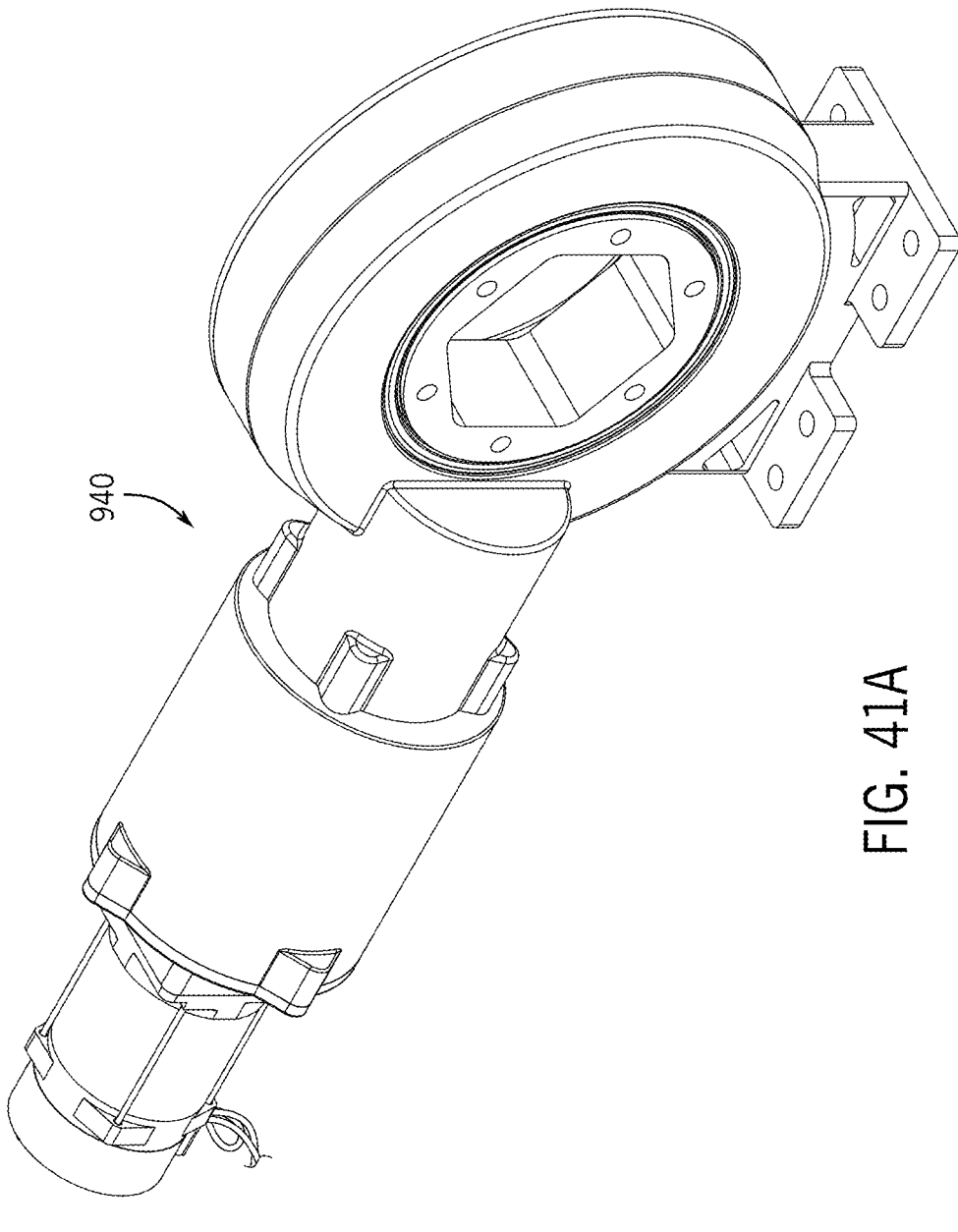
FIG. 41A is an isometric view of a further example gearmotor assembly and example geartrain.
Figure 41B:
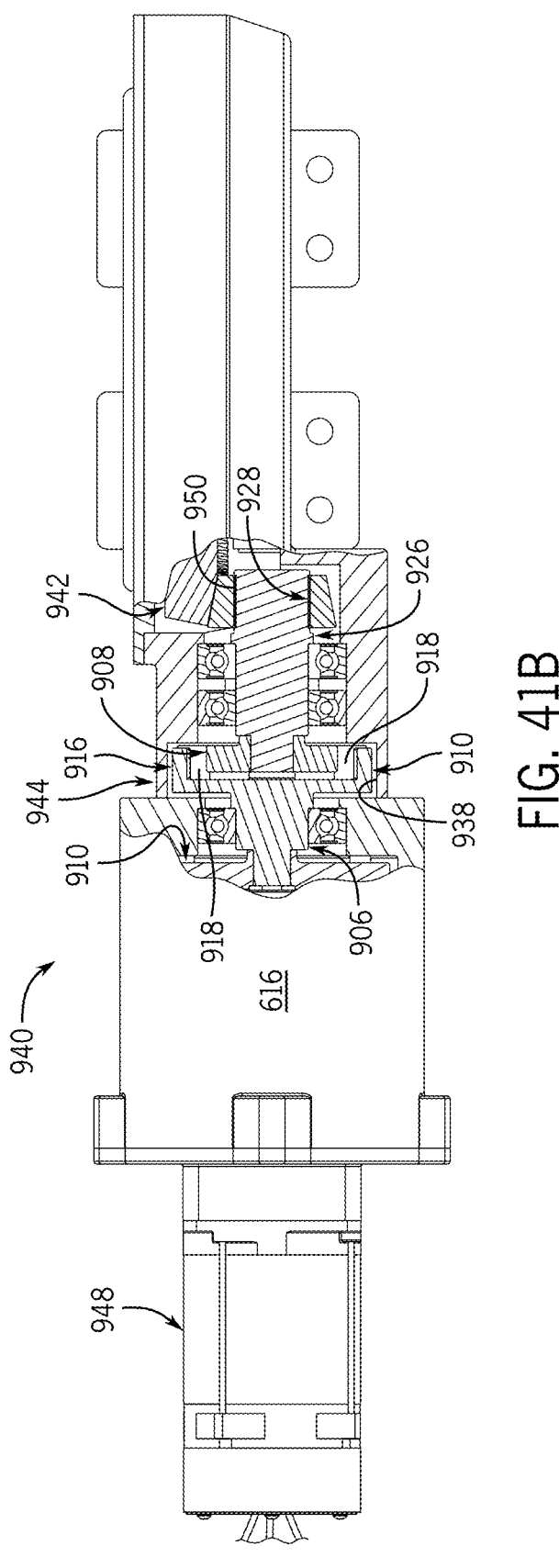
FIG. 41B is a plan partial section view of the further example gearmotor assembly and example geartrain shown in FIG. 41A.
Figure 42:
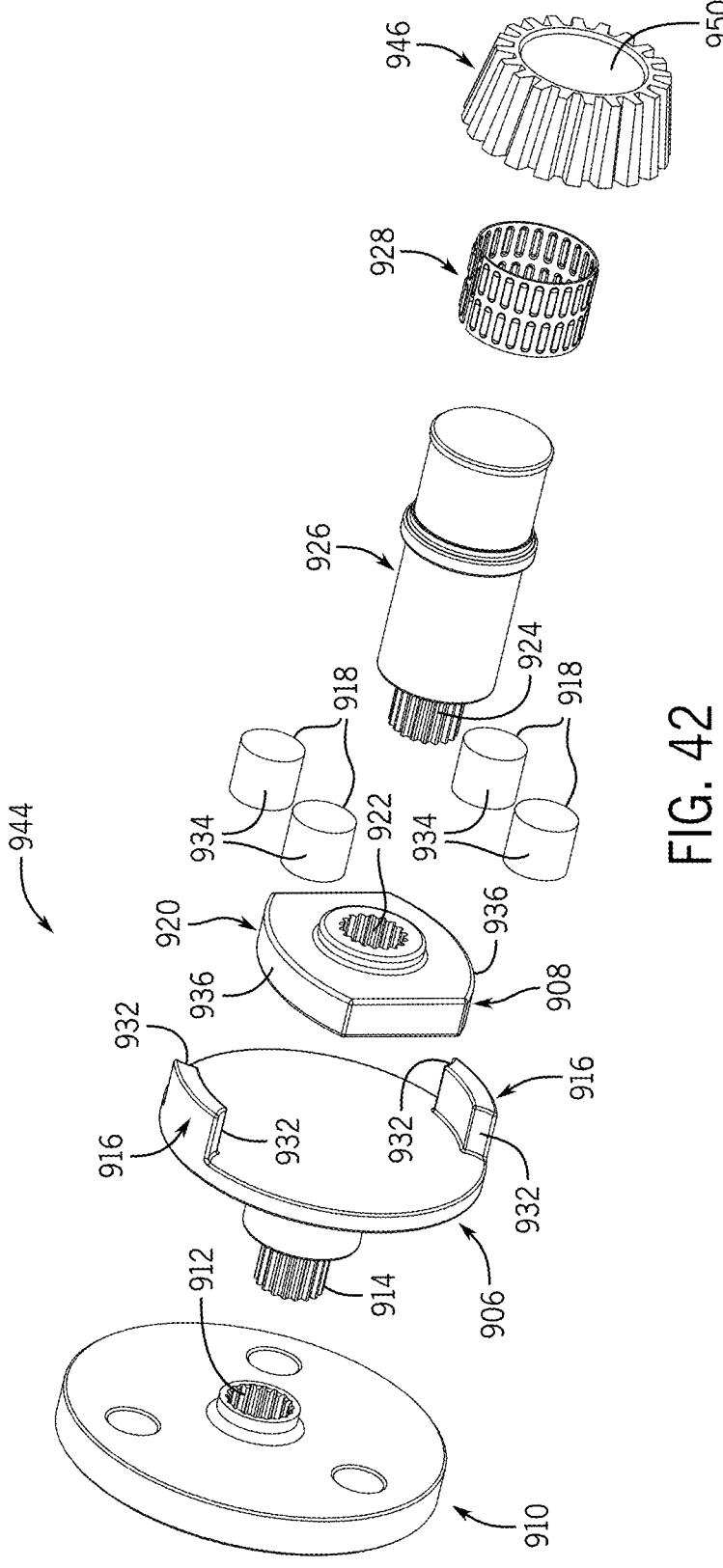
FIG. 42 is an isometric exploded view of a further example back drive prevention device shown in FIG. 41B.

With reference to FIGS. 41A, 41B, and 42, a right-angle bevel gearing configuration is illustrated similar to the arrangement described in connection with FIGS. 39 and 40. An example gearmotor assembly 940 is configured to engaged with and drive a bevel ring gear 942. In this embodiment, the gearmotor assembly 940 incorporates a back drive prevention device 944, which differs from the gearmotor assembly 900 described above in that the coupler has been changed from a spur gear 904 to a bevel gear 946. The bevel gear 946 is configured to operatively engage with the bevel ring gear 942. Again, the particular example back drive prevention device 944 is of the cam-effect type, but other types (e.g., electrical motor brakes) can be incorporated. The example geartrain (not completely shown) establishes a higher efficiency solution as compared to conventional slew drives (e.g., planetary and right-angle bevel versus worm). Similar cost and application benefits are realized in certain applications with the use of a torque limiter.

With continued reference to FIGS. 41A, 41B, and 42, the example gearmotor assembly 940 and incorporated back drive prevention device 944 are similar to those described in connection with FIGS. 39 and 40. The location of the back drive prevention device 940 is operably positioned generally between an internal reduction gear assembly (not shown) and the example gearbox coupler in the example form of the bevel gear 946, which is operably engaged with the bevel ring gear 942.

This additional example back drive prevention device 944 is also in the form of a cam-lock style device configured to permit rotation when torque is applied to an input member 906 and inhibit rotation when torque is applied to an output member 908. In this configuration, an example output planet carrier 910 includes a splined bore 912 that is in splined engagement with a splined shaft 914 of the input member 906. When a force is applied to rotate the input member 906, such as when a motor 948 engages the reduction gear assembly to drive the output planet carrier 910, arms 916 are rotated into engagement with respective rollers 918. The roller 918 then engages with cam portion 920 (shown with one example simplified geometry in FIG. 42), such that the rotational torque is transferred to rotate the output member 908. Again, while a pair of arms 916 and a set of four rollers 918 are illustrated, the arrangement can be adapted to operably include one or more arms 916 circumferentially spaced (equally or otherwise) and one or more rollers 918. In the example embodiment, the output member 908 defines a splined bore 922 configured to operably engage a splined shaft 924 of a shaft 926. The shaft 926 engages with a torque limiter 928 that is seated in engagement with an interior surface 950 of the bevel gear 946. As described above, the torque limiter 928 is configured to inhibit and permit relative slip between the shaft 926 and the bevel gear 946, thus allowing the bevel ring gear 942 (and hence coupled components) to react to a load while inhibiting (in combination with the back drive prevention device 944) force transfer back through the balance of the gearmotor assembly 940.

The arms 916 of the input member 906 are configured with arcuate engagement faces 932 that cooperate with exterior surfaces 934 of the rollers 918. As with the other example back drive prevention devices, this further example back drive prevention device 944 inhibits rotation of the output member 908 from resulting in torque transfer to or rotation of the input member 906. For example, the output member 908 defines a cam profile 936 that is configured to engage with and wedge at least one of the rollers 918 between the output member 908 and an interior surface 938 of the housing 616, which is fixed relative to rotation of the input member 906 and the output member 908. Therefore, the bevel gear 946 (and any coupled components, such as solar panels) can transfer force and torque back to the bevel gear 946. Given that the back drive prevention device 944 inhibits the output member 908 from rotating the input member 906, once the force or torque exceeds the amount allowed for transfer by the torque limiter 928 arrangement, the bevel gear 946 and the coupled torque limiter 928 will slip and rotate relative to the shaft 926, thus allowing movement of the bevel ring gear 942 and coupled components while inhibiting forces back into the drivetrain of the gearmotor assembly 940.

It is beneficial to maintain perpendicularity between the torque limiter and the cooperating components. For instance, when the example torque limiter 192 is assembled between the gearbox shaft 104 and the worm gear 105, it is desirable to control the perpendicularity of the assembly process and thus the ultimate assembly, preferably reducing axial gear assembly runout and establishing optimum central alignment between the worm gear 105 and the torque limiter 192 on the gearbox shaft 104. In general, concentricity between the gearbox shaft 104, the worm gear 105, and the torque limiter 192 is aided by the insertion edge 240, which also aids achieving perpendicularity between the gearbox shaft 104 and the worm gear 105. In addition, in some embodiments, the proper relative axial alignment of the worm gear 105 and the torque limiter 192 can be controlled or set by a positive stop of the gearbox shaft 104 (e.g., due to engagement with an external surface, engagement with one or more spacers, such as spacer 184, or a combination of integral and external stop features). The following examples are generally described in context of the torque limiter 192; however, the concepts are equally applicable to, for instance, the assembly of the torque limiter 474, the gearbox coupling 426, and the output planet carrier 472, generally between the relatively fixed and sliding components, as well as other alternative arrangements as appreciated by one of ordinary skill when given the benefit of this disclosure.

Figure 43:
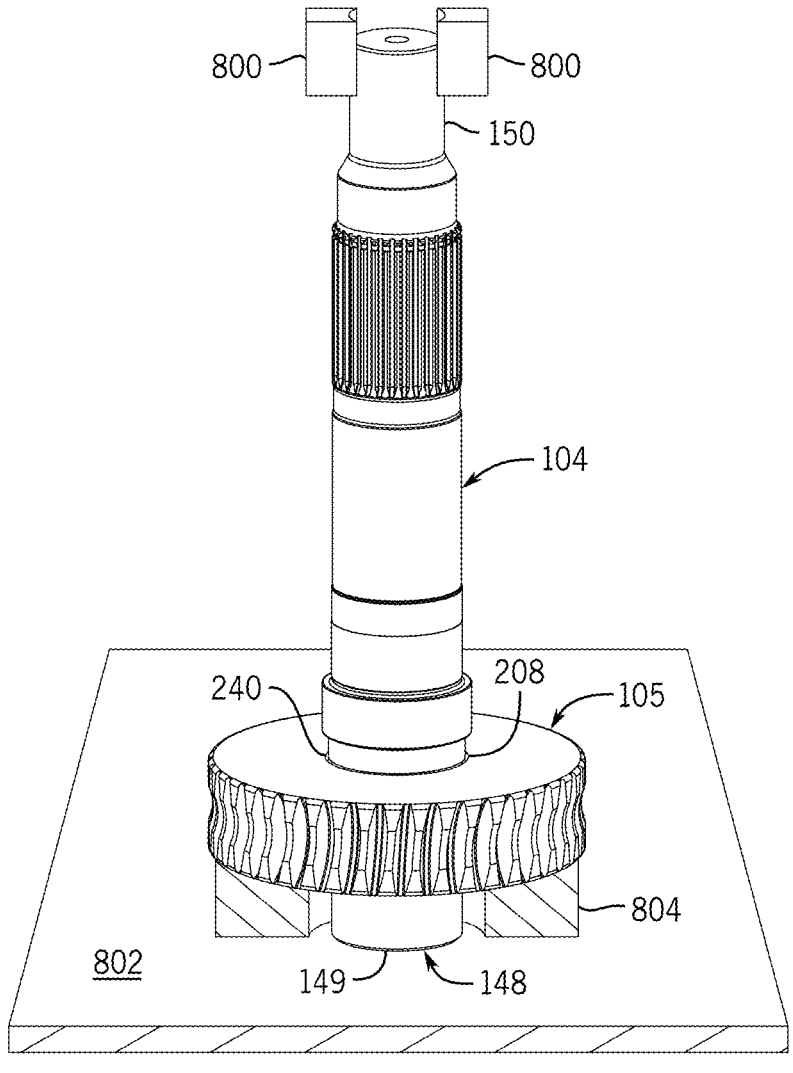
FIG. 43 is an isometric view of an example fixture assembly for an example assembly method.

As illustrated in FIG. 43, one example assembly method is schematically depicted. The gearbox shaft 104 is held by (e.g., compressed) chucks 800 of a press machine (not shown). Various configurations and types of press machines can be used in the assembly process, provided the press machine can provide the application-specific force and resolution to establish the assembly process. In the example illustrated, the chucks 800 engage with the gearbox shaft 104 near the distal end portion 150, and the proximal end portion 148 of the gearbox shaft is positioned near a bed 802 of the press machine. The worm gear 105 is positioned on a fixture 804, that allows the proximal end portion 148 of the gearbox shaft 104 to extend into and through the central bore 208 of the worm gear 105 during the assembly process. The fixture 804 can have various form factors (e.g., larger than the worm gear 105) and is of sufficient construction to withstand the compressive forces applied during the assembly process. While a spacer (e.g., spacer 184) can be positioned along the gearbox shaft 104 to aid the relative axial positioning of the assembled worm gear 105, the example shown leverages the chucks 800 holding the gearbox shaft 104 perpendicular to the bed 802. The perpendicularity of the assembly is maintained during the pressing process, which continues until an end face 149 of the proximal end portion 148 abuts the bed 802 of the press machine. Perpendicularity further helps to reduce excessive undesirable gear assembly runout. In other embodiments, the fixture 804 may be constructed to include an integral stop surface that functions similar to the bed 802. In addition, the worm gear 105 is not restrained laterally (relative to the pressing force direction), such that the worm gear 105 is not inhibited from movement as the gearbox shaft 104 and/or torque limiter 192 operably engage with the insertion edge 240 of the worm gear 105. This arrangement promotes concentricity being maintained during the assembly process.

Figure 44A:
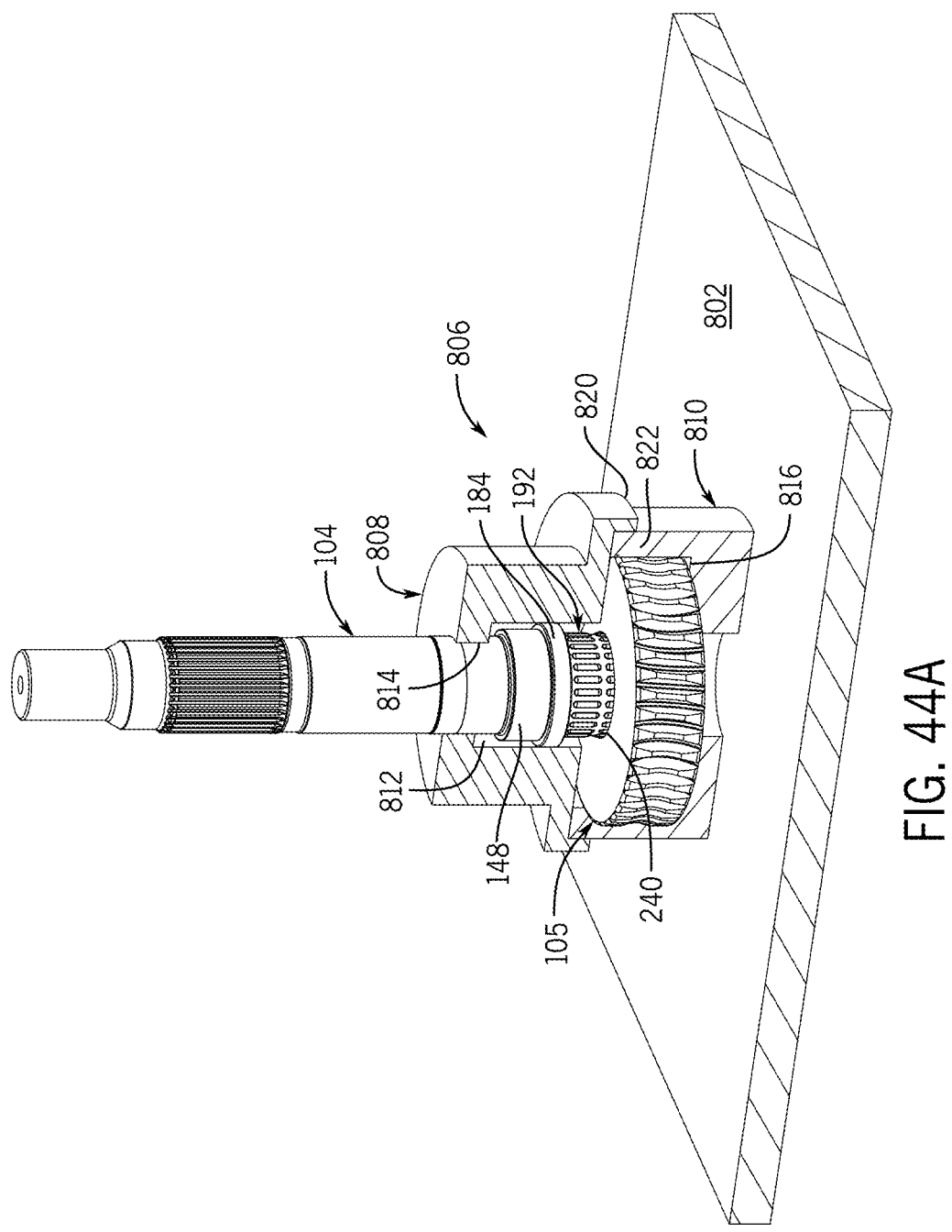
FIG. 44A is an isometric view of another example fixture assembly for another example assembly method.
Figure 44B:
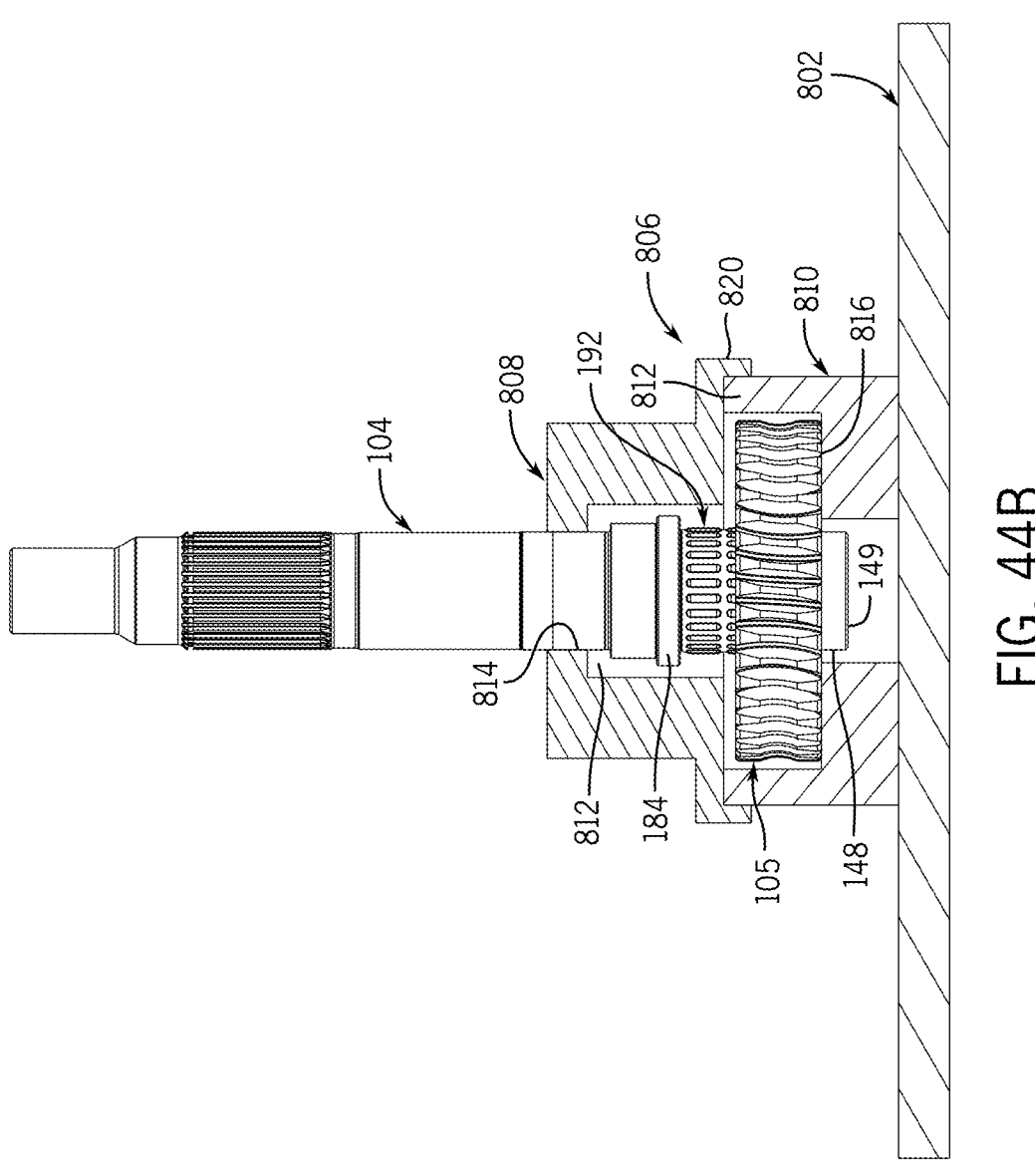
FIG. 44B is a plan view of the example fixture assembly shown in FIG. 44A.

An alternative arrangement for assembling the various components is illustrated in FIGS. 44A and 44B. A multi-piece fixture 806 is used to help establish the desired assembly (e.g., perpendicularity and/or concentricity) of the gearbox shaft 104, the torque limiter 192, and the worm gear 105. The fixture 806 includes a first portion 808 cooperating with a second portion 810 to define a cavity 812. The first portion 808 and the second portion 810 of the fixture 806 are configured to be coupled to inhibited relative radial movement and axial movement (in the compressed/insertion direction). Specifically, the first portion 808 defines a lip 820 that extends around a rim 822 of the second portion 810. The engagement between the lip 820 and the rim 822 positions the first portion 808 relative to the second portion 810. Seated within the cavity 812 are the worm gear 105 and the proximal end portion 148 of the gearbox shaft 104 with the torque limiter 192 and (in one embodiment) the spacer 184.

Each portion of the fixture 806 is configured to perform particular functions during the assembly process. The first portion 808 defines a first opening 814 that is sized to engage with and guide the gearbox shaft 104 (e.g., the shaft outer diameter at a bearing seat portion) during assembly, which helps to reduce gear assembly runout and maintain perpendicularity of the assembly. Similar to fixture 804 illustrated in FIG. 43, the second portion 810 of the fixture 806 defines a seat 816 that receives the worm gear 105. The seat 816 is sized to permit sufficient lateral movement of the worm gear 105, such that concentricity of the assembly is maintained when the torque limiter 192 engages the insertion edge 240 of the worm gear 105. In this embodiment, alignment is dictated by the first portion 808 of the fixture 806, such that the worm gear 105 is free to align during the assembly process (within the constraints of the second portion 810), which is show about halfway completed in FIGS. 44A and 44B. As insertion of the gearbox shaft 104 progresses, the desired final relative positioning can be determined by a bed 802 as the proximal end portion 148 of the gearbox shaft 104 extends through a second opening 818 in the second portion 810 of the fixture 806 until an end face 149 of the gearbox shaft 104 abuts the bed 802. In other forms, the spacer 184, an integral stop surface established by the fixture (e.g., the second portion 810), and/or some combination thereof can be adapted to determine the final positioning of the various assembled components.

Figure 45A:
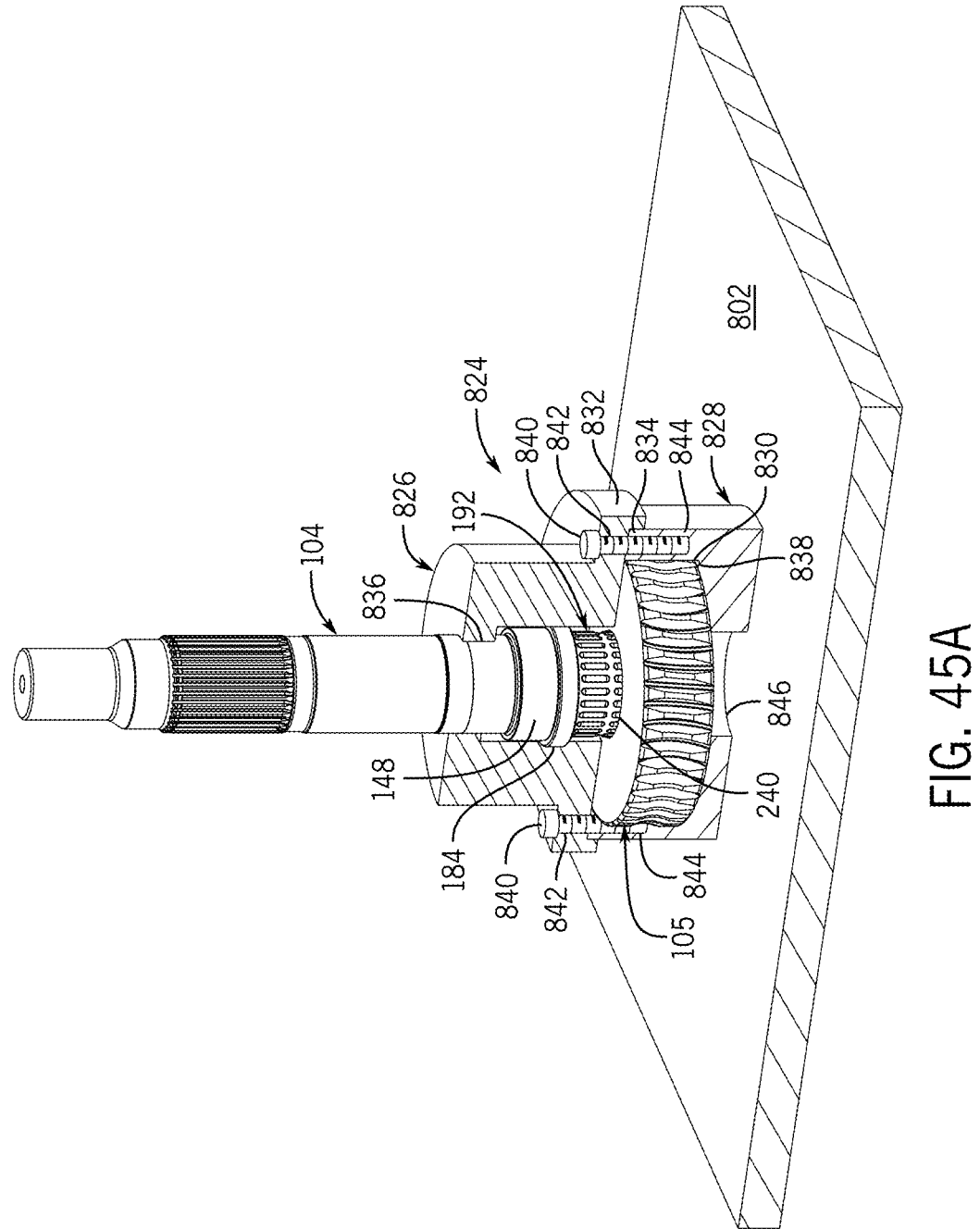
FIG. 45A is an isometric view of a further example fixture assembly for a further example assembly method.
Figure 45B:
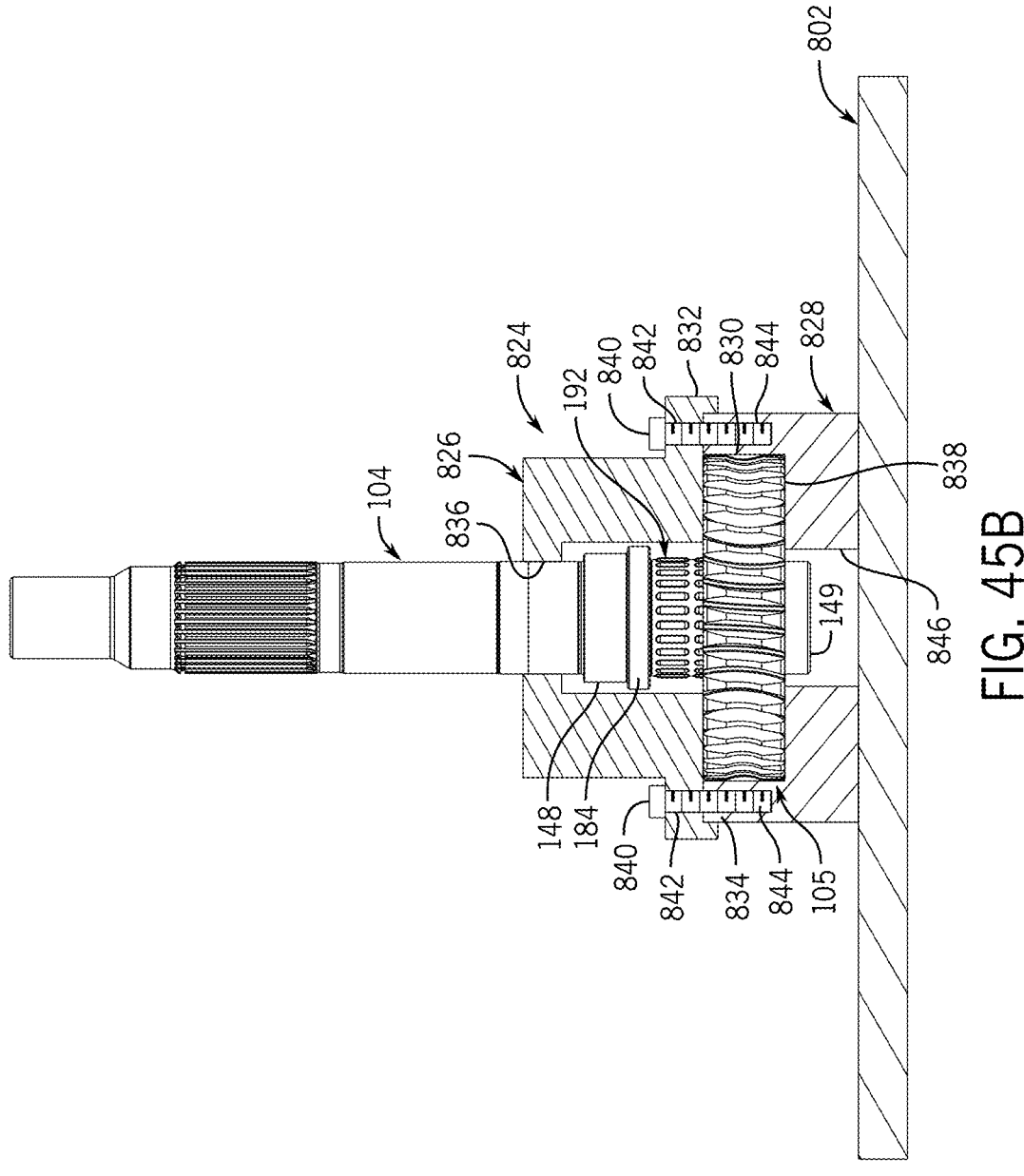
FIG. 45B is a plan view of the example fixture assembly shown in FIG. 45A.

Another alternative arrangement for assembling the various components is illustrated in FIGS. 45A and 45B. In this alternative, the position of the worm gear 105 is inhibited from movement during the assembly process. A multi-piece fixture 824 is used to help establish the desired assembly (e.g., perpendicularity and/or concentricity) of the gearbox shaft 104, the torque limiter 192, and the worm gear 105. The fixture 824 includes a first portion 826 cooperating with a second portion 828 to define a cavity 830. The first portion 826 and the second portion 828 of the fixture 824 are configured to be coupled to inhibited relative radial movement and axial movement (in the compressed/insertion direction). Specifically, the first portion 826 defines a lip 832 that extends around a rim 834 of the second portion 828. The engagement between the lip 832 and the rim 834 positions the first portion 826 relative to the second portion 828. Seated within the cavity 830 are the worm gear 105 and the proximal end portion 148 with the torque limiter 192 and (in one embodiment) the spacer 184. In this embodiment, as discussed in more detail below, the cavity 830 is sized to precisely receive and position the worm gear 105.

Each portion of the fixture 824 is configured to perform particular functions during the assembly process. The first portion 826 defines a first opening 836 that is sized to engage with and guide the gearbox shaft 104 (e.g., the shaft outer diameter at a bearing seat portion) during assembly, which again helps to reduce gear assembly runout and maintain perpendicularity of the assembly. Similar to fixture 806 illustrated in FIGS. 44A and 44B, the second portion 828 of the fixture 824 defines a seat 838 that receives the worm gear 105. The seat 838, in combination with the overall cavity 830 formed when the first portion 826 and the second portion 828 of the fixture 824 are coupled together, is sized to inhibit lateral and axial movement of the worm gear 105, such that concentricity of the assembly is maintained when the torque limiter 192 engages the worm gear 105, regardless of any insertion edge 240 included on the worm gear 105. In this embodiment, alignment is dictated by the precise alignment and coupling of the first portion 826 and the second portion 828 of the fixture 824, such that the worm gear 105 is aligned prior to and during the assembly process, which is shown about halfway completed in FIGS. 45A and 45B. In the example illustrated, the first portion 826 and the second portion 828 are coupled via fasteners 840 extending through holes 842 in the first portion 826 and threaded into threaded bores 844 formed in the second portion 828. Given the benefit of this disclosure, one skilled in the art will appreciate various precision alignment alternatives, such as a bore-pin engagement or other machined features (e.g., slots/grooves/protrusions/teeth) included to control the relative positioning between the first portion 826 and the second portion 828 of the fixture 824. As insertion of the gearbox shaft 104 progresses, the desired final relative positioning can be determined by a bed 802 as the proximal end portion 148 of the gearbox shaft 104 extends through a second opening 846 in the second portion 828 of the fixture 824, thus allowing an end face 149 of the gearbox shaft 148 to abut the bed 802. In other forms, the spacer 184, an integral stop surface established by the fixture (e.g., the second portion 828), and/or some combination thereof can be adapted to determine the final positioning of the various assembled components.

As used herein, the terms "input" and "output" (and similar phrases) are not to be considered limiting. For instance, while a gearbox coupling can provide an output force related to the input force generated by the motor output, given the benefit of this disclosure one skilled in the art will appreciate that the gearbox coupling, for instance, can receive an external input force (e.g., via a driven member operably coupled to the reduction gearbox).

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

The previous description of the disclosed embodiments is provided to enable any person skilled in the art to make or use the invention. Given the benefit of this disclosure, various modifications to these embodiments will be readily apparent to those skilled in the art, and the principles defined herein may be applied to other embodiments without departing from the spirit or scope of the invention. Thus, the invention is not intended to be limited to the embodiments shown herein but is to be accorded the widest scope consistent with the principles and novel features disclosed herein. It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. For example, the spacing, size, orientation, shape, and other features may vary based on application-specific requirements. The entire disclosure of each patent and publication cited herein is incorporated by reference, as if each such patent or publication were individually incorporated by reference herein. Various features and advantages of the invention are set forth in the following claims.

The invention claimed is:

1. A gearbox assembly, comprising:
   a gearbox including:
      a worm housing; and
      a cover configured to engage with the worm housing to define a housing interior between the worm housing and the cover;
   a worm shaft located at least partially within the housing interior;
   a worm gear located within the housing interior and operably engaged with the worm shaft, the worm gear having a central bore, a first axial face, and a second axial face;
   a gearbox shaft that extends along a gearbox shaft axis;
   a torque limiter positioned between central bore of the worm gear and the gearbox shaft to inhibit relative rotation between the worm gear and the gearbox shaft when a relative torque between the worm gear and the gearbox shaft about the gearbox shaft axis is below a maximum torque and to permit relative rotation between the worm gear and the gearbox shaft when the relative torque between the worm gear and the gearbox shaft about the gearbox shaft axis is at or above the maximum torque;
   a first bearing operably engaged with the gearbox shaft at a first axial position along the gearbox shaft axis;
   a second bearing operably engaged with the gearbox shaft at a second axial position along the gearbox shaft axis;
   a first spacer adjacent to the first axial face of the worm gear; and
   a second spacer adjacent to the second axial face of the worm gear;
   wherein the gearbox shaft includes multiple axial segments and an axial rim face defined by the gearbox shaft between adjacent segments of the multiple axial segments;
   wherein the first spacer is between the axial rim face and the first axial face of the worm gear;
   wherein the second spacer is between the second bearing and the second axil face of the worm gear; and
   wherein the torque limiter, the first bearing, and the second bearing are engaged with a respective axial segment of the multiple axial segments.

2. The gearbox assembly of claim 1, wherein an axial length of the torque limiter is about 0.25 to about 2 times a nominal diameter of the torque limiter.

3. The gearbox assembly of claim 1, wherein the housing interior contains only an oil-based lubricant.

4. The gearbox assembly of claim 1, wherein the housing interior contains both an oil-based lubricant and a grease-based lubricant.

5. The gearbox assembly of claim 1, wherein:
   the multiple axial segments of the gearbox shaft include an axial segment defining a nominal segment diameter;
   the torque limiter defines a nominal inner diameter; and
   the nominal inner diameter of the torque limiter is about 1% to about 10% less than the nominal segment diameter before being engaged with the axial segment of the gearbox shaft.

6. The gearbox assembly of claim 1, wherein:
the central bore of the worm gear defines a nominal inner diameter;
the torque limiter defines a nominal outer diameter; and
the nominal outer diameter of the torque limiter is about 1% to about 10% more than the nominal inner diameter of the central bore before being engaged with the central bore of the worm gear.

7. The gearbox assembly of claim 1, wherein the worm gear defines a chamfered insertion edge proximate the central bore.

8. The gearbox assembly of claim 1, wherein:
one of the worm gear and the gearbox shaft defines multiple grooves;
the torque limiter defines contours;
the contours are seated with mating ones of the multiple grooves to inhibit relative movement between the torque limiter and the one of the worm gear and the gearbox shaft defining the multiple grooves.

9. The gearbox assembly of claim 8, wherein the contours are configured to resiliently compress within an elastic material property range of the torque limiter nominally radially inward when engaged between the worm gear and the gearbox shaft.

10. A gearbox assembly, comprising:
a gearbox including:
a worm housing; and
a cover configured to engage with the worm housing to define a housing interior between the worm housing and the cover;
a worm shaft located at least partially within the housing interior;
a worm gear located within the housing interior and operably engaged with the worm shaft, the worm gear having a central bore;
a gearbox shaft that extends along a gearbox shaft axis;
a torque limiter positioned between central bore of the worm gear and the gearbox shaft to inhibit relative rotation between the worm gear and the gearbox shaft when a relative torque between the worm gear and the gearbox shaft about the gearbox shaft axis is below a maximum torque and to permit relative rotation between the worm gear and the gearbox shaft when the relative torque between the worm gear and the gearbox shaft about the gearbox shaft axis is at or above the maximum torque;
a first bearing operably engaged with the gearbox shaft at a first axial position along the gearbox shaft axis; and
a second bearing operably engaged with the gearbox shaft at a second axial position along the gearbox shaft axis;
wherein the gearbox shaft includes multiple axial segments;
wherein the torque limiter, the first bearing, and the second bearing are engaged with a respective axial segment of the multiple axial segments; and
wherein the multiple axial segments of the gearbox shaft further comprising:
a first axial segment that defines a first diameter;
a second axial segment adjacent to the first axial segment that defines a second diameter;
a third axial segment adjacent to the second axial segment that defines a third diameter, the third diameter is greater than the first diameter;
a fourth axial segment adjacent to the third axial segment that defines a fourth diameter, the fourth diameter is approximately the same diameter as the first diameter;

a fifth axial segment adjacent to the fourth axial segment that defines a fifth diameter, the fifth diameter is approximately the same diameter as the third diameter; and
a sixth axial segment adjacent to the fifth axial segment that defines a sixth diameter, the sixth diameter is approximately the same diameter as the first diameter.

11. The gearbox assembly of claim 10, further comprising:
a first spacer and a second spacer; and
a first axial face and a second axial face of the worm gear;
wherein the first spacer is adjacent to the first axial face of the worm gear; and
wherein the second spacer is adjacent to the second axial face of the worm gear.

12. The gearbox assembly of claim 11, further comprising:
an axial rim face defined by the gearbox shaft between adjacent segments of the multiple axial segments;
wherein the first spacer is between the axial rim face and the first axial face of the worm gear; and
wherein the second spacer is between the second bearing and the second axil face of the worm gear.

13. The gearbox assembly of claim 10, wherein the second diameter of the second axial segment and the third diameter of the third axial segment are approximately the same diameter.

14. The gearbox assembly of claim 10, wherein:
the first bearing is seated at the first axial segment;
the torque limiter is seated at the fourth axial segment; and
the second bearing is seated at the sixth axial segment.

15. A gearbox assembly, comprising:
a gearbox including:
a worm housing; and
a cover configured to engage with the worm housing to define a housing interior between the worm housing and the cover;
a worm shaft located at least partially within the housing interior;
a worm gear located within the housing interior and operably engaged with the worm shaft, the worm gear having a central bore;
a gearbox shaft that extends along a gearbox shaft axis;
a torque limiter positioned between central bore of the worm gear and the gearbox shaft to inhibit relative rotation between the worm gear and the gearbox shaft when a relative torque between the worm gear and the gearbox shaft about the gearbox shaft axis is below a maximum torque and to permit relative rotation between the worm gear and the gearbox shaft when the relative torque between the worm gear and the gearbox shaft about the gearbox shaft axis is at or above the maximum torque;
a first bearing operably engaged with the gearbox shaft at a first axial position along the gearbox shaft axis; and
a second bearing operably engaged with the gearbox shaft at a second axial position along the gearbox shaft axis;
wherein the gearbox shaft includes multiple axial segments;
wherein the torque limiter, the first bearing, and the second bearing are engaged with a respective axial segment of the multiple axial segments; and
wherein the central bore of the worm gear defines multiple grooves in an inner surface of the central bore.

16. The gearbox assembly of claim 15, further comprising:

a spacer adjacent to an axial face of the worm gear; and wherein the second bearing is adjacent to the spacer; and wherein the respective axial segments define at least three discrete diameters.

17. The gearbox assembly of claim 15, wherein:

the multiple axial segments of the gearbox shaft define an axial rim face; and an axial face of the worm gear is adjacent to the axial rim face.

18. The gearbox assembly of claim 15, wherein:

the worm gear defines a chamfered insertion edge proximate the central bore; and the multiple grooves extend from the chamfered insertion edge along the inner surface.

19. The gearbox assembly of claim 18, wherein the multiple grooves define substantially parallel side edges.

20. The gearbox assembly of claim 15, wherein a maximum depth of the multiple grooves from the inner surface is about 180 to about 300 micrometers.

\*   \*   \*   \*   \*